United States Patent
Liang et al.

(10) Patent No.: US 11,765,009 B2
(45) Date of Patent: Sep. 19, 2023

(54) METHOD AND APPARATUS FOR TRANSMITTING PHYSICAL LAYER PROTOCOL DATA UNIT

(71) Applicant: HUAWEI TECHNOLOGIES CO., LTD., Shenzhen (CN)

(72) Inventors: Dandan Liang, Shenzhen (CN); Ming Gan, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/856,112

(22) Filed: Jul. 1, 2022

(65) Prior Publication Data
US 2022/0345342 A1 Oct. 27, 2022

Related U.S. Application Data

(63) Continuation of application No. PCT/CN2021/070056, filed on Jan. 4, 2021.

(30) Foreign Application Priority Data

Jan. 3, 2020 (CN) .......................... 202010007115.9

(51) Int. Cl.
*H04L 27/26* (2006.01)

(52) U.S. Cl.
CPC ...... *H04L 27/2602* (2013.01); *H04L 27/2692* (2013.01)

(58) Field of Classification Search
CPC ............ H04L 27/26025; H04L 27/26; H04L 27/2602; H04L 5/0023; H04L 5/0048;
(Continued)

(56) References Cited

U.S. PATENT DOCUMENTS

2011/0013583 A1 1/2011 Yang et al.
2013/0114757 A1 5/2013 Park et al.
(Continued)

FOREIGN PATENT DOCUMENTS

CN 101527664 A 9/2009
CN 105162745 A 12/2015
(Continued)

OTHER PUBLICATIONS

Noh et al., "Gamma Phase Rotation for HE PPDU", doc.: IEEE 802.11-16/0903r1, Jul. 25, 2016, 26 pages.
(Continued)

*Primary Examiner* — Khanh C Tran
(74) *Attorney, Agent, or Firm* — Maier & Maier, PLLC

(57) ABSTRACT

A method and an apparatus for transmitting a physical layer protocol data unit that can provide a short training field sequence for a larger channel bandwidth. The short training field sequence has a smaller peak-to-average power ratio PAPR and better performance. The method includes: generating a physical layer protocol data unit PPDU, where the PPDU includes a short training field, a length of a frequency domain sequence of the short training field is greater than a first length, and the first length is a length of a frequency domain sequence of a short training field of a PPDU transmitted on a channel with a bandwidth of 160 MHz; and sending the PPDU on a target channel, where a bandwidth of the target channel is greater than 160 MHz.

20 Claims, 5 Drawing Sheets

(58) Field of Classification Search
CPC ............... H04L 27/2636; H04L 5/0005; H04L 27/2634; H04L 1/0041; H04L 5/0053; H04L 5/0007; H04L 27/2692; H04L 27/2626

See application file for complete search history.

(56) References Cited

U.S. PATENT DOCUMENTS

| | | | |
|---|---|---|---|
| 2014/0070998 | A1 | 3/2014 | Lee et al. |
| 2018/0145811 | A1* | 5/2018 | Park ................. H04W 72/0453 |
| 2018/0183905 | A1 | 6/2018 | Azizi et al. |
| 2019/0116545 | A1 | 4/2019 | Verma et al. |
| 2019/0268739 | A1 | 8/2019 | Cariou et al. |
| 2019/0289612 | A1 | 9/2019 | Chen et al. |
| 2020/0076552 | A1 | 3/2020 | Cherian et al. |
| 2020/0275371 | A1* | 8/2020 | Park ................. H04W 52/0229 |
| 2022/0140962 | A1* | 5/2022 | Park ................. H04L 27/262 370/330 |

FOREIGN PATENT DOCUMENTS

| | | |
|---|---|---|
| CN | 106100791 A | 11/2016 |
| CN | 107508780 A | 12/2017 |
| CN | 108040028 A | 5/2018 |
| CN | 110324268 A | 10/2019 |
| CN | 111886839 A | 11/2020 |
| CN | 111953630 A | 11/2020 |
| EP | 3829124 A1 | 6/2021 |
| JP | 2017531954 A | 10/2017 |
| KR | 1020130010487 A | 1/2013 |
| KR | 1020140088130 A | 7/2014 |
| KR | 1020150090189 A | 8/2015 |
| KR | 1020180034647 A | 4/2018 |
| WO | 2013152111 A1 | 10/2013 |
| WO | 2015081132 A1 | 6/2015 |
| WO | 2015165025 A1 | 11/2015 |
| WO | 2018076144 A1 | 5/2018 |
| WO | 2019178493 A1 | 9/2019 |
| WO | 2019178511 A1 | 9/2019 |
| WO | 2020020026 A1 | 1/2020 |

OTHER PUBLICATIONS

Park et al., "HE-STF Sequences", doc.: IEEE 802.11-15/1323r1, Nov. 11, 2015, 28 pages.
Li, "Research on Channel Propagation Characteristic and Acquisition Technology of Millimeter Wave MIMO Systems", School of Information Science and Engineering, Southeast University, May 30, 2016 (with English Abstract), 94 pages.
802.11 Working Group of the LAN/MAN Standards Committee of the Computer Society, "Draft Standard for Information Technology-Telecommunications and Information Exchange Between Systems Local and Metropolitan Area Networks-Specific Requirements. Part 11: Wireless LAN Medium Access Control(MAC) and Physical Layer (PHY) Specifications, Amendment 6: Enhancements for High Efficiency WLAN", IEEE P802.11ax/D3.0, Jun. 2018, 682 pages.
Park et al., "HE-STF Sequences", doc.: IEEE 802.11-15/1323r0, Nov. 9, 2015, 28 pages.
Park et al., "Overview of PHY Features for EHT", doc.: IEEE 802.11-18/1967r1, Jan. 14, 2019, 22 pages.
Park et al., "HE-STF Sequences for 160/80+80MHz", doc.: IEEE 802.11-16/0335r0, Mar. 14, 2016, 21 pages.
IEEE Computer Society, "IEEE Standard for Information Technology-Telecommunications and Information Exchange Between Systems-Local and Metropolitan Area Networks-Specific Requirements, Part 11: Wireless LAN Medium Access Control (MAC) and Physical Layer (PHY) Specifications", IEEE Std 802.11-2007, Jun. 12, 2007, 1232 pages.
IEEE Computer Society, "IEEE Standard for Information Technology-Telecommunications and Information Exchange Between Systems-Local and Metropolitan Area Networks-Specific Requirements, Part 11: Wireless LAN Medium Access Control (MAC) and Physical Layer (PHY) specifications, Amendment 4: Further Higher Data Rate Extension in 2.4 GHz Band", IEEE Std 802.11g-2003, Jun. 27, 2003, 78 pages.
Park et al., "Consideration on EHT-STF", doc.: IEEE 802.11-20/0585r0, Apr. 16, 2020, 16 pages.
HTC, "UE radio access capability for WLAN", 3GPP TSG-RAN2#91bis meeting, Malmo, Sweden, Tdoc R2-154369, Oct. 5-9, 2015, 7 pages.
IEEE Computer Society, "IEEE Standard for Information Technology-Telecommunications and Information Exchange Between Systems-Local and Metropolitan Area Networks-Specific Requirements, Part 11:Wireless LAN Medium Access Control (MAC) and Physical Layer(PHY) Specifications, Amendment 5: Enhancement for Higher Throughput", IEEE Std 802.11n-2009, Oct. 29, 2009, 536 pages.
IEEE Computer Society, "IEEE Standard for Information Technology-Telecommunications and Information Exchange Between Systems-Local and Metropolitan Area Networks-Specific Requirements, Part 11: Wireless LAN Medium Access Control (MAC) and Physical Layer (PHY) Specifications, Amendment 4: Enhancement for Very High Throughput for Operation in Bands below 6 GHz", IEEE Std 802.11ac-2013, Dec. 18, 2013, 425 pages.

* cited by examiner

METHOD AND APPARATUS FOR TRANSMITTING PHYSICAL LAYER PROTOCOL DATA UNIT

CROSS-REFERENCE TO RELATED APPLICATIONS

This application is a continuation of International Application No. PCT/CN2021/070056, filed on Jan. 4, 2021, which claims priority to Chinese Patent Application No. 202010007115.9, filed on Jan. 3, 2020. The disclosures of the aforementioned applications are hereby incorporated by reference in their entireties.

TECHNICAL FIELD

The embodiments relate to the field of wireless communication technologies, and a method and an apparatus for transmitting a physical layer protocol data unit.

BACKGROUND

With development of the mobile Internet and popularization of intelligent terminals, data traffic grows rapidly, and users impose increasingly high requirements on communication service quality. The Institute of Electrical and Electronics Engineers (IEEE) 802.11ax standard can no longer meet user requirements for a high throughput, a low jitter, a low delay, and the like. Therefore, it is urgent to develop a next-generation wireless local area network (WLAN) technology, namely, the IEEE 802.11be standard.

Different from the IEEE 802.11ax, the IEEE 802.11be uses ultra-large bandwidths, such as 240 MHz and 320 MHz, to achieve ultra-high transmission rates and support scenarios with an ultra-high user density. Therefore, a short training field (STF) sequence may be needed for a larger channel bandwidth.

SUMMARY

The embodiments provide a method and an apparatus for transmitting a physical layer protocol data unit that may provide a short training field sequence for a larger channel bandwidth.

According to a first aspect, a method for transmitting a physical layer protocol data unit is provided. The method includes: generating a physical layer protocol data unit PPDU, where the PPDU includes a short training field, a length of a frequency domain sequence of the short training field is greater than a first length, and the first length is a length of a frequency domain sequence of a short training field of a PPDU transmitted on a channel with a bandwidth of 160 MHz; and sending the PPDU on a target channel, where a bandwidth of the target channel is greater than 160 MHz.

The method in this embodiment can determine that a short training sequence or a frequency domain sequence corresponding to a larger channel bandwidth and support a receive end to perform automatic gain control on data transmitted on a channel with a larger bandwidth. The short training sequence may be obtained based on a short training sequence of an existing channel bandwidth, and a short training sequence with better performance may be obtained through simulation calculation, for example, through parameter adjustment. A short training field may be obtained based on the short training sequence. This embodiment can meet a larger channel bandwidth during actual implementation, implement backward compatibility, verify, through exhaustive simulation on parameters, that the short training sequence provided in this embodiment has a smaller peak-to-average power ratio PAPR and better performance, improve an estimation effect of an automatic gain control circuit at the receive end, and achieve a lower receiving bit error rate.

With reference to the first aspect, in some implementations of the first aspect, the bandwidth of the target channel is 240 MHz, and the frequency domain sequence of the short training field is any one of the following:

$\{HES'_{-112:16:112}, -1, HES'_{-112:16:112}, 0, HES'_{-112:16:112}, -1, HES'_{-112:16:112}, 0, -HES'_{-112:16:112}, -1, HES'_{-112:16:112}, 0, -HES'_{-112:16:112}, 1, HES'_{-112:16:112}, 0, HES'_{-112:16:112}, 1, -HES'_{-112:16:112}, 0, -HES'_{-112:16:112}, 1, HES'_{-112:16:112}\} \cdot (1+j)/\sqrt{2}$;

$\{-HES'_{-112:16:112}, 1, -HES'_{-112:16:112}, 0, -HES'_{-112:16:112}, 1, -HES'_{-112:16:112}, 0, HES'_{-112:16:112}, 1, -HES'_{-112:16:112}, 0, HES'_{-112:16:112}, -1, -HES'_{-112:16:112}, 0, -HES'_{-112:16:112}, -1, HES'_{-112:16:112}, 0, HES'_{-112:16:112}, -1, -HES'_{-112:16:112}\} \cdot (1+j)/\sqrt{2}$; or $\{HES'_{-112:16:112}, 1, HES'_{-112:16:112}, 0, HES'_{-112:16:112}, 1, -HES'_{-112:16:112}, -1, -HES'_{-112:16:112}, 1, -HES'_{-112:16:112}, 0, -HES'_{-112:16:112}, 1, HES'_{-112:16:112}, -1, -HES'_{-112:16:112}, 1, -HES'_{-112:16:112}, 0, HES'_{-112:16:112}, 1, -HES'_{-112:16:112}\} \cdot (1+j)/\sqrt{2}$, where $HES'_{-112:16:112}$ is represented as $\{M\}$, and $M=\{-1, -1, -1, 1, 1, 1, -1, 1, 1, 1, -1, 1, 1, 1\}$.

With reference to the first aspect, in some implementations of the first aspect, the bandwidth of the target channel is 240 MHz, and the frequency domain sequence of the short training field is any one of the following:

$\{HES'_{-1008:16:1008}\_L, 0, HES'_{-1008:16:1008}\_R, 0, HES'_{-496:16:496}\} \cdot (1+j)/\sqrt{2}$;

$\{-HES'_{-1008:16:1008}\_L, 0, -HES'_{-1008:16:1008}\_R, 0, -HES'_{-496:16:496}\} \cdot (1+j)/\sqrt{2}$;

$\{HES'_{-496:16:496}, 0, -HES'_{-1008:16:1008}\_L, 0, -HES'_{-1008:16:1008}\_R\} \cdot (1+j)/\sqrt{2}$; or $\{-HES'_{-496:16:496}, 0, HES'_{-1008:16:1008}\_L, 0, HES'_{-1008:16:1008}\_R\} \cdot (1+j)/\sqrt{2}$, where $HES'_{-1008:16:1008}\_L$ is represented as $\{M, 1, -M, 0, -M, 1, -M\}$, $HES'_{-1008:16:1008}\_R$ is represented as $\{-M, -1, M, 0, -M, 1, -M\}$, $HES'_{-496:16:496}$ is represented as $\{M, 1, -M, 0, -M, 1, -M\}$, and $M=\{-1, -1, -1, 1, 1, 1, -1, 1, 1, 1, -1, 1, 1, 1, -1, 1\}$.

With reference to the first aspect, in some implementations of the first aspect, the bandwidth of the target channel is 240 MHz, and the frequency domain sequence of the short training field is any one of the following:

$\{HES'_{-496:16:496}\_L, 0, -HES'_{-496:16:496}\_R, 0, -HES'_{-496:16:496}\_L, 0, HES'_{-496:16:496}\_R, 0, -HES'_{-496:16:496}\_L, 0, -HES'_{-496:16:496}\_R\} \cdot (1+j)/\sqrt{2}$;

$\{-HES'_{-496:16:496}\_L, 0, -HES'_{-496:16:496}\_R, 0, HES'_{-496:16:496}\_L, 0, -HES'_{-496:16:496}\_R, 0, HES'_{-496:16:496}\_L, 0, HES'_{-496:16:496}\_R\} \cdot (1+j)/\sqrt{2}$;

$\{HES'_{-496:16:496}, 0, -HES'_{-496:16:496}, 0, -HES'_{-496:16:496}\} \cdot (1+j)/\sqrt{2}$; or $\{-HES'_{-496:16:496}, 0, HES'_{-496:16:496}, 0, HES'_{-496:16:496}\} \cdot (1+j)/\sqrt{2}$, where $HES'_{-496:16:496}\_L$ is represented as $\{M, 1, -M\}$, $HES'_{-496:16:496}\_R$ is represented as $\{-M, 1, -M\}$, $HES'_{-496:16:496}$ is represented as $\{M, 1, -M, 0, -M, 1, -M\}$, and $M=\{1, -1, -1, -1, 1, 1, 1, -1, 1, 1, 1, -1, 1, 1, 1, -1, 1\}$.

With reference to the first aspect, in some implementations of the first aspect, the bandwidth of the target channel is 240 MHz, and the frequency domain sequence of the short training field is any one of the following:

{HES'$_{-120:8:120}$,−1,−HES'$_{-120:8:120}$,0,HES'$_{-120:8:120}$,1, HES'$_{-120:8:120}$,0,−HES'$_{-120:8:120}$,−1,HES'$_{-120:8:120}$,0, HES'$_{-120:8:120}$,1,HES'$_{-120:8:120}$,0,HES'$_{-120:8:120}$,−1, −HES'$_{-120:8:120}$,0,−HES'$_{-120:8:120}$,1,−HES'$_{-120:8:120}$};

{HES'$_{-120:8:120}$,1,HES'$_{-120:8:120}$,0,HES'$_{-120:8:120}$,1, −HES'$_{-120:8:120}$,0,−HES'$_{-120:8:120}$,1,HES'$_{-120:8:120}$,−1, −HES'$_{-120:8:120}$,1,−HES'$_{-120:8:120}$,0,HES'$_{-120:8:120}$,1, −HES'$_{-120:8:120}$}; or

{−HES'$_{-120:8:120}$,−1,−HES'$_{-120:8:120}$,0,−HES'$_{-120:8:120}$, −1,HES'$_{-120:8:120}$,1,HES'$_{-120:8:120}$,−1, HES'$_{-120:8:120}$,0, HES'$_{-120:8:120}$,−1,−HES'$_{-120:8:120}$,1,HES'$_{-120:8:120}$,−1, HES'$_{-120:8:120}$,0,−HES'$_{-120:8:120}$,−1,HES'$_{-120:8:120}$}, where HES'$_{-120:8:120}$ is represented as {M,0,−M}, and M={1,−1,−1,−1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES'$_{-1016:8:1016}$_L,0,HES'$_{-1016:8:1016}$_R,0, HES'$_{-504:8:504}$}·(1+j)/√2;

{HES'$_{-1016:8:1016}$_L,1,HES'$_{-1016:8:1016}$_R,0, HES'$_{-504:8:504}$}·(1+j)/√2;

{−HES'$_{-504:8:504}$,0,HES'$_{-1016:8:1016}$_L,0, HES'$_{-1016:8:1016}$_R}·(1+j)/√2; or

{−HES'$_{-504:8:504}$,0,HES'$_{-1016:8:1016}$_L,1, HES'$_{-1016:8:1016}$_R}·(1+j)/√2, where HES'$_{-1016:8:1016}$_L={M,−1,M,−M,−1,M,0,−M,1,M,1, −M,1,−M}, HES'$_{-1016:8:1016}$_R={−M,1,−M,1,M,1,−M,0, −M,1,M,1,−M,1,−M}, HES'$_{-504:8:504}$ is represented as {M, −1,M,−1,−M,−1,M,0,−M,1,M,1,−M,1,−M}, and M={−1, −1,−1,1,1,1,−1,1,1,1,−1,1,1,−1,1}.

With reference to the first aspect, in some implementations of the first aspect, the bandwidth of the target channel is 240 MHz, and the frequency domain sequence of the short training field is any one of the following:

{HES'$_{-504:8:504}$_L,−1,HES'$_{-504:8:504}$_R,1, −HES'$_{-504:8:504}$_L,0,HES'$_{-504:8:504}$_R,−1, HES'$_{-504:8:504}$_L,−1,HES'$_{-504:8:504}$_R}·(1+j)/√2;

{HES'$_{-504:8:504}$_L,0,HES'$_{-504:8:504}$_R,1, −HES'$_{-504:8:504}$_L,0,HES'$_{-504:8:504}$_R,−1,HES'$_{-504:8:504}$_L, 0,HES'$_{-504:8:504}$_R}·(1+j)/√2;

{HES'$_{-504:8:504}$_L,0,HES'$_{-504:8:504}$_R,0, −HES'$_{-504:8:504}$_L,0,HES'$_{-504:8:504}$_R,0,HES'$_{-504:8:504}$_L,0, HES'$_{-504:8:504}$_R}·(1+j)/√2;

{HES'$_{-504:8:504}$,0,−HES'$_{-504:8:504}$,0,−HES'$_{-504:8:504}$}·(1+j)/√2; or

{−HES'$_{-504:8:504}$,0,HES'$_{-504:8:504}$,0,HES'$_{-504:8:504}$}·(1+j)/√2, where HES'$_{-504:8:504}$_L is represented as {M,−1,M,−1,−M,−1, M}, HES'$_{-504:8:504}$_R is represented as {−M,1,M,1,−M,1, −M}, HES'$_{-504:8:504}$ is represented as {M,−1,M,−1,−M,−1, M,0,−M,1,M,1,−M,1,−M}, and M={−1,−1,−1,1,1,1,−1,1,1, 1,−1,1,1,−1,1}.

With reference to the first aspect, in some implementations of the first aspect, the bandwidth of the target channel is 320 MHz, and the frequency domain sequence of the short training field is any one of the following:

{−HES'$_{-112:16:112}$,1,HES'$_{-112:16:112}$,0,−HES'$_{-112:16:112}$,1, HES'$_{-112:16:112}$,0,HES'$_{-112:16:112}$,−1,−HES'$_{-112:16:112}$,0, HES'$_{-112:16:112}$,−1,HES'$_{-112:16:112}$,0,HES'$_{-112:16:112}$,1, −HES'$_{-112:16:112}$,0,HES'$_{-112:16:112}$, 1,HES'$_{-112:16:112}$, 0,HES'$_{-112:16:112}$,−1,−HES'$_{-112:16:112}$,0,−HES'$_{-112:16:112}$,1, −HES'$_{-112:16:112}$}·(1+j)/√2;

{HES'$_{-112:16:112}$,1,HES'$_{-112:16:112}$,0,−HES'$_{-112:16:112}$,1, −HES'$_{-112:16:112}$,0,−HES'$_{-112:16:112}$,1, HES'$_{-112:16:112}$,0, −HES'$_{-112:16:112}$,1,−HES'$_{-112:16:112}$,0,−HES'$_{-112:16:112}$,1, −HES'$_{-112:16:112}$}·(1+j)/√2;

−HES'$_{-112:16:112}$,0,−HES'$_{-112:16:112}$, 1, HES'$_{-112:16:112}$,0, −HES'$_{-112:16:112}$,1,HES'$_{-112:16:112}$,0,HES'$_{-112:16:112}$,1, −HES'$_{-112:16:112}$}·(1+j)/√2;

{HES'$_{-112:16:112}$,1,HES'$_{-112:16:112}$,0,HES'$_{-112:16:112}$,1, −HES'$_{-112:16:112}$,0,HES'$_{-112:16:112}$,1,−HES'$_{-112:16:112}$,0, −HES'$_{-112:16:112}$,1,−HES'$_{-112:16:112}$,0,−HES'$_{-112:16:112}$,1, −HES'$_{-112:16:112}$,0,HES'$_{-112:16:112}$, 1,−HES'$_{-112:16:112}$, 0,−HES'$_{-112:16:112}$,1,−HES'$_{-112:16:112}$,0,HES'$_{-112:16:112}$,1, HES'$_{-112:16:112}$}·(1+j)/√2; or

{HES'$_{-112:16:112}$,1,−HES'$_{-112:16:112}$,0,−HES'$_{-112:16:112}$, 1,−HES'$_{-112:16:112}$,0,HES'$_{-112:16:112}$,1, HES'$_{-112:16:112}$,0, −HES'$_{-112:16:112}$,1,−HES'$_{-112:16:112}$,0,HES'$_{-112:16:112}$, 1,−HES'$_{-112:16:112}$,0,−HES'$_{-112:16:112}$,1,HES'$_{-112:16:112}$,0, −HES'$_{-112:16:112}$,1,HES'$_{-112:16:112}$,0,HES'$_{-112:16:112}$,1, HES'$_{-112:16:112}$}·(1+j)/√2, where HES'$_{-112:16:112}$ is represented as {M}, and M={−1,−1,−1,1,1,1,−1,1,1,1,−1,1,1,−1,1}.

With reference to the first aspect, in some implementations of the first aspect, the bandwidth of the target channel is 320 MHz, and the frequency domain sequence of the short training field is any one of the following:

{HES'$_{-1008:16:1008}$,0,HES'$_{-1008:16:1008}$}·(1+j)/√2;
{−HES'$_{-1008:16:1008}$,0,−HES'$_{-1008:16:1008}$}·(1+j)/√2;
{HES'$_{-1008:16:1008}$,0,−HES'$_{-1008:16:1008}$}·(1+j)/√2;
{−HES'$_{-1008:16:1008}$,0,HES'$_{-1008:16:1008}$}·(1+j)/√2; or
{−HES'$_{-1008:16:1008}$_L,−1,−HES'$_{-1008:16:1008}$_R,0, HES'$_{-1008:16:1008}$_L,−1,HES'$_{-1008:16:1008}$_R}·(1+j)/√2, where HES'$_{-1008:16:1008}$ is represented as {M,1,−M,0,−M,1,−M, 0,−M,−1,M,0,−M,1,−M}, HES'$_{-1008:16:1008}$_L is represented as {M,1,−M,0,−M,1,−M}, HES'$_{-1008:16:1008}$_R is represented as {−M,−1,M,0,−M,1,−M}, and M={−1,−1,−1,1,1, 1,−1,1,1,1,−1,1,1,−1,1}.

With reference to the first aspect, in some implementations of the first aspect, the bandwidth of the target channel is 320 MHz, and the frequency domain sequence of the short training field is any one of the following:

{HES'$_{-496:16:496}$_L,0,−HES'$_{-496:16:496}$_R,0, HES'$_{-496:16:496}$_L,0,−HES'$_{-496:16:496}$_R,0, −HES'$_{-496:16:496}$_L,0,−HES'$_{-496:16:496}$_R,0, HES'$_{-496:16:496}$_L,0,HES'$_{-496:16:496}$_R}·(1+j)/√2;

{−HES'$_{-496:16:496}$_L,0,HES'$_{-496:16:496}$_R,0, −HES'$_{-496:16:496}$_L,0,HES'$_{-496:16:496}$_R,0, HES'$_{-496:16:496}$_L,0,HES'$_{-496:16:496}$_R,0, −HES'$_{-496:16:496}$_L,0,−HES'$_{-496:16:496}$_R}·(1+j)/√2;

{HES'$_{-496:16:496}$,0,−HES'$_{-496:16:496}$,0,−HES'$_{-496:16:496}$, 0,−HES'$_{-496:16:496}$}·(1+j)/√2; or

{−HES'$_{-496:16:496}$,0,HES'$_{-496:16:496}$,0,HES'$_{-496:16:496}$,0, HES'$_{-496:16:496}$}·(1+j)/√2, where HES'$_{-496:16:496}$_L is represented as {M,1,−M}, HES'$_{-496:16:496}$_R is represented as {−M,1,−M}, HES'$_{-496:16:496}$ is represented as {M,1,−M,0,−M,1,−M}, and M={1,−1,−1,−1,1,1,1,−1,1,1,1,−1,1,1,−1,1}.

With reference to the first aspect, in some implementations of the first aspect, the bandwidth of the target channel is 320 MHz, and the frequency domain sequence of the short training field is any one of the following:

{HES'$_{-120:8:120}$,1,−HES'$_{-120:8:120}$,0,HES'$_{-120:8:120}$, 1,−HES'$_{-120:8:120}$,0,HES'$_{-120:8:120}$,−1,−HES'$_{-120:8:120}$,0, −HES'$_{-120:8:120}$,1,HES'$_{-120:8:120}$,0,−HES'$_{-12118:120}$, L,−HES'$_{-120:8:120}$,0,HES'$_{-120:8:120}$,−1,HES'$_{-120:8:120}$,0, −HES'$_{-120:8:120}$,−1,−HES'$_{-120:8:120}$,0,−HES'$_{-120:8:120}$,1, −HES'$_{-120:8:120}$};

{HES'$_{-120:8:120}$,1,HES'$_{-120:8:120}$,0,HES'$_{-120:8:120}$,−1, HES'$_{-120:8:120}$,0,−HES'$_{-120:8:120}$,−1,−HES'$_{-120:8:120}$,0, HES'$_{-120:8:120}$,1,HES'$_{-120:8:120}$,0,−HES'$_{-120:8:120}$,1, $HES'_{-120:8:120}, 0, HES'_{-120:8:120}, -1, -HES'_{-120:8:120}, 0,$
$HES'_{-120:8:120}, 1, -HES'_{-120:8:120}, 0, HES'_{-120:8:120}, 1,$
$-HES'_{-120:8:120}\}$; or
$\{-HES'_{-120:8:120}, 1, HES'_{-120:8:120}, 0, -HES'_{-120:8:120}, -1,$
$HES'_{-120:8:120}, 0, -HES'_{-120:8:120}, 1, HES'_{-120:8:120}, 0,$
$HES'_{-120:8:120}, -1, -HES'_{-120:8:120}, 0, HES'_{-120:8:120},$
$1, HES'_{-120:8:120}, 0, -HES'_{-120:8:120}, 1, -HES'_{-120:8:120}, 0,$
$HES'_{-120:8:120}, 1, HES'_{-120:8:120}, 0, HES'_{-120:8:120}, -1,$
$HES'_{-120:8:120}\}$, where $HES'_{-120:8:120}$ is represented as $\{M, 0, -M\}$, and $M=\{1, -1, -1, -1, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

$\{HES'_{-1016:8:1016}, 0, HES'_{-1016:8:1016}\} \cdot (1+j)/\sqrt{2}$;
$\{-HES'_{-1016:8:1016}, 0, -HES'_{-1016:8:1016}\} \cdot (1+j)/\sqrt{2}$;
$\{HES'_{-1016:8:1016}, 0, -HES'_{-1016:8:1016}\} \cdot (1+j)/\sqrt{2}$;
$\{-HES'_{-1016:8:1016}, 0, HES'_{-1016:8:1016}\} \cdot (1+j)/\sqrt{2}$; or
$\{HES'_{-1016:8:1016}\_L, 1, HES'_{-1016:8:1016}\_R, 0,$
$HES'_{-1016:8:1016}\_L, -1, -HES'_{-1016:8:1016}\_R\} \cdot (1+j)/\sqrt{2}$,
where $HES'_{-1016:8:1016}$ is represented as $\{M, -1, M, -M, -1, M, 0, -M, 1, M, 1, -M, 1, -M, 0, -M, 1, -M, 1, M, 1, -M, 0, -M, 1, M, 1, -M, 1, -M\}$, $HES'_{-1016:8:1016}\_L$ is represented as $\{M, -1, M, -M, -1, M, 0, -M, 1, M, 1, -M, 1, -M\}$, $HES'_{-1016:8:1016}\_R$ is represented as $\{-M, 1, -M, 1, M, 1, -M, 0, -M, 1, M, 1, -M, 1, -M\}$, and $M=\{1, -1, -1, -1, 1, 1, 1, -1, 1, 1, 1, -1, 1, 1, -1, 1\}$.

With reference to the first aspect, in some implementations of the first aspect, the bandwidth of the target channel is 320 MHz, and the frequency domain sequence of the short training field is any one of the following:

$\{HES'_{-504:8:504}, 0, HES'_{-504:8:504}, 0, HES'_{-504:8:504}, 0,$
$-HES'_{-504:8:504}\} \cdot (1+j)/\sqrt{2}$; or
$\{-HES'_{-504:8:504}, 0, HES'_{-504:8:504}, 0, HES'_{-504:8:504}, 0,$
$HES'_{-504:8:504}\} \cdot (1+j)/\sqrt{2}$, where $HES'_{-504:8:504}$ is represented as $\{M, -1, M, -1, -M, -1, M, 0, -M, 1, M, 1, -M, 1, -M\}$, and $M=\{1, -1, -1, -1, 1, 1, 1, -1, 1, 1, 1, -1, 1, 1, -1, 1\}$.

According to a second aspect, another method for transmitting a physical layer protocol data unit is provided. The method includes: receiving a physical layer protocol data unit PPDU on a target channel, where the PPDU includes a short training field, a length of a frequency domain sequence of the short training field is greater than a first length, the first length is a length of a frequency domain sequence of a short training field of a PPDU transmitted on a channel with a bandwidth of 160 MHz, and a bandwidth of the target channel is greater than 160 MHz; and parsing the PPDU.

With reference to the second aspect, in some implementations of the second aspect, the bandwidth of the target channel is 240 MHz, and the frequency domain sequence of the short training field is any one of the following:

$\{HES'_{-112:16:112}, -1, -HES'_{-112:16:112}, 0, HES'_{-112:16:112}, -1,$
$HES'_{-112:16:112}, 0, -HES'_{-112:16:112}, -1, HES'_{-112:16:112}, 0,$
$-HES'_{-112:16:112}, 1, HES'_{-112:16:112}, 0, HES'_{-112:16:112}, 1,$
$-HES'_{-112:16:112}, 0, -HES'_{-112:16:112}, 1, -HES'_{-112:16:112}\} \cdot (1+j)/\sqrt{2}$;

$\{-HES'_{-112:16:112}, 1, -HES'_{-112:16:112}, 0, -HES'_{-112:16:112},$
$1, -HES'_{-112:16:112}, 0, HES'_{-112:16:112}, 1, -HES'_{-112:16:112}, 0,$
$HES'_{-112:16:1129}, -1, -HES'_{-112:16:112}, 0, -HES'_{-112:16:112}, -$
$HES'_{-112:16:112}, 0, HES'_{-112:16:112}, -1, -HES'_{-112:16:112}\} \cdot (1+j)/\sqrt{2}$; or $\{HES'_{-112:16:112}, 1, HES'_{-112:16:112}, 0, HES'_{-112:16:112}, 1,$
$-HES'_{-112:16:112}, -1, -HES'_{-112:16:112}, 1, -HES'_{-112:16:112}, 0,$
$-HES'_{-112:16:112}, 1, HES'_{-112:16:112}, -1, -HES'_{-112:16:112}, 1,$
$-HES'_{-112:16:112}, 0, HES'_{-112:16:112}, 1, -HES'_{-112:16:112}\} \cdot (1+j)/\sqrt{2}$, where $HES'_{-112:16:112}$ is represented as $\{M\}$, and $M=\{-1, -1, -1, 1, 1, 1, -1, 1, 1, 1, -1, 1, 1, -1, 1\}$.

With reference to the second aspect, in some implementations of the second aspect, the bandwidth of the target channel is 240 MHz, and the frequency domain sequence of the short training field is any one of the following:

$\{HES'_{-1008:16:1008}\_L, 0, HES'_{-1008:16:1008}\_R, 0,$
$HES'_{-496:16:496}\} \cdot (1+j)/\sqrt{2}$;

$\{-HES'_{-1008:16:1008}\_L, 0, -HES'_{-1008:16:1008}\_R,$
$0, -HES'_{-496:16:496}\} \cdot (1+j)/\sqrt{2}$;

$\{HES'_{-496:16:496}, 0, -HES'_{-1008:16:1008}\_L, 0,$
$-HES'_{-1008:16:1008}\_R\} \cdot (1+j)/\sqrt{2}$; or $\{-HES'_{-496:16:496}, 0, HES'_{-1008:16:1008}\_L, 0,$
$HES'_{-1008:16:1008}\_R\} \cdot (1+j)/\sqrt{2}$, where $HES'_{-1008:16:1008}\_L$ is represented as $\{M, 1, -M, 0, -M, 1, -M\}$, $HES'_{-1008:16:1008}\_R$ is represented as $\{-M, -1, M, 0, -M, 1, -M\}$, $HES'_{-496:16:496}$ is represented as $\{M, 1, -M, 0, -M, 1, -M\}$, and $M=\{-1, -1, -1, 1, 1, 1, -1, 1, 1, 1, -1, 1, 1, -1, 1\}$.

With reference to the second aspect, in some implementations of the second aspect, the bandwidth of the target channel is 240 MHz, and the frequency domain sequence of the short training field is any one of the following:

$\{HES'_{-496:16:496}\_L, 0, -HES'_{-496:16:496}\_R, 0,$
$-HES'_{-496:16:496}\_L, 0, HES'_{-496:16:496}\_R, 0,$
$-HES'_{-496:16:496}\_L, 0, -HES'_{-496:16:496}\_R\} \cdot (1+j)/\sqrt{2}$;

$\{-HES'_{-496:16:496}\_L, 0, HES_{-496:16:496}\_R,$
$0, HES'_{-496:16:496}\_L, 0, -HES'_{-496:16:496}\_R, 0,$
$HES'_{-496:16:496}\_L, 0, HES'_{-496:16:496}\_R\} \cdot (1+j)/\sqrt{2}$;

$\{HES'_{-496:16:496}, 0, -HES'_{-496:16:496}, 0, -HES'_{-496:16:496}\} \cdot (1+j)/\sqrt{2}$; or $\{-HES'_{-496:16:496}, 0, HES'_{-496:16:496}, 0, HES'_{-496:16:496}\} \cdot (1+j)/\sqrt{2}$, where $HES'_{-496:16:496}\_L$ is represented as $\{M, 1, -M\}$, $HES'_{-496:16:496}\_R$ is represented as $\{-M, 1, -M\}$, $HES'_{-496:16:496}$ is represented as $\{M, 1, -M, 0, -M, 1, -M\}$, and $M=\{-1, -1, -1, 1, 1, 1, -1, 1, 1, 1, -1, 1, 1, -1, 1\}$.

With reference to the second aspect, in some implementations of the second aspect, the bandwidth of the target channel is 240 MHz, and the frequency domain sequence of the short training field is any one of the following:

$\{HES'_{-120:8:120}, -1, -HES'_{-120:8:120}, 0, HES'_{-120:8:120},$
$1, HES'_{-120:8:120}, 0, -HES'_{-120:8:120}, -1, HES'_{-120:8:120}, 0,$
$HES'_{-120:8:120}, 1, HES'_{-120:8:120}, 0, HES'_{-120:8:120}, -1,$
$-HES'_{-120:8:120}, 0, -HES'_{-120:8:120}, 1, -HES'_{-120:8:120}\}$;

$\{HES'_{-120:8:120}, 1, HES'_{-120:8:120}, 0, HES'_{-120:8:120}, 1,$
$-HES'_{-120:8:120}, -1, -HES'_{-120:8:120}, \quad 1, -HES'_{-120:8:120},$
$0, -HES'_{-120:8:120}, 1, HES'_{-120:8:120}, -1, -HES'_{-120:8:120}, 0,$
$HES'_{-120:8:120}, 1, -HES'_{-120:8:120}\}$; or $\{-HES'_{-120:8:120}, -1, -HES'_{-120:8:120}, 0, -HES'_{-120:8:120},$
$-1, HES'_{-120:8:120}, 1, HES'_{-120:8:120}, -1, \quad HES'_{-120:8:120}, 0,$
$HES'_{-120:8:120}, -1, -HES'_{-120:8:120}, 1, HES'_{-120:8:120}, -1,$
$HES'_{-120:8:120}, 0, -HES'_{-120:8:120}, -1, HES'_{-120:8:120}\}$, where $HES'_{-120:8:120}$ is represented as $\{M, 0, -M\}$, and $M=\{1, -1, -1, -1, 1, 1, 1, -1, 1, 1, 1, -1, 1, 1, -1, 1\}$.

With reference to the second aspect, in some implementations of the second aspect, the bandwidth of the target channel is 240 MHz, and the frequency domain sequence of the short training field is any one of the following:

$\{HES'_{-1016:8:1016}\_L, 0, HES'_{-1016:8:1016}\_R, 0,$
$HES'_{-504:8:504}\} \cdot (1+j)/\sqrt{2}$;

$\{HES'_{-1016:8:1016}\_L, 1, HES'_{-1016:8:1016}\_R, 0,$
$HES'_{-504:8:504}\} \cdot (1+j)/\sqrt{2}$;

$\{-HES'_{-504:8:504}, 0, HES'_{-1016:8:1016}\_L, 0,$
$HES'_{-1016:8:1016}\_R\} \cdot (1+j)/\sqrt{2}$; or $\{-HES'_{-504:8:504}, 0, HES'_{-1016:8:1016}\_L, 1,$
$HES'_{-1016:8:1016}\_R\} \cdot (1+j)/\sqrt{2}$, where $HES'_{-1016:8:1016}\_L = \{M, -1, M, -M, -1, M, 0, -M, 1, M, 1, -M, 1, -M\}$, $HES'_{-1016:8:1016}\_R = \{-M, 1, -M, 1, M, 1, -M, 0, -M,$ 1,M,1,-M,1,-M}, HES'$_{-504:8:504}$ is represented as {M,-1, M,-1,-M,-1,M,0,-M,1,M,1,-M,1,-M}, and M={-1,-1,-1, 1,1,1,-1,1,1,1,-1,1,1,-1,1}.

With reference to the second aspect, in some implementations of the second aspect, the bandwidth of the target channel is 240 MHz, and the frequency domain sequence of the short training field is any one of the following:

{HES'$_{-504:8:504}$_L,-1,HES'$_{-504:8:504}$_R,1, -HES'$_{-504:8:504}$_L,0,HES'$_{-504:8:504}$_R,-1, HES'$_{-504:8:504}$_L,-1,HES'$_{-504:8:504}$_R}·(1+j)/$\sqrt{2}$;

{HES'$_{-504:8:504}$_L,0,HES'$_{-504:8:504}$_R,1, -HES'$_{-504:8:504}$_L,0,HES'$_{-504:8:504}$_R,-1,HES'$_{-504:8:504}$_L, 0,HES'$_{-504:8:504}$_R}·(1+j)/$\sqrt{2}$;

{HES'$_{-504:8:504}$_L,0,HES'$_{-504:8:504}$_R,0, -HES'$_{-504:8:504}$_L,0,HES'$_{-504:8:504}$_R,0,HES'$_{-504:8:504}$_L,0, HES'$_{-504:8:504}$_R}·(1+j)/$\sqrt{2}$;

{HES'$_{-504:8:504}$,0,-HES'$_{-504:8:504}$,0,-HES'$_{-504:8:504}$}·(1+j)/$\sqrt{2}$; or {-HES'$_{-504:8:504}$,0,HES'$_{-504:8:504}$,0,HES'$_{-504:8:504}$}·(1+j)/$\sqrt{2}$, where HES'$_{-504:8:504}$_L is represented as {M,-1,M,-1,-M,-1, M}, HES'$_{-504:8:504}$_R is represented as {-M,1,M,1,-M,1, -M}, HES'$_{-504:8:504}$ is represented as {M,-1,M,-1,-M,-1, M,0,-M,1,M,1,-M,1,-M}, and M={-1,-1,-1,1,1,1,-1,1,1, 1,-1,1,1,-1,1}.

With reference to the second aspect, in some implementations of the second aspect, the bandwidth of the target channel is 320 MHz, and the frequency domain sequence of the short training field is any one of the following:

{-HES'$_{-112:16:112}$,1,HES'$_{-112:16:112}$,-HES'$_{-112:16:112}$,1, HES'$_{-112:16:112}$,0,HES'$_{-112:16:112}$,-1,-HES'$_{112:16:112}$,0, HES'$_{-112:16:112}$,-1,HES'$_{-112:16:112}$,0,HES'$_{-112:16:112}$,1, -HES'$_{-112:16:112}$,0,HES'$_{-112:16:112}$, 1,HES'$_{-112:16:112}$, 0,HES'$_{-112:16:112}$,-1,-HES'$_{-112:16:112}$,0,-HES'$_{-112:16:112}$,1, -HES'$_{-112:16:112}$}·(1+j)/$\sqrt{2}$;

{HES'$_{-112:16:112}$,1,HES'$_{-112:16:112}$,0,-HES'$_{-112:16:112}$, 1,-HES'$_{-112:16:112}$,0,-HES'$_{-112:16:112}$,1,-HES'$_{-112:16:112}$, 0,-HES'$_{-112:16:112}$,1,-HES'$_{-112:16:112}$,0,-HES'$_{-112:16:112}$, 1,-HES'$_{-112:16:112}$,0,-HES'$_{-112:16:112}$, 1,HES'$_{-112:16:112}$, 0,-HES'$_{-112:16:112}$,1,HES'$_{-112:16:112}$,0,HES'$_{-112:16:112}$, 1,-HES'$_{-112:16:112}$}·(1+j)/$\sqrt{2}$;

{-HES'$_{-112:16:112}$,1,HES'$_{-112:16:112}$,0,HES'$_{-112:16:112}$,1, -HES'$_{-112:16:112}$,0,HES'$_{-112:16:112}$,1,-HES'$_{-112:16:112}$, 0,-HES'$_{-112:16:112}$,1,-HES'$_{-112:16:112}$,0,-HES'$_{-112:16:112}$, 1,-HES'$_{-112:16:112}$,0,-HES'$_{-112:16:112}$, 1,-HES'$_{-112:16:112}$, 0,-HES'$_{-112:16:112}$,1,-HES'$_{-112:16:112}$,0,HES'$_{-112:16:112}$,1, HES'$_{-112:16:112}$}·(1+j)/$\sqrt{2}$; or {HES'$_{-112:16:112}$,1,-HES'$_{-112:16:112}$,0,-HES'$_{-112:16:112}$, 1,-HES'$_{-112:16:112}$,0,HES'$_{-112:16:112}$,1, HES'$_{-112:16:112}$, 0,-HES'$_{-112:16:112}$,1,-HES'$_{-112:16:112}$,0,HES'$_{-112:16:112}$,1, -HES'$_{-112:16:112}$,0,-HES'$_{-112:16:112}$, 1,HES'$_{-112:16:112}$, 0,-HES'$_{-112:16:112}$,1,HES'$_{-112:16:112}$,0,HES'$_{-112:16:112}$,1, HES'$_{-112:16:112}$}·(1+j)/$\sqrt{2}$, where HES'$_{-112:16:112}$ is represented as {M}, and M={-1, -1,-1,1,1,-1,1,1,1,-1,1,1,-1,1}.

With reference to the second aspect, in some implementations of the second aspect, the bandwidth of the target channel is 320 MHz, and the frequency domain sequence of the short training field is any one of the following:

{HES'$_{-1008:16:1008}$,0,HES'$_{-1008:16:1008}$}·(1+j)/$\sqrt{2}$;
{-HES'$_{-1008:16:1008}$,0,-HES'$_{-1008:16:1008}$}·(1+j)/$\sqrt{2}$;
{HES'$_{-1008:16:1008}$,0,-HES'$_{-1008:16:1008}$}·(1+j)/$\sqrt{2}$;
{-HES'$_{-1008:16:1008}$,0,HES'$_{-1008:16:1008}$}·(1+j)/$\sqrt{2}$; or
{-HES'$_{-1008:16:1008}$_L,-1,-HES'$_{-1008:16:1008}$_R,0, HES'$_{-1008:16:1008}$_L,-1,HES'$_{-1008:16:1008}$_R}·(1+j)/$\sqrt{2}$, where HES'$_{-1008:16:1008}$ is represented as {M,1,-M,0,-M,1,-M, 0,-M,-1,M,0,-M,1,-M}, HES'$_{-1008:16:1008}$_L is represented as {M,1,-M,0,-M,1,-M}, HES'$_{-1008:16:1008}$_R is represented as {-M,-1,M,0,-M,1,-M}, and M={-1,-1,-1,1,1, 1,-1,1,1,1,-1,1,1,-1,1}.

With reference to the second aspect, in some implementations of the second aspect, the bandwidth of the target channel is 320 MHz, and the frequency domain sequence of the short training field is any one of the following:

{HES'$_{-496:16:496}$_L,0,-HES'$_{-496:16:496}$_R,0, HES'$_{-496:16:496}$_L,0,-HES'$_{-496:16:496}$_R,0, -HES'$_{-496:16:496}$_L,0,-HES'$_{-496:16:496}$_R,0, HES'$_{-496:16:496}$_L,0,HES'$_{-496:16:496}$_R}·(1+j)/$\sqrt{2}$;

{-HES'$_{-496:16:496}$_L,0,HES'$_{-496:16:496}$_R,0, -HES'$_{-496:16:496}$_L,0,HES'$_{-496:16:496}$_R,0, HES'$_{-496:16:496}$_L,0,HES'$_{-496:16:496}$_R,0, -HES'$_{-496:16:496}$_L,0,-HES'$_{-496:16:496}$_R}·(1+j)/$\sqrt{2}$;

{HES'$_{-496:16:496}$,0,-HES'$_{-496:16:496}$,0,-HES'$_{-496:16:496}$, 0,-HES'$_{-496:16:496}$}·(1+j)/$\sqrt{2}$; or {-HES'$_{-496:16:496}$,0,HES'$_{-496:16:496}$,0,HES'$_{-496:16:496}$,0, HES'$_{-496:16:496}$}·(1+j)/$\sqrt{2}$, where HES'$_{-496:16:496}$_L, is represented as {M,1,-M}, HES'$_{-496:16:496}$_R is represented as {-M,1,-M}, HES'$_{-496:16:496}$ is represented as {M,1,-M,0,-M,1,-M}, and M={-1,-1,-1,1,1,1,-1,1,1,1,-1,1,1,-1,1}.

With reference to the second aspect, in some implementations of the second aspect, the bandwidth of the target channel is 320 MHz, and the frequency domain sequence of the short training field is any one of the following:

{HES'$_{-120:8:120}$,1,-HES'$_{-120:8:120}$,0,HES'$_{-120:8:120}$, 1,-HES'$_{-120:8:120}$,0,HES'$_{-120:8:120}$,-1,-HES'$_{-120:8:120}$,0, -HES'$_{-120:8:120}$,1,HES'$_{-120:8:120}$,0,-HES'$_{-120:8:120}$,1, -HES'$_{-120:8:120}$,0,HES'$_{-120:8:120}$,-1,HES'$_{-120:8:120}$,0, -HES'$_{-120:8:120}$,-1,-HES'$_{-120:8:120}$,0,-HES'$_{-120:8:120}$,1, -HES'$_{-120:8:120}$};

{HES'$_{-120:8:120}$,1,HES'$_{-120:8:120}$,0,HES'$_{-120:8:120}$,-1, HES'$_{-120:8:120}$,0,-HES'$_{-120:8:120}$,-1,-HES'$_{-120:8:120}$,0, HES'$_{-120:8:120}$,1,HES'$_{-120:8:120}$,0,-HES'$_{-120:8:120}$,1, HES'$_{-120:8:120}$,0,-HES'$_{-120:8:120}$,-1,-HES'$_{-120:8:120}$,0, HES'$_{-120:8:120}$,1,-HES'$_{-120:8:120}$,0,HES'$_{-120:8:120}$,1, -HES'$_{-120:8:120}$}; or

{-HES'$_{-120:8:120}$,1,HES'$_{-120:8:120}$,0,-HES'$_{-120:8:120}$,-1, HES'$_{-120:8:120}$,0,-HES'$_{-120:8:120}$,1,HES'$_{-120:8:120}$,0, HES'$_{-120:8:120}$,-1,-HES'$_{-120:8:120}$,0,HES'$_{-120:8:120}$,1, HES'$_{-120:8:120}$,0,-HES'$_{-120:8:120}$,1,-HES'$_{-120:8:120}$,0, HES'$_{-120:8:120}$,1,HES'$_{-120:8:120}$,0,HES'$_{-120:8:120}$,-1, HES'$_{-120:8:120}$}, where HES'$_{-120:8:120}$ is represented as {M,0,-M}, and M={1, -1,-1,-1,1,1,1,-1,1,1,1,1,-1,1,1,-1,1}.

With reference to the second aspect, in some implementations of the second aspect, the bandwidth of the target channel is 320 MHz, and the frequency domain sequence of the short training field is any one of the following:

{HES'$_{-1016:8:1016}$,0,HES'$_{-1016:8:1016}$}·(1+j)/$\sqrt{2}$;
{-HES'$_{-1016:8:1016}$,0,-HES'$_{-1016:8:1016}$}·(1+j)/$\sqrt{2}$;
{HES'$_{-1016:8:1016}$,0,-HES'$_{-1016:8:1016}$}·(1+j)/$\sqrt{2}$;
{-HES'$_{-1016:8:1016}$,0,HES'$_{-1016:8:1016}$}·(1+j)/$\sqrt{2}$; or
HES'$_{-1016:8:1016}$_L,1,HES'$_{-1016:8:1016}$_R,0, HES'$_{-1016:8:1016}$_L,-1,-HES'$_{-1016:8:1016}$_R}·(1+j)/$\sqrt{2}$, where HES'$_{-1016:8:1016}$ is represented as {M,-1,M,-M,-1, M,0,-M,1,M,1,-M,1,-M,0,-M,1,-M,-1,M,1,-M,0,-M,1,M, 1,-M,1,-M}, HES'$_{-1016:8:1016}$_L is represented as {M,-1, M,-M,-1,M,0,-M,1,M,1,-M,1,-M}, HES'$_{-1016:8:1016}$_R is represented as {-M,1,-M,1,M,1,-M,0,-M,1,M,1,-M,1,- M}, and M={1,-1,-1,-1,1,1,1,-1,1,1,1,-1,1,1,-1,1}.

With reference to the second aspect, in some implementations of the second aspect, the bandwidth of the target channel is 320 MHz, and the frequency domain sequence of the short training field is any one of the following:

$\{HES'_{-504:8:504}, 0, HES'_{-504:8:504}, 0, HES'_{-504:8:504}, 0, -HES'_{-504:8:504}\} \cdot (1+j)/\sqrt{2}$; or $\{-HES'_{-504:8:504}, 0, HES'_{-504:8:504}, 0, HES'_{-504:8:504}, 0, HES'_{-504:8:504}\} \cdot (1+j)/\sqrt{2}$, where $HES'_{-504:8:504}$ is represented as $\{M, -1, M, -1, -M, -1, M, 0, -M, 1, M, 1, -M, 1, -M\}$, and $M = \{-1, -1, -1, 1, 1, 1, -1, 1, 1, 1, -1, 1, 1, 1, -1, 1\}$.

According to a third aspect, an apparatus for transmitting a physical layer protocol data unit is provided. The apparatus is configured to perform the method provided in the first aspect. The apparatus may include a module configured to perform any one of the first aspect or the possible implementations of the first aspect.

According to a fourth aspect, an apparatus for transmitting a physical layer protocol data unit is provided. The apparatus is configured to perform the method provided in the second aspect. The apparatus may include a module configured to perform any one of the second aspect or the possible implementations of the second aspect.

According to a fifth aspect, an apparatus for transmitting a physical layer protocol data unit is provided. The apparatus includes a processor. The processor is coupled to a memory and may be configured to execute instructions in the memory, to implement the method in any one of the first aspect and the possible implementations of the first aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a sixth aspect, an apparatus for transmitting a physical layer protocol data unit is provided. The apparatus includes a processor. The processor is coupled to a memory and may be configured to execute instructions in the memory, to implement the method in any one of the second aspect or the possible implementations of the second aspect. Optionally, the apparatus further includes the memory. Optionally, the apparatus further includes a communication interface, and the processor is coupled to the communication interface.

In an implementation, the apparatus is an access point. When the apparatus is an access point, the communication interface may be a transceiver, or an input/output interface.

In another implementation, the apparatus is a chip configured in an access point. When the apparatus is a chip configured in an access point, the communication interface may be an input/output interface.

In an implementation, the apparatus is a station. When the apparatus is a station, the communication interface may be a transceiver, or an input/output interface.

In another implementation, the apparatus is a chip configured in a station. When the apparatus is a chip configured in a station, the communication interface may be an input/output interface.

In another implementation, the apparatus is a chip or a chip system.

Optionally, the transceiver may be a transceiver circuit. Optionally, the input/output interface may be an input/output circuit.

According to a seventh aspect, a computer-readable storage medium is provided. The computer-readable storage medium stores a computer program, and when the computer program is executed by an apparatus, the apparatus is enabled to implement the method according to any one of the first aspect or the possible implementations of the first aspect.

According to an eighth aspect, a computer-readable storage medium is provided. The computer-readable storage medium stores a computer program, and when the computer program is executed by an apparatus, the apparatus is enabled to implement the method according to any one of the second aspect or the possible implementations of the second aspect.

According to a ninth aspect, a computer program product including instructions is provided. When the instructions are executed by a computer, an apparatus is enabled to implement the method provided in any one of the first aspect or the possible implementations of the first aspect.

According to a tenth aspect, a computer program product including instructions is provided. When the instructions are executed by a computer, an apparatus is enabled to implement the method provided in any one of the second aspect or the possible implementations of the second aspect.

According to an eleventh aspect, a communication system is provided. The communication system includes a transmit end and the receive end described above.

DETAILED DESCRIPTION OF THE EMBODIMENTS

The following describes the embodiments with reference to the accompanying drawings.

The embodiments may be applied to various communication systems, for example, a wireless local area network (WLAN) communication system, a global system for mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

For example, the following describes an application scenario in the embodiments and a method in the embodiments by using a WLAN system as an example.

The embodiments may be applied to a wireless local area network (WLAN), and any one of the 802.11 series protocols of the Institute of Electrical and Electronics Engineers (IEEE) currently used in the WLAN. The WLAN may include one or more basic service sets (BSS). A network node in the basic service set includes an access point (AP) and a station (,STA).

An initiating device and a responding device in the embodiments may be user stations (STAs) in the WLAN. The user station may also be referred to as a system, a subscriber unit, an access terminal, a mobile station, a mobile console, a remote station, a remote terminal, a mobile device, a user terminal, a terminal, a wireless communication device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communication function, a wearable device, a computing device, or another processing device connected to a wireless modem.

In addition, the initiating device and the responding device in the embodiments may alternatively be APs in the WLAN. The AP may be configured to: communicate with an access terminal through the wireless local area network and transmit data of the access terminal to a network side or transmit data from a network side to the access terminal.

Figure 1:
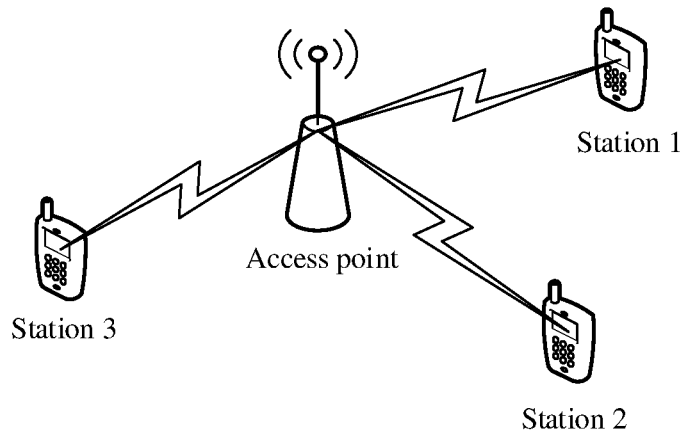
FIG. 1 is a schematic diagram of a communication system of a method applicable to an embodiment.

For ease of understanding the embodiments, a communication system shown in FIG. 1 is first used as an example to describe in detail a communication system applicable to the embodiments. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and the STA according to various standards. For example, wireless communication between the AP and the STA may be performed by using a single-user multiple-input multiple-output (SU-MIMO) technology or a multi-user multiple-input multiple-output (MU-MIMO) technology.

Figure 2:
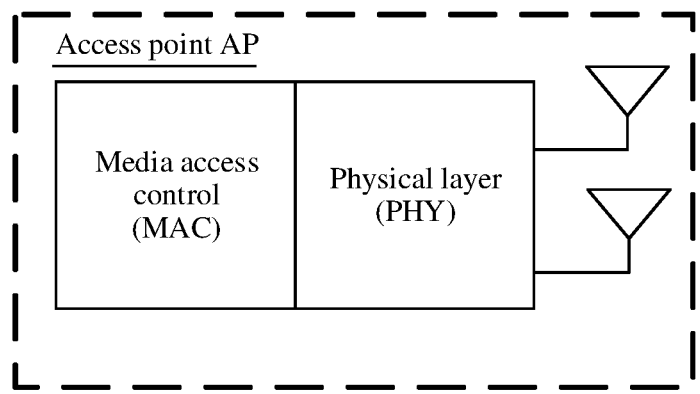
FIG. 2 is a diagram of an internal structure of an access point applicable to an embodiment.

The AP is also referred to as a wireless access point, a hotspot, or the like. The AP is an access point for a mobile user to access a wired network, and is mainly deployed in homes, buildings, and campuses, or is deployed outdoors. The AP is equivalent to a bridge that connects the wired network and a wireless network. A main function of the AP is to connect wireless network clients together, and then connect the wireless network to the Ethernet. The AP may be a terminal device or a network device with a wireless fidelity (Wi-Fi) chip. Optionally, the AP may be a device that supports a plurality of WLAN standards such as 802.11. FIG. 2 shows a diagram of an internal structure of an AP product. The AP may have a plurality of antennas or may have a single antenna. In FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on a PHY and MAC part, and the embodiments focus on protocols on the MAC and the PHY.

Figure 3:
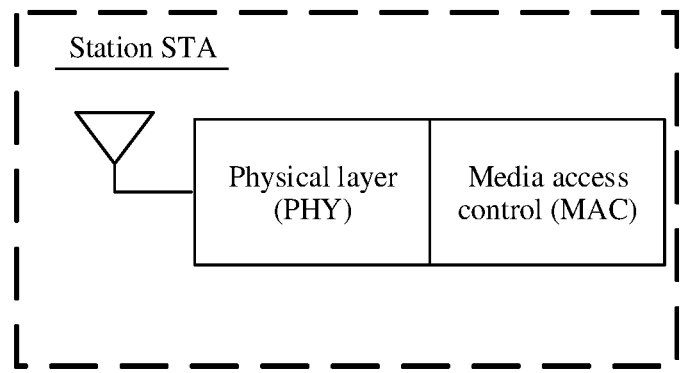
FIG. 3 is a diagram of an internal structure of a station applicable to an embodiment.

An STA product is usually a terminal product, for example, a mobile phone, or a notebook computer, that supports the 802.11 series standards. FIG. 3 shows a diagram of a structure of an STA with a single antenna. In an actual scenario, the STA may alternatively have a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

To greatly improve a service transmission rate of a WLAN system, the IEEE 802.11ax standard further uses an orthogonal frequency division multiple access (OFDMA) technology based on an existing orthogonal frequency division multiplexing (OFDM) technology. The OFDMA technology supports a plurality of nodes in sending and receiving data simultaneously. This achieves multi-station diversity gains.

From 802.11a, 802.11g, 802.11n, and 802.11ac to 802.11ax, available frequency bands include 2.4 gigahertz (GHz) and 5 GHz. With increasingly more available frequency bands, a maximum channel bandwidth supported by 802.11 is expanded from 20 megahertz (MHz) to 40 MHz and then to 160 MHz. In 2017, the Federal Communications Commission (FCC) opened up a new unlicensed frequency band of 6 GHz (5925 MHz to 7125 MHz). Drafters of the 802.11ax standard expanded an operating range of 802.11ax devices from 2.4 GHz and 5 GHz to 2.4 GHz, 5 GHz and 6 GHz in the 802.11ax project authorization request (PAR). Because an available bandwidth of the newly opened 6 GHz frequency band is larger, it can be predicted that a channel bandwidth greater than 160 MHz will be supported in a next-generation standard after 802.11ax.

Each generation of mainstream 802.11 protocols is compatible with legacy stations. For example, an 802.11a frame structure of an earliest generation of mainstream Wi-Fi starts with a preamble, and includes a legacy-short training field (L-STF), a legacy-long training field (L-LTF), and a legacy-signal field (L-SIG). To be compatible with a legacy station, a frame structure of subsequent 802.11 and 802.11ax starts with a legacy preamble. Fields after the legacy preamble are a signal field, a short training field, and a long training field that are newly defined for each generation. The short training field (STF) after the legacy preamble is referred to as an extremely high throughput-short training field (EHT-STF) for short, to be distinguished from the L-STF. When a channel bandwidth for transmission is greater than 20 MHz, the L-STF is replicated and transmitted on every 20 MHz channel bandwidth, and the EHT-STF introduced after 802.11a is defined as a new sequence for the channel bandwidth greater than 20 MHz. For example, an STF defined in 802.11ac, namely, a very high throughput-short training field (VHT-STF) is separately defined as sequences for 20 MHz, 40 MHz, 80 MHz, and 160 MHz. Similarly, a high efficiency-short training field (high efficiency-STF, HE-STF) defined in 802.11ax also supports a maximum channel bandwidth of 160 MHz.

In the protocol, a time domain waveform of the HE-STF includes five repetition periods, and is mainly used to enhance estimation of automatic gain control (AGC) in multiple-input multiple-output (MIMO) transmission. Therefore, a smaller peak-to-average power ratio (PAPR) of a sequence is required.

As described above, in evolution of a next-generation standard (IEEE 802.11be) after 802.11ax, a channel bandwidth greater than 160 MHz is supported, for example, 240 MHz and 320 MHz, to implement an ultra-high transmission rate and support a scenario with an ultra-high user density. Therefore, a new short training field sequence may be needed for a larger channel bandwidth. In view of this, the embodiments provide a method and an apparatus for transmitting a physical layer protocol data unit, to provide a short training field sequence for a larger channel bandwidth.

For ease of understanding the embodiments, the following first briefly describes several nouns or terms.

1. Subcarrier

Bandwidths of wireless communication signals are limited. A bandwidth may be divided, by using the OFDM technology, into a plurality of frequency components within a channel bandwidth at a frequency spacing. These components are referred to as subcarriers. Subscripts of subcarriers are consecutive integers. A subcarrier whose subscript is 0 corresponds to a direct current component, a subcarrier whose subscript is a negative number corresponds to a frequency component lower than the direct current component, and a subcarrier whose subscript is a positive number corresponds to a frequency component higher than the direct current component.

2. Resource Unit Distribution

Figure 4:
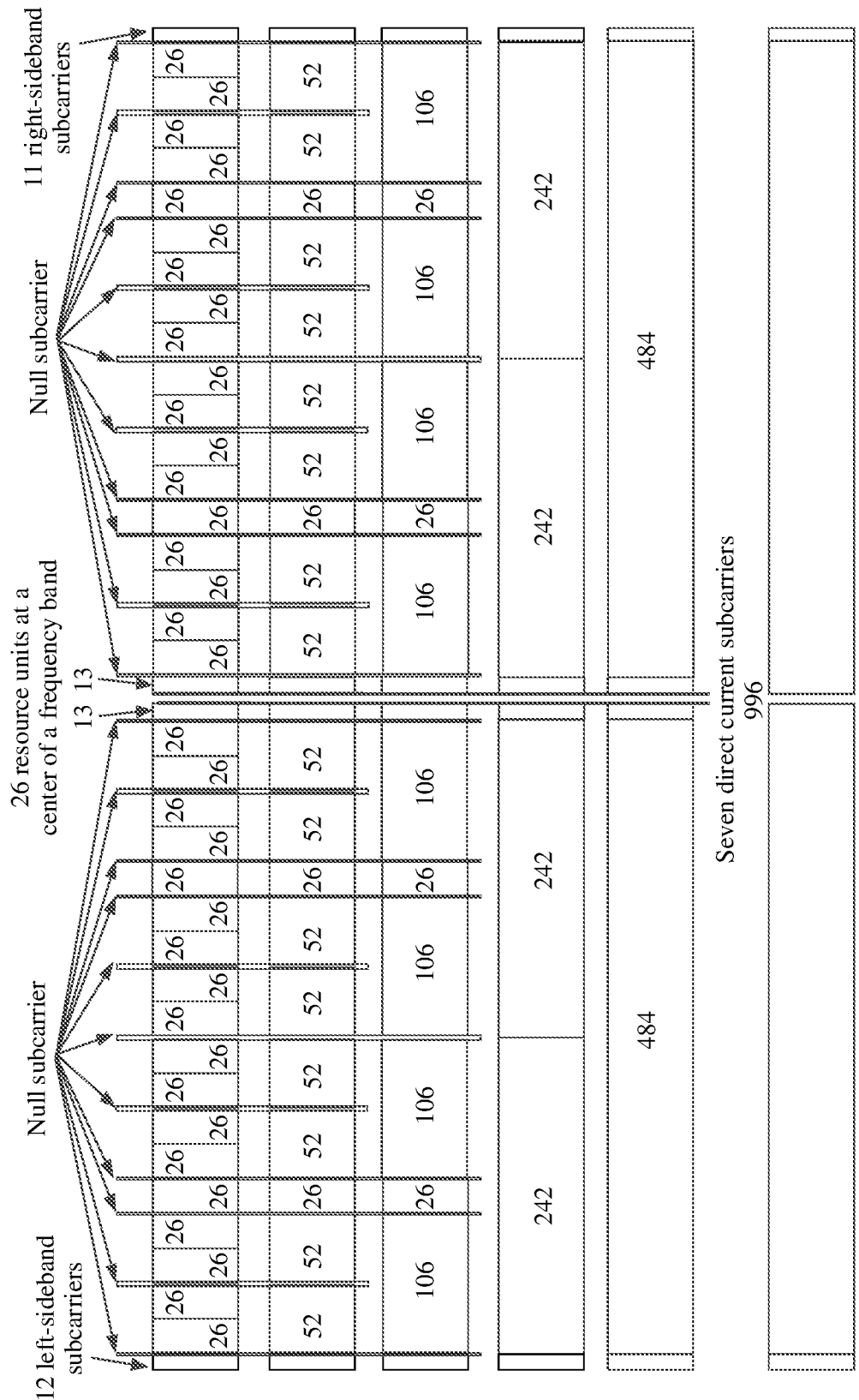
FIG. 4 is a schematic diagram of OFDMA resource unit distribution for a bandwidth of 80 MHz.

The resource unit distribution may also be understood as distribution of subcarriers carrying data, and different channel bandwidths may correspond to different tone plans. When OFDMA and multiple-user multiple-input multiple-output (MU-MIMO) technologies are applied, an AP divides a spectrum bandwidth into several resource units (RU). According to the IEEE 802.11ax protocol, 20 MHz, 40 MHz, 80 MHz, and 160 MHz spectrum bandwidths may be divided into a plurality of types of resource units, including a 26-tone resource unit, a 52-tone resource unit, a 106-tone resource unit, a 242-tone resource unit (the largest resource unit in the 20 MHz bandwidth), a 484-tone resource unit (the largest resource unit in the 40 MHz bandwidth), a 996-tone resource unit (the largest resource unit in the 80 MHz bandwidth), and a 1992-tone resource unit (the largest resource unit in the 160 MHz bandwidth). Each RU includes consecutive subcarriers. For example, the 26-tone RU is an RU including 26 consecutive subcarriers. It should be noted that different total bandwidths can support different types and quantities of RUs. However, in a same bandwidth, hybrid-type resource units may be supported. FIG. 4 is a schematic diagram of an example of a tone plan for a bandwidth of 80 MHz. A left-sideband subcarrier and a right-sideband subcarrier are separately located at an edge of a transmission frequency band, and are used as guard subcarriers, to reduce impact of transmission filtering on data and pilot subcarriers. A direct current subcarrier is a subcarrier with empty content (that is, a subcarrier carrying no data or information), and is used by a mobile device to locate a center of an OFDM frequency band. A null subcarrier is a subcarrier to which no information is allocated. A left-sideband subcarrier, a right-sideband subcarrier, a direct current subcarrier, and a null subcarrier may be collectively referred to as leftover subcarriers (leftover tone) between RUs. A quantity of subcarriers in a large RU equals to a sum of a quantity of subcarriers in a plurality of small RUs included in the large RU and a quantity of leftover subcarriers between the small RUs.

In an OFDMA system, a multi-user data packet is a combination of RUs of a plurality of sizes. An AP allocates an RU to each user. The following RUs may be allocated to a user:

(1) an RU including 26 consecutive subcarriers: 24 data subcarriers and 2 pilot subcarriers;

(2) an RU including 52 consecutive subcarriers: 48 data subcarriers and 4 pilot subcarriers;

(3) an RU including 106 consecutive subcarriers: 102 data subcarriers and 4 pilot subcarriers;

(4) an RU including 242 consecutive subcarriers: 234 data subcarriers and 8 pilot subcarriers;

(5) an RU including 484 consecutive subcarriers: 468 data subcarriers and 16 pilot subcarriers; and (6) an RU including 996 consecutive subcarriers: 980 data subcarriers and 16 pilot subcarriers.

The 484-tone RU is used in multi-user transmission of 40 MHz, and the 996-tone RU is used in multi-user transmission of 80 MHz or 160 MHz. It should be understood that the 160 MHz tone plan may be considered as including two 80 MHz tone plans. It should be understood that the 240 MHz tone plan may be considered as including three 80 MHz tone plans. It should be understood that the 320 MHz tone plan may be considered as including four 80 MHz tone plans, and details are not described herein.

3. Short Training Sequence

A short training sequence is mainly used for signal detection, automatic gain control (AGC), symbol timing, coarse frequency offset estimation, and the like. Different sequences may be defined for different maximum channel bandwidths. For example, the HE-STF defined in 802.11ax supports the maximum channel bandwidth of 160 MHz. For differentiation, a short training sequence whose channel bandwidth is greater than 160 MHz is referred to as an EHT-STF in the embodiments. It should be understood that the EHT-STF indicates a short training field whose bandwidth is greater than 160 MHz, and a name of the short training field constitutes no limitation on the scope of the embodiments.

The short training sequence may be constructed based on an M sequence. For example, it can be understood according to the standard 802.11ax that a high efficiency sequence (HES) of the HE-STF is constructed based on the M sequence through multiplexing, phase rotation, and concatenation. The M sequence is a most basic pseudo-noise sequence (PN sequence) used in a current CDMA system. The M sequence is short for a longest linear feedback shift register sequence. The M sequence is defined as M={−1,−1,−1,1,1,1,−1,1,1,1,−1,1,1,−1,1} in the 802.11ax standard.

It should be understood that when the M sequence defined in a subsequent standard has another form, the M sequence is also applicable.

It should be noted that a name of the M sequence constitutes no limitation on the scope of the embodiments. For example, the M sequence may also be referred to as a frequency domain sequence.

First, a short training sequence $HES_{a:b:c}$ of the HE-STF in 802.11ax is briefly described, where a:b:c indicates that there are b subcarriers between a subcarrier a and a subcarrier c.

Figure 5:
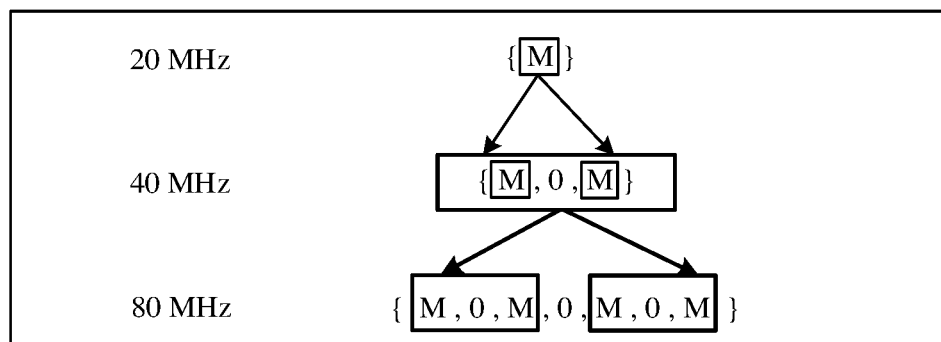
FIG. 5(1) and FIG. 5(2) are a schematic diagram of an HE-STF constructed based on an M sequence.
Figure 5:
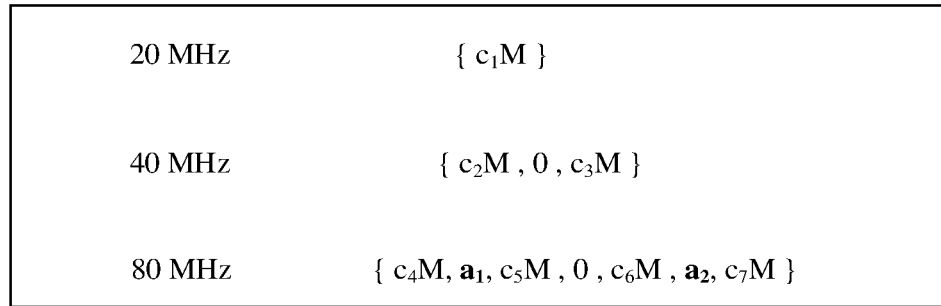

FIG. 5(1) and FIG. 5(2) are a schematic diagram of an HE-STF constructed based on an M sequence. FIG. 5(1) is a repeated structure. A 20 MHz HE-STF may include one M sequence. A 40 MHz HE-STF is obtained by concatenating two 20 MHz HE-STFs (namely, two M sequences). Similarly, an 80 MHz HE-STF is obtained by concatenating four 20 MHz HE-STFs. To ensure that the HE-STF includes five repetition periods in time domain, and that a PAPR of the HE-STF is minimized, an additional parameter value and a rotation factor may be used to adjust and optimize the HE-STF, as shown in FIG. 5(2). The 20 MHz HE-STF may include one M sequence. The 40 MHz HE-STF is obtained by concatenating two 20 MHz HE-STFs (namely, two M sequences) multiplied by the rotation factor C. Similarly, the 80 MHz HE-STF is obtained by concatenating four 20 MHz HE-STFs multiplied by the rotation factor. In addition, a parameter value A needs to be inserted between every two M sequences, to ensure that the HE-STF includes the five repetition periods in time domain. An exception is that an OFDM modulation mode requires that a direct current subcarrier needs to be 0. Therefore, the PAPR of the HE-STF can be minimized by optimizing A and C. In FIG. 5(2), the rotation factor C includes $\{c_1, c_2, c_3, c_4, \ldots\}$, and the parameter value A includes $\{a_1, a_2, a_3, a_4, \ldots\}$. In the embodiments, these rotation factors and parameter values are collectively referred to as a "parameter set".

Based on different frame structures defined in 802.11ax, HE-STFs with two period lengths are defined: 0.8 μs and 1.6 μs respectively. In addition, 802.11ax supports a total of four channel bandwidths: 20 MHz, 40 MHz, 80 MHz, and 160 MHz. Each bandwidth and each length correspond to one HE-STF. Therefore, there are a total of eight frequency domain values $HES_{a:b:c}$ of the HE-STF.

The following separately describes optimized frequency domain sequences of different channel bandwidths in two cases in which lengths are 0.8 μs and 1.6 μs respectively.

Case 1: A Frequency Domain Sequence of a 0.8 μs HE-STF (1) A 0.8 μs HE-STF whose channel bandwidth is 20 MHz has a total of 256 subcarriers whose subscripts range from −127 to 128. A subcarrier whose subscript is 0 corresponds to a direct current component, and subcarriers whose subscripts are a negative number and a positive number respectively correspond to a frequency component lower than the direct current component and a frequency component higher than the direct current component respectively.

$HES_{-112:16:112}$ may be represented by using the following formula:

$$HES_{-112:16:112} = \{M\} \cdot (1+j)/\sqrt{2}, \text{ where}$$

$HES_{-112:16:112}$ indicates a frequency domain sequence of the 20 MHz HE-STF, and, values of subcarriers that are in the frequency domain and whose subscripts are −112, −96, −80, −64, −48, −32, −16, 0, 16, 32, 48, 64, 80, 96, and 112. $HES_0=0$, and values of other subcarriers are all 0 in the frequency domain. The other subcarriers indicate subcarriers whose subscripts range from −127 to 128 other than the subcarriers whose subscripts are −112, −96, −80, −64, −48, −32, −16, 0, 16, 32, 48, 64, 80, 96, and 112.

The foregoing formula is as follows:

$$HES_{-112:16:112} = \{-(1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, -(1+j)/\sqrt{2}, -(1+j)/\sqrt{2}\}.$$

Therefore, the values of the subcarriers that are in the frequency domain and whose subscripts are −112, −96, −80, −64, −48, −32, −16, 0, 16, 32, 48, 64, 80, 96, and 112 are respectively:

$$-(1+j)/\sqrt{2}, -(1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, \sqrt{2}, (1+j)/\sqrt{2}, (1+j)/\sqrt{2}, -(1+j)/\sqrt{2}, \text{ and } (1+j)/\sqrt{2}.$$

It should be noted that, in the embodiments, expressions similar to $HES_{-112:16:112}$ in the formula have similar meanings. For brevity, details are not described again.

It should be further noted that, in the embodiments, in subsequent formula description, if not explicitly noted, values of other subcarriers in the frequency domain are all 0. For brevity, details are not described again.

(2) A 0.8 μs HE-STF whose channel bandwidth is 40 MHz has a total of 512 subcarriers whose subscripts range from −255 to 256. $HES_{-240:16:240}$ may be represented by using the following formula:

$$HES_{-240:16:240} = \{M, 0, -M\} \cdot (1+j)/\sqrt{2}, \text{ where}$$

$HES_{-240:16:240}$ indicates a frequency domain sequence of the 40 MHz HE-STF.

(3) A 0.8 μs HE-STF whose channel bandwidth is 80 MHz has a total of 1024 subcarriers whose subscripts range from −511 to 512. $HES_{-496:16:496}$ may be represented by using the following formula:

$$HES_{-496:16:496} = \{M, 1, -M, 0, -M, 1, -M\} \cdot (1+j)/\sqrt{2}, \text{ where}$$

$HES_{-496:16:496}$ indicates a frequency domain sequence of the 80 MHz HE-STF.

(4) A 0.8 μs HE-STF whose channel bandwidth is 160 MHz has a total of 2048 subcarriers whose subscripts range from −1023 to 1024. $HES_{-1008:16:1008}$ may be represented by using the following formula:

$$HES_{-1008:16:1008} = \{M, 1, -M, 0, -M, 1, -M, 0, -M, -1, M, 0, -M, 1, -M\} \cdot (1+j)/\sqrt{2}, \text{ where}$$

$HES_{-1008:16:1008}$ indicates a frequency domain sequence of the 160 MHz HE-STF.

Case 2: A Frequency Domain Sequence of a 1.6 μs HE-STF (1) A 1.6 μs HE-STF whose channel bandwidth is 20 MHz has a total of 256 subcarriers whose subscripts range from −127 to 128. $HES_{-120:8:120}$ may be represented by using the following formula:

$$HES_{-120:8:120} = \{M, 0, -M\} \cdot (1+j)/\sqrt{2}, HES_0 = 0, \text{ and values of other subcarriers are all 0 in frequency domain.}$$

(2) A 1.6 μs HE-STF whose channel bandwidth is 40 MHz has a total of 512 subcarriers whose subscripts range from −255 to 256. $HES_{-248:8:248}$ may be represented by using the following formula:

$$HES_{-248:8:248} = \{M, -1, -M, 0, M, -1, M\} \cdot (1+j)/\sqrt{2}, \text{ and } HES_{\pm 248} = 0, \text{ where}$$

$HES_{-248:8:248}$ indicates a frequency domain sequence of the 40 MHz HE-STF.

(3) A 1.6 μs HE-STF whose channel bandwidth is 80 MHz has a total of 1024 subcarriers whose subscripts range from −511 to 512. $HES_{-504:8:504}$ may be represented by using the following formula:

$$HES_{-504:8:504} = \{M, -1, M, -1, -M, -1, M, 0, -M, 1, M, 1, -M, 1, -M\} \cdot (1+j)/\sqrt{2}, \text{ and}$$

$$HES_{\pm 504} = 0, \text{ where}$$

$HES_{-504:8:504}$ indicates a frequency domain sequence of the 80 MHz HE-STF.

(4) A 1.6 μs HE-STF whose channel bandwidth is 160 MHz has a total of 2048 subcarriers whose subscripts range from −1023 to 1024 bandwidth. $HES_{-1016:8:1016}$ may be represented by using the following formula:

$HES_{-1016:8:1016} = \{M,-1,M,-M,-1,M,0,-M,1,M,1,-M,$
$1,-M,0,-M,1,-M,1,M,1,-M,0,-M,1,M,1,-M,1,$
$-M\} \cdot (1+j)/\sqrt{2},$ $HES_{\pm 8} = 0$, and $HES_{\pm 1016} = 0$, where $HES_{-1016:8:1016}$ indicates a frequency domain sequence of the 160 MHz HE-STF.

In the foregoing formulas, a geometric meaning of $(1+j)/\sqrt{2}$ on a complex plane is to rotate a value by 45° counterclockwise and keep energy normalized. In a similar way, $-(1+j)/\sqrt{2}$ is to rotate a value by 225° counterclockwise. This obtains, based on the M sequence, HE-STFs with different channel bandwidths while ensuring that optimized PAPRs are obtained. Peak-to-average power ratios PAPRs of the foregoing 8 HE-STFs are listed in Table 1.

TABLE 1

| PAPR | 20 MHz | 40 MHz | 80 MHz | 160 MHz |
|---|---|---|---|---|
| 0.8 μs | 1.89 | 4.40 | 4.53 | 5.05 |
| 1.6 μs | 4.40 | 5.22 | 4.79 | 6.34 |

4. Peak-to-Average Power Ratio

A peak-to-average power ratio (PAPR) may be a ratio, in a symbol, of an instantaneous power peak of continuous signals to an average value of signal power. The ratio may be represented as follows:

$$PAPR = 10 \cdot \log_{10}\left(\frac{\max(X_i^2)}{\operatorname{mean}(X_i^2)}\right),$$

where $X_i$ indicates time domain discrete values of a group of sequences, $\max(X_i^2)$ indicates a maximum value of squares of the time domain discrete values and $\operatorname{mean}(X_i^2)$ indicates an average value of the squares of the time domain discrete values.

The OFDM system has a disadvantage of a high PAPR. Especially in a large bandwidth, more subcarriers cause a higher PAPR, and a high PAPR causes non-linear distortion of a signal and reduces system performance Therefore, a lower PAPR of a sequence may be required.

It should be noted that in the embodiments, a "protocol" may be a standard protocol in the communication field, for example, may include an LTE protocol, an NR protocol, a WLAN protocol, and a related protocol applied to a subsequent communication system. This is not limited.

It should be further noted that, in the embodiments, "pre-obtaining" may include indication by device signaling or predefinition, for example, definition in a protocol. "Predefined" may be implemented by storing corresponding code or a table in a device (for example, the device includes a station and an access point) in advance or may be implemented in another manner that may indicate related information. An implementation of "predefined" is not limited. For example, "predefined" may be "defined in a protocol".

It should be further noted that "storing" in the embodiments may refer to storing in one or more memories. The one or more memories may be separately disposed, or may be integrated into an encoder, a translator, a processor, or a communication apparatus. Alternatively, a part of the one or more memories may be separately disposed, and a part of the one or more memories are integrated into the translator, the processor, or the communication apparatus. A type of the memory may be a storage medium in any form, and this is not limited.

It should be further noted that in the embodiments, "of (of)", "corresponding (corresponding or relevant)", and "corresponding (corresponding)" are interchangeable sometimes. It should be noted that, when differences between the terms are not emphasized, meanings of the terms are the same.

It should be noted that the term "and/or" describes an association relationship for describing associated objects and represents that three relationships may exist. For example, A and/or B may represent the following three cases: Only A exists, both A and B exist, and only B exists. A character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: only A exists, both A and B exist, and only B exists.

The following describes in detail the embodiments with reference to the accompanying drawings. The embodiments may be applied to a plurality of different scenarios, including, but not limited, to the scenario shown in FIG. 1. For example, for uplink transmission, an STA may be used as a transmit end, and an AP may be used as a receive end. For downlink transmission, the AP may be used as a transmit end, and the STA may be used as a receive end. For another transmission scenario, for example, data transmission between APs, one AP may be used as a transmit end, and the other AP may be used as a receive end. For another example, for uplink transmission between STAs, one STA may be used as a transmit end, and the other STA may be used as a receive end. Therefore, the following describes the embodiments based on a transmit end and a receive end.

Figure 6:
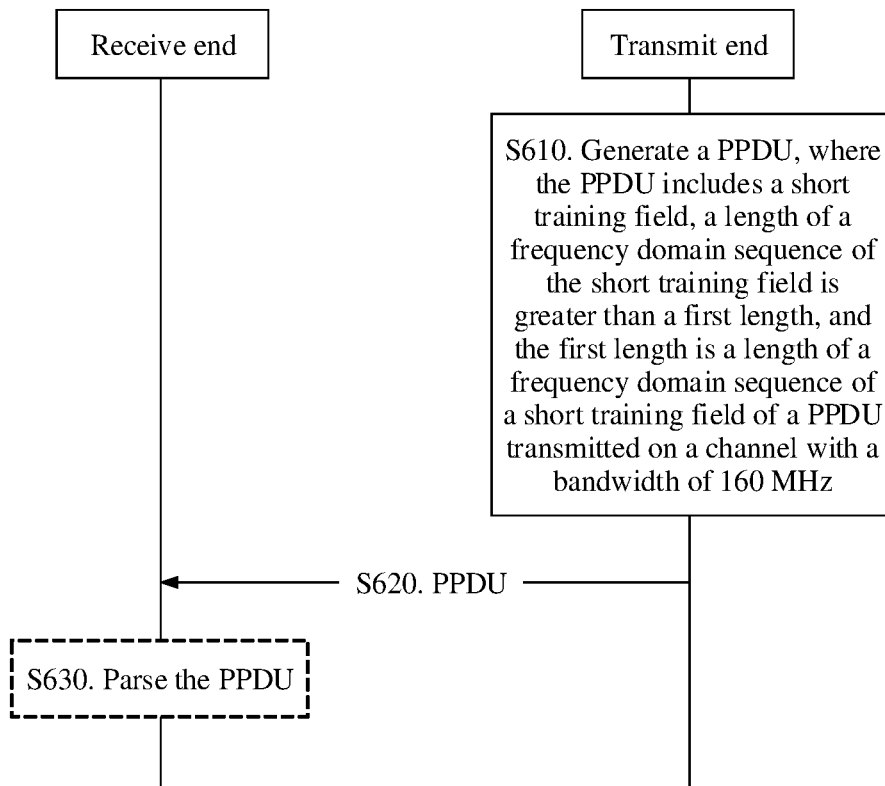
FIG. 6 is a schematic flowchart of a method for transmitting a physical layer protocol data unit according to an embodiment.

FIG. 6 is a schematic flowchart of a method 600 for transmitting a physical layer protocol data unit according to an embodiment. The method 600 shown in FIG. 6 may include the following steps.

S610. A transmit end generates a physical layer protocol data unit PPDU, where the PPDU includes a short training field, a length of a frequency domain sequence of the short training field is greater than a first length, and the first length is a length of a frequency domain sequence of a short training field of a PPDU transmitted on a channel with a bandwidth of 160 MHz.

S620. The transmit end sends the PPDU on a target channel, where a bandwidth of the target channel is greater than 160 MHz.

Accordingly, a receive end receives the PPDU on the target channel.

Optionally, the method 600 may further include step S630. S630. The receive end parses the PPDU. For a parsing manner, refer to a conventional technology. This is not limited.

The short training field may also be referred to as a short training field and is uniformly represented by the short training field below.

In this embodiment, to be distinguished from a legacy-short training field, the short training field corresponding to the bandwidth of the target channel is represented as an EHT-STF. It should be understood that the EHT-STF indicates the short training field corresponding to a bandwidth greater than 160 MHz, and a name of the short training field constitutes no limitation on the scope of the embodiments.

The EHT-STF is obtained by using the frequency domain sequence of the EHT-STF. For example, the EHT-STF is obtained by performing IFFT transformation on the frequency domain sequence or a frequency domain value of the EHT-STF. For ease of description, the frequency domain sequence of the EHT-STF is referred to as EHTS for short. It should be understood that the EHTS is merely a name and does not limit the scope of the embodiments. For example, the EHTS may also be referred to as the frequency domain sequence.

In this embodiment, the first length indicates the length of the frequency domain sequence corresponding to the bandwidth of 160 MHz. The length of the frequency domain sequence of the short training field is greater than the first length. In other words, the length of the frequency domain sequence of the EHT-STF is greater than the length of the frequency domain sequence of the HE-STF whose channel bandwidth is 160 MHz. For example, the 160 MHz HE-STF may be obtained by concatenating two 80 MHz HE-STFs multiplied by a rotation factor. The 240 MHz EHT-STF may be obtained by concatenating three 80 MHz HE-STFs multiplied by the rotation factor. Alternatively, the 240 MHz EHT-STF may also be obtained by puncturing at a 320 MHz EHT-STF (for example, the 240 MHz EHT-STF may be obtained by 80 MHz EHT-STF puncturing of the 320 MHz EHT-STF). The 320 MHz EHT-STF may be obtained by concatenating four 80 MHz HE-STFs multiplied by the rotation factor. Therefore, the length of the frequency domain sequence of the EHT-STF is greater than the length of the frequency domain sequence of the HE-STF whose channel bandwidth is 160 MHz.

That the length of the frequency domain sequence of the short training field is greater than the first length may alternatively be understood that a quantity of frequency domain values of the EHT-STF is greater than a quantity of frequency domain values of the 160 MHz HE-STF. For example, there are 3072 subcarriers in total in a 240 MHz bandwidth, and the 3072 subcarriers correspond to 3072 frequency domain values. There are 1024 subcarriers in total in a 160 MHz bandwidth, and the 1024 subcarriers correspond to 1024 frequency domain values. Therefore, the quantity of frequency domain values of the EHT-STF is greater than the quantity of frequency domain values of the 160 MHz HE-STF.

That the length of the frequency domain sequence of the short training field is greater than the first length may alternatively be understood that a quantity of subcarrier numbers corresponding to the EHT-STF is greater than a quantity of subcarrier numbers corresponding to the 160 MHz HE-STF. For example, a short training sequence corresponding to the 240 MHz EHT-STF may be represented as $EHTS_{-1520:16:1520}$, and a short training sequence corresponding to the 160 MHz HE-STF may be represented as $HES_{-1008:16:1008}$. In this case, it may be understood that the quantity of subcarrier numbers corresponding to the EHT-STF is greater than the quantity of subcarrier numbers corresponding to the 160 MHz HE-STF.

In this embodiment, a length of a sequence indicates a length of elements in the sequence. For example, a sequence 1 is {0,1,−1,1}, and a length of the sequence 1 is 4. For another example, a sequence 2 is {0,1,−1,1,1,1,1}, and a length of the sequence 2 is 7. It can be understood that the length of the sequence 2 is greater than the length of the sequence 1. For another example, it is assumed that the length of the frequency domain sequence corresponding to the 160 MHz HE-STF is 2048, and the first length is 2048. In other words, the length of the frequency domain sequence of the short training field is greater than 2048.

The bandwidth of the target channel is greater than 160 MHz.

Alternatively, the bandwidth of the target channel may be any bandwidth greater than 160 MHz. For example, the bandwidth of the target channel is 200 MHz, 240 MHz, 280 MHz, or 320 MHz.

In this embodiment, the EHT-STF of the bandwidth of the target channel may be obtained through simulation calculation. For example, the transmit end may be obtained through calculation based on a sequence specified in a protocol (for example, an HE-LTF sequence in the IEEE 802.11ax) by using a corresponding formula. For another example, the transmit end may be obtained through calculation based on a stored sequence or a newly generated sequence by using a corresponding formula. This is not limited in this embodiment.

According to this embodiment, in consideration of backward compatibility, a short training sequence of a larger channel bandwidth, for example, the short training sequence EHTS corresponding to the EHT-STF, may be based on the short training sequence HES corresponding to the STF of the existing channel bandwidth, for example, the short training sequence HES corresponding to the HE-STF.

The method for transmitting a PPDU in this embodiment can determine a short training sequence or a frequency domain sequence corresponding to a larger channel bandwidth and support a receive end to perform automatic gain control on data transmitted on a channel with a larger bandwidth. The short training sequence may be obtained based on the short training sequence of the existing channel bandwidth, and a short training sequence with better performance may be obtained through simulation calculation, for example, through parameter adjustment. The short training field may be obtained based on the short training sequence. This embodiment can meet a larger channel bandwidth during actual implementation, implement backward compatibility, verify, through exhaustive simulation on parameters, that the short training sequence provided in this embodiment has a smaller peak-to-average power ratio PAPR and better performance, improve an estimation effect of an automatic gain control circuit at the receive end, and achieve a lower receiving bit error rate.

The following uses two examples in which the bandwidth of the target channel is 240 MHz and 320 MHz for description. The EHT-STF may include a plurality of periods, and a time length of each period may be 0.8 μs or 1.6 μs. For brevity, in this embodiment, the time length of each period is denoted as a period length. In this embodiment, two scenarios in which period lengths are separately 0.8 μs and 1.6 μs are used to describe the EHT-STF of the bandwidth of the target channel. In this embodiment, a period length of a reference channel is a period length of transmitting the frequency domain sequence of the short training field on the reference channel. Details are not described herein again.

In consideration of different bandwidths and different period lengths of different target channels, corresponding EHT-LTFs may be different. Therefore, the following describes in detail the method in this embodiment of this application based on different cases.

A case 1 and a case 2 are for the EHT-STF of the 240 MHz channel bandwidth. Before the EHT-STF of the 240 MHz channel bandwidth is described, a 240 MHz subcarrier allocation pattern (tone plan) is described. As described above, a tone plan of an 80 MHz channel bandwidth specified in 802.11ax has a total of 1024 subcarriers whose subscripts range from −511 to 512. There are 12 and 11 guard subcarriers (guard tone) on left and right edges of the bandwidth respectively, and 5 direct current subcarriers in the middle of the bandwidth. The tone plan of the 240 MHz channel bandwidth in this embodiment may be obtained by concatenating three 80 MHz tone plans. Left-sideband subcarriers and right-sideband subcarriers of the three 80 MHz bandwidths and direct current subcarriers in the middle of each of the three 80 MHz bandwidths are reserved. In this way, the bandwidth of 240 MHz has a total of 1024×3=3072 subcarriers. There are 12 and 11 guard subcarriers on the left and right edges respectively, and 5 direct current subcarriers in the middle of the bandwidth.

Case 1: The Bandwidth of the Target Channel is 240 MHz, and the Period Duration of the Reference Channel is 0.8 μs.

In this embodiment, a frequency domain sequence of an EHT-STF whose bandwidth is 240 MHz and period length is 0.8 tis is denoted as $EHTS_{-1520:16:1520}$, and $EHTS_{-1520:16:1520}$ may be constructed in the following plurality of manners.

1. A 20 MHz Sequence in the IEEE 802.11ax is Used for Construction.

In this embodiment, a frequency domain sequence of an HE-STF whose bandwidth is 20 MHz and period length is 0.8 μs in the IEEE 802.11ax is denoted as $HES_{-112:16:112}$, and $HES_{-112:16:112} = \{M\} \cdot (1+j)/\sqrt{2}$. $HES'_{-112:16:112} = HES_{-112:16:112} \cdot \sqrt{2}/(1+j) = \{M\}$ is denoted. In other words, $HES'_{-112:16:112}$ is represented as $\{M\}$, and accordingly, $-HES'_{-112:16:112}$ is represented as $\{-M\}$. A formula is as follows:

$$EHTS_{-1520:16:1520} = \{c_1 \cdot HES'_{-112:16:112}, a_1, c_2 \cdot \\ HES'_{-112:16:112}, 0, c_3 \cdot HES'_{-112:16:112}, a_2, c_4 \cdot \\ HES'_{-112:16:112}, a_3, c_5 \cdot HES'_{-112:16:112}, a_4, c_6 \cdot \\ HES'_{-112:16:112}, 0, c_7 \cdot \\ HES'_{-112:16:112}, a_5, c_8 \cdot \\ HES'_{-112:16:112}, a_6, c_9 \cdot \\ HES'_{-112:16:112}, a_7, c_{10} \cdot \\ HES'_{-112:16:112}, 0, c_{11} \cdot \\ HES'_{-112:16:112}, a_8, c_{12} \cdot HES'_{-112:16:112}\} \cdot (1+j)/\sqrt{2},$$

and $EHTS_{\pm 1520} = 0$, where a value of $a_i$ is $\{-1,0,1\}$, $i=1, 2, \ldots$, or 8, a value of $c_j$ is $\{-1,1\}$, and $j=1, 2, \ldots$, or 12.

Inverse Fourier transform and 5-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

If $a_i$ is neither a direct current subcarrier nor a null subcarrier, the value of $a_i$ is $\{-1,1\}$, and 20 optimal groups of parameter set values of $EHTS_{-1520:16:1520}$ may be obtained, as shown in Table 2. In all tables in the embodiments, PAPR indicates a PAPR value of a sequence that is not oversampled, and PAPR up_sampling indicates a PAPR value of a sequence that is oversampled. Details are not described subsequently.

TABLE 2

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 1 | 1 | 1 | −1 | 1 | 1 | −1 | 1 | 1 | 1 | 1 | 1 | −1 | −1 | −1 | −1 | 1 | −1 | −1 | 1 | −1 | 5.9815 | 6.168 |
| 2 | 1 | 1 | −1 | 1 | 1 | −1 | 1 | 1 | 1 | −1 | 1 | −1 | 1 | 1 | 1 | 1 | −1 | −1 | 1 | −1 | 5.9815 | 6.168 |
| 3 | −1 | −1 | 1 | −1 | −1 | 1 | −1 | −1 | −1 | 1 | −1 | 1 | −1 | −1 | −1 | −1 | 1 | 1 | 1 | 1 | 5.9815 | 6.168 |
| 4 | −1 | −1 | 1 | −1 | −1 | 1 | −1 | −1 | −1 | −1 | −1 | 1 | 1 | 1 | 1 | −1 | 1 | 1 | −1 | 1 | 5.9815 | 6.168 |
| 5 | 1 | 1 | 1 | −1 | −1 | −1 | 1 | 1 | 1 | 1 | 1 | 1 | −1 | 1 | −1 | 1 | 1 | −1 | −1 | 1 | 5.8146 | 6.185 |
| 6 | −1 | 1 | 1 | 1 | 1 | −1 | −1 | −1 | 1 | −1 | −1 | 1 | 1 | −1 | 1 | −1 | 1 | 1 | 1 | 1 | 5.8146 | 6.1849 |
| 7 | 1 | −1 | −1 | −1 | −1 | 1 | 1 | 1 | −1 | 1 | 1 | −1 | −1 | 1 | −1 | 1 | −1 | −1 | −1 | −1 | 5.8146 | 6.1849 |
| 8 | −1 | −1 | −1 | 1 | 1 | 1 | −1 | −1 | −1 | −1 | −1 | −1 | 1 | −1 | 1 | −1 | −1 | 1 | 1 | −1 | 5.8146 | 6.185 |
| 9 | −1 | 1 | 1 | −1 | −1 | 1 | −1 | 1 | 1 | 1 | −1 | −1 | −1 | −1 | 1 | −1 | −1 | 1 | −1 | 1 | 6.0501 | 6.2053 |
| 10 | −1 | 1 | 1 | −1 | −1 | 1 | −1 | 1 | −1 | −1 | 1 | −1 | 1 | 1 | 1 | 1 | −1 | −1 | 1 | 1 | 6.0501 | 6.2052 |
| 11 | 1 | −1 | −1 | 1 | 1 | −1 | 1 | −1 | 1 | −1 | −1 | 1 | −1 | −1 | −1 | −1 | 1 | 1 | −1 | 1 | 6.0501 | 6.2052 |
| 12 | 1 | −1 | −1 | 1 | 1 | −1 | 1 | −1 | −1 | 1 | 1 | 1 | 1 | 1 | 1 | −1 | 1 | 1 | 1 | −1 | 6.0501 | 6.2053 |
| 13 | 1 | 1 | 1 | 1 | −1 | −1 | −1 | 1 | 1 | 1 | 1 | −1 | 1 | −1 | 1 | 1 | 1 | −1 | −1 | 1 | 5.8146 | 6.2168 |
| 14 | 1 | 1 | 1 | 1 | −1 | −1 | −1 | 1 | −1 | −1 | 1 | −1 | 1 | 1 | 1 | −1 | 1 | 1 | 1 | 1 | 5.8146 | 6.2167 |
| 15 | −1 | −1 | −1 | −1 | 1 | 1 | 1 | −1 | 1 | 1 | −1 | 1 | −1 | −1 | −1 | 1 | −1 | −1 | −1 | −1 | 5.8146 | 6.2167 |
| 16 | −1 | −1 | −1 | −1 | 1 | 1 | 1 | −1 | −1 | −1 | −1 | 1 | 1 | 1 | 1 | −1 | −1 | 1 | 1 | −1 | 5.8146 | 6.2168 |
| 17 | 1 | −1 | 1 | −1 | 1 | −1 | −1 | 1 | 1 | 1 | 1 | −1 | 1 | −1 | 1 | 1 | −1 | −1 | 1 | 1 | 5.7529 | 6.2274 |
| 18 | 1 | 1 | −1 | 1 | −1 | −1 | 1 | −1 | 1 | −1 | −1 | 1 | 1 | −1 | 1 | 1 | 1 | 1 | 1 | 1 | 5.7529 | 6.2273 |
| 19 | −1 | −1 | 1 | −1 | 1 | 1 | −1 | 1 | −1 | 1 | 1 | −1 | −1 | 1 | −1 | −1 | −1 | −1 | −1 | −1 | 5.7529 | 6.2273 |
| 20 | −1 | 1 | −1 | 1 | −1 | 1 | 1 | −1 | −1 | −1 | 1 | −1 | −1 | 1 | −1 | 1 | 1 | 1 | −1 | 1 | 5.7529 | 6.2274 |

If $a_3$ and $a_6$ are separately a direct current subcarrier or a null subcarrier, $a_3=0$, $a_6=0$, the value of $a_i$ other than $a_3$ and $a_6$ is $\{-1,1\}$, and 12 optimal groups of parameter set values of $EHTS_{-1520:16:1520}$ may be obtained, as shown in Table 3.

TABLE 3

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 1 | −1 | −1 | 0 | −1 | 1 | 0 | 1 | 1 | 1 | 1 | 1 | 1 | −1 | 1 | −1 | 1 | 1 | −1 | −1 | 1 | 3.3255 | 3.9285 |
| 2 | 1 | 1 | 0 | 1 | −1 | 0 | −1 | −1 | 1 | −1 | 1 | 1 | −1 | 1 | −1 | 1 | 1 | 1 | 1 | 1 | 3.3255 | 3.9287 |
| 3 | −1 | −1 | 0 | −1 | 1 | 0 | 1 | 1 | −1 | 1 | 1 | 1 | −1 | 1 | −1 | 1 | −1 | −1 | −1 | −1 | 3.3255 | 3.9287 |
| 4 | 1 | 1 | 0 | 1 | −1 | 0 | −1 | −1 | −1 | −1 | 1 | −1 | 1 | −1 | 1 | −1 | 1 | 1 | 1 | 1 | 3.3255 | 3.9285 |
| 5 | 1 | 1 | 0 | 1 | −1 | 0 | −1 | −1 | 1 | 1 | 1 | 1 | −1 | 1 | −1 | 1 | 1 | −1 | −1 | 1 | 3.3255 | 3.9564 |

TABLE 3-continued

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 6 | −1 | −1 | 0 | −1 | 1 | 0 | 1 | 1 | 1 | 1 | −1 | 1 | 1 | −1 | 1 | −1 | 1 | 1 | 1 | 1 | 3.3255 | 3.9559 |
| 7 | 1 | 1 | 0 | 1 | −1 | 0 | −1 | −1 | −1 | 1 | 1 | −1 | −1 | 1 | −1 | 1 | −1 | −1 | −1 | −1 | 3.3255 | 3.9559 |
| 8 | −1 | −1 | 0 | −1 | 1 | 0 | 1 | 1 | −1 | −1 | −1 | −1 | 1 | −1 | 1 | −1 | −1 | 1 | 1 | −1 | 3.3255 | 3.9564 |
| 9 | −1 | −1 | 0 | −1 | 1 | 0 | 1 | 1 | 1 | 1 | 1 | 1 | −1 | −1 | 1 | 1 | −1 | 1 | −1 | 3.3255 | 4.1104 |
| 10 | 1 | 1 | 0 | 1 | −1 | 0 | −1 | −1 | −1 | −1 | −1 | −1 | −1 | 1 | 1 | −1 | −1 | 1 | −1 | 1 | 3.3255 | 4.1104 |
| 11 | −1 | −1 | 0 | −1 | 1 | 0 | 1 | 1 | 1 | −1 | 1 | −1 | 1 | 1 | −1 | −1 | −1 | −1 | −1 | 3.3255 | 4.1112 |
| 12 | 1 | 1 | 0 | 1 | −1 | 0 | −1 | −1 | 1 | −1 | 1 | 1 | −1 | −1 | 1 | 1 | 1 | 1 | 1 | 3.3255 | 4.1112 |

2. A 160 MHz Sequence and an 80 MHz Sequence in the IEEE 802.11ax are Used for Construction.

In this embodiment, a frequency domain sequence of an HE-STF whose bandwidth is 160 MHz and period length is 0.8 μs in the IEEE 802.11ax is denoted as $HES_{-1008:16:1008}$, a frequency domain sequence of an HE-STF whose bandwidth is 80 MHz and period length is 0.8 μs in the IEEE 802.11ax is denoted as $HES_{-496:16:496}$, $$HES_{-1008:16:1008} = \{M,1,-M,0,-M,1,-M,0,-M,-1,M, 0,-M,1,-M\} \cdot (1+j)/\sqrt{2}, \text{ and}$$

$$HES_{-496:16:496} = \{M,1,-M,0,-M,1,-M\} \cdot (1+j)/\sqrt{2}.$$

$HES'_{-1008:16:1008} = HES_{-1008:16:1008} \cdot \sqrt{2}/(1+j) = \{M,1,-M,0,-M,1,-M,0,-M,-1,M,0,-M,1,-M\}$ is denoted. In other words, $HES'_{-1008:16:1008}$ is represented as $\{M,1,-M,0,-M,1,-M,0,-M,-1,M,0,-M,1,-M\}$, and accordingly, $-HES'_{-1008:16:1008}$ is represented as $\{-M,-1,M,0,M,-1,M,0,M,1,-M,0,M,-1,M\}$.

$HES'_{-496:16:496} = HES_{-496:16:496} \cdot \sqrt{2}/(1+j) = \{M,1,-M,0,-M,1,-M\}$ is denoted. In other words, $HES'_{-496:16:496}$ is represented as $\{M,1,-M,0,-M,1,-M\}$, and accordingly, $-HES'_{-496:16:496}$ is represented as $\{-M,-1,M,0,M,-1,M\}$.

In a possible implementation, a formula is as follows:

$$EHTS_{-1520:16:1520} = \{c_1 \cdot HES'_{-1008:16:1008}\_L, a_1, c_2 \cdot HES'_{-1008:16:1008}\_R, a_2, c_3 \cdot HES'_{-496:16:496}\} \cdot (1+j)/\sqrt{2}, \text{ where}$$

$HES'_{-1008:16:1008}\_L = \{M,1,-M,0,-M,1,-M\}$ is a left part of $HES'_{-1008:16:1008}$ on a 0 subcarrier, $HES'_{-1008:16:1008}\_R = \{-M,-1,M,0,-M,1,-M\}$ is a right part of $HES'_{-1008:16:1008}$ on a 0 subcarrier, and $EHTS_{\pm 1520} = 0$, where a value of $a_i$ is $\{-1,0,1\}$, i=1 or 2, a value of $c_j$ is $\{-1,1\}$, and j=1, 2, or 3.

Inverse Fourier transform and 5-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

If $a_1$ and $a_2$ are separately a direct current subcarrier or a null subcarrier, $a_1 = 0$, $a_2 = 0$, the value of $a_i$ other than $a_1$ and $a_2$ is $\{-1,1\}$, and four optimal groups of parameter set values of $EHTS_{-1520:16:1520}$ may be obtained, as shown in Table 4. In this case, the foregoing formula may also be expressed as: $EHTS_{-1520:16:1520} = \{c_1 \cdot HES'_{-1008:16:1008}, 0, c_2 \cdot HES'_{-496:16:496}\} \cdot (1+j)/\sqrt{2}$.

TABLE 4

| Sequence number | $a_1$ | $a_2$ | $c_1$ | $c_2$ | $c_3$ | PAPR | PAPR up_sampling |
|---|---|---|---|---|---|---|---|
| 1 | 0 | 0 | 1 | 1 | 1 | 6.3992 | 6.5654 |
| 2 | 0 | 0 | −1 | −1 | −1 | 6.3992 | 6.5654 |
| 3 | 0 | 0 | 1 | 1 | −1 | 6.1706 | 7.1419 |
| 4 | 0 | 0 | −1 | −1 | 1 | 6.1706 | 7.1419 |

If $a_2$ is a direct current subcarrier or a null subcarrier, $a_2 = 0$, the value of $a_i$ other than $a_2$ is $\{-1,1\}$, and eight optimal groups of parameter set values of $EHTS_{-1520:16:1520}$ may be obtained, as shown in Table 5.

TABLE 5

| Sequence number | $a_1$ | $a_2$ | $c_1$ | $c_2$ | $c_3$ | PAPR | PAPR up_sampling |
|---|---|---|---|---|---|---|---|
| 1 | −1 | 0 | 1 | 1 | 1 | 6.3179 | 6.4835 |
| 2 | 1 | 0 | −1 | −1 | −1 | 6.3179 | 6.4835 |
| 3 | 1 | 0 | 1 | 1 | 1 | 6.6603 | 6.8255 |
| 4 | −1 | 0 | −1 | −1 | −1 | 6.6603 | 6.8255 |
| 5 | 1 | 0 | 1 | 1 | −1 | 5.8967 | 6.9007 |
| 6 | −1 | 0 | −1 | −1 | 1 | 5.8967 | 6.9007 |
| 7 | −1 | 0 | 1 | 1 | −1 | 6.395 | 7.3548 |
| 8 | 1 | 0 | −1 | −1 | 1 | 6.395 | 7.3548 |

In another possible implementation, a formula is as follows:

$$EHTS_{-1520:16:1520} = \{c_1 \cdot HES'_{-496:16:496}, a_1, c_2 \cdot HES'_{-1008:16:1008}\_L, a_2, c_3 \cdot HES'_{-1008:16:1008}\_R\} \cdot (1+j)/\sqrt{2}, \text{ and } EHTS_{\pm 1520} = 0, \text{ where}$$

$HES'_{-1008:16:1008}\_L = \{M,1,-M,0,-M,1,-M\}$ is a left part of $HES'_{-1008:16:1008}$ on a 0 subcarrier, $HES'_{-1008:16:1008}\_R = \{-M,-1,M,0,-M,1,-M\}$ is a right part of $HES'_{-1008:16:1008}$ on a 0 subcarrier, and $EHTS_{\pm 1520} = 0$, where a value of $a_i$ is $\{-1,0,1\}$, i=1 or 2, a value of $c_j$ is $\{-1,1\}$, and j=1, 2, or 3.

Inverse Fourier transform and 5-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

If $a_1$ and $a_2$ are separately a direct current subcarrier or a null subcarrier, $a_1 = 0$, $a_2 = 0$, the value of $a_i$ other than $a_1$ and $a_2$ is $\{-1,1\}$, and four optimal groups of parameter set values of $EHTS_{-1520:16:1520}$ may be obtained, as shown in Table 6.

TABLE 6

| Sequence number | $a_1$ | $a_2$ | $c_1$ | $c_2$ | $c_3$ | PAPR | PAPR up_sampling |
|---|---|---|---|---|---|---|---|
| 1 | 0 | 0 | 1 | -1 | -1 | 6.1706 | 6.3349 |
| 2 | 0 | 0 | -1 | 1 | 1 | 6.1706 | 6.3349 |
| 3 | 0 | 0 | 1 | 1 | 1 | 6.3992 | 6.5654 |
| 4 | 0 | 0 | -1 | -1 | -1 | 6.3992 | 6.5654 |

If $a_1$ is a direct current subcarrier or a null subcarrier, $a_1=0$, the value of $a_i$ other than $a_1$ is $\{-1,1\}$, and eight optimal groups of parameter set values of $EHTS_{-1520:16:1520}$ may be obtained, as shown in Table 7.

TABLE 7

| Sequence number | $a_1$ | $a_2$ | $c_1$ | $c_2$ | $c_3$ | PAPR | PAPR up_sampling |
|---|---|---|---|---|---|---|---|
| 1 | 0 | -1 | 1 | -1 | -1 | 5.8967 | 6.0599 |
| 2 | 0 | 1 | -1 | 1 | 1 | 5.8967 | 6.0599 |
| 3 | 0 | 1 | 1 | -1 | -1 | 6.395 | 6.5586 |
| 4 | 0 | -1 | -1 | 1 | 1 | 6.395 | 6.5586 |
| 5 | 0 | -1 | 1 | 1 | 1 | 6.3179 | 6.6364 |
| 6 | 0 | 1 | -1 | -1 | -1 | 6.3179 | 6.6364 |
| 7 | 0 | 1 | 1 | 1 | 1 | 6.6603 | 6.8254 |
| 8 | 0 | -1 | -1 | -1 | -1 | 6.6603 | 6.8254 |

3. The 80 MHz Sequence in the IEEE 802.11ax is Used for Construction.

In this embodiment, the frequency domain sequence of the HE-STF whose bandwidth is 80 MHz and period length is 0.8 μs in the IEEE 802.11ax is denoted as $HES_{-496:16:496}$, and $HES_{-496:16:496}=\{M,1,-M,0,-M,1,-M\}\cdot(1+j)/\sqrt{2}$. $HES'_{-496:16:496}=HES_{-496:16:496}\cdot\sqrt{2}/(1+j)=\{M,1,-M,0,-M,1,-M\}$ is denoted. In other words, $HES_{-496:16:496}$ is represented as $\{M,1,-M,0,-M,1,-M\}$, and accordingly, $-HES'_{-496:16:496}$ is represented as $\{-M,-1,M,0,M,-1,M\}$.

In a Possible Implementation, a Half of the 80 MHz Sequence May be Used for Construction.

$EHTS_{-1520:16:1520}=\{c_1\cdot HES'_{-496:16:496}\_L, a_1, c_2\cdot HES'_{-496:16:496}\_R, a_2, c_3\cdot HES'_{-496:16:496}\_L, 0, c_4\cdot HES'_{-496:16:496}\_R, a_3, c_5\cdot HES'_{-496:16:496}\_L, a_4, c_6\cdot HES'_{-496:16:496}\_R\}\cdot(1+j)/\sqrt{2}$, where $HES'_{-496:16:496}\_L=\{M,1,-M\}$ is a left part of $HES'_{-496:16:496}$ on a 0 subcarrier, $HES'_{-496:16:496}\_R=\{-M,1,-M\}$ is a right part of $HES'_{-496:16:496}$ on a 0 subcarrier, and $EHTS_{\pm 1520}=0$, where a value of $a_i$ is $\{-1,0,1\}$, i=1, 2, ..., or 4, a value of $c_j$ is $\{-1,1\}$, and j=1, 2, ..., or 6.

Inverse Fourier transform and 5-fold oversampling are performed on different $EHTS_{-1520:16:1520}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

If $a_i$ is neither a direct current subcarrier nor a null subcarrier, the value of $a_i$ is $\{-1,1\}$, and 10 optimal groups of parameter set values of $EHTS_{-1520:16:1520}$ may be obtained, as shown in Table 8.

TABLE 8

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1 | 1 | -1 | 1 | 1 | 1 | -1 | -1 | -1 | 1 | 1 | 4.5809 | 4.9376 |
| 2 | -1 | 1 | -1 | -1 | -1 | 1 | 1 | 1 | -1 | -1 | 4.5809 | 4.9376 |
| 3 | 1 | 1 | 1 | 1 | 1 | 1 | 1 | -1 | -1 | -1 | 4.1434 | 5.0448 |
| 4 | -1 | -1 | -1 | -1 | -1 | -1 | -1 | 1 | 1 | 1 | 4.1434 | 5.0448 |
| 5 | -1 | -1 | 1 | 1 | -1 | -1 | 1 | -1 | -1 | 1 | 4.5808 | 5.0669 |
| 6 | 1 | 1 | -1 | -1 | 1 | 1 | -1 | 1 | 1 | -1 | 4.5808 | 5.0669 |
| 7 | 1 | -1 | -1 | 1 | 1 | -1 | -1 | -1 | 1 | 1 | 4.4543 | 5.0901 |
| 8 | -1 | 1 | 1 | -1 | -1 | 1 | 1 | 1 | -1 | -1 | 4.4543 | 5.0901 |
| 9 | -1 | 1 | -1 | 1 | 1 | 1 | 1 | -1 | -1 | 1 | 4.5096 | 5.1552 |
| 10 | 1 | -1 | 1 | -1 | -1 | -1 | -1 | 1 | 1 | -1 | 4.5096 | 5.1552 |

If $a_1$ and $a_4$ are separately a direct current subcarrier or a null subcarrier, $a_1=0$, $a_4=0$, the value of $a_i$ other than $a_1$ and $a_4$ is $\{-1,1\}$, and 10 optimal groups of parameter set values of $EHTS_{-1520:16:1520}$ may be obtained, as shown in Table 9.

TABLE 9

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1 | 0 | 1 | 1 | 0 | 1 | -1 | -1 | 1 | -1 | -1 | 4.7131 | 5.0401 |
| 2 | 0 | -1 | -1 | 0 | -1 | 1 | 1 | -1 | 1 | 1 | 4.7131 | 5.0401 |
| 3 | 0 | 1 | -1 | 0 | 1 | -1 | -1 | 1 | -1 | -1 | 4.8759 | 5.136 |
| 4 | 0 | -1 | 1 | 0 | -1 | 1 | 1 | -1 | 1 | 1 | 4.8759 | 5.136 |
| 5 | 0 | 1 | 1 | 0 | 1 | 1 | 1 | -1 | -1 | 1 | 4.3852 | 5.1879 |
| 6 | 0 | -1 | -1 | 0 | -1 | -1 | 1 | 1 | 1 | 1 | 4.3852 | 5.1879 |
| 7 | 0 | -1 | 1 | 0 | 1 | -1 | -1 | 1 | -1 | -1 | 4.4657 | 5.2203 |
| 8 | 0 | 1 | 1 | 0 | -1 | 1 | 1 | -1 | 1 | 1 | 4.4657 | 5.2203 |
| 9 | 0 | -1 | 1 | 0 | 1 | 1 | -1 | -1 | -1 | -1 | 4.2666 | 5.2848 |
| 10 | 0 | 1 | 1 | 0 | -1 | -1 | -1 | 1 | 1 | 1 | 4.2666 | 5.2848 |

If $a_i$ is a direct current subcarrier or a null subcarrier, $a_i=0$, and 10 optimal groups of parameter set values of $EHTS_{-1520:16:1520}$ may be obtained, as shown in Table 10.

TABLE 10

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1  | 0 | 0 | 0 | 0 |  1 | -1 | -1 |  1 | -1 | -1 | 4.4787 | 5.1509 |
| 2  | 0 | 0 | 0 | 0 | -1 |  1 |  1 | -1 |  1 |  1 | 4.4787 | 5.1509 |
| 3  | 0 | 0 | 0 | 0 |  1 |  1 |  1 | -1 | -1 | -1 | 4.2358 | 5.2186 |
| 4  | 0 | 0 | 0 | 0 | -1 | -1 | -1 |  1 |  1 |  1 | 4.2358 | 5.2186 |
| 5  | 0 | 0 | 0 | 0 |  1 | -1 |  1 |  1 | -1 |  1 | 4.4787 | 5.8077 |
| 6  | 0 | 0 | 0 | 0 | -1 |  1 | -1 | -1 |  1 | -1 | 4.4787 | 5.8077 |
| 7  | 0 | 0 | 0 | 0 |  1 | -1 | -1 |  1 |  1 |  1 | 4.2358 | 5.8869 |
| 8  | 0 | 0 | 0 | 0 | -1 |  1 |  1 |  1 | -1 | -1 | 4.2358 | 5.8869 |
| 9  | 0 | 0 | 0 | 0 |  1 |  1 |  1 | -1 | -1 |  1 | 6.005  | 6.1694 |
| 10 | 0 | 0 | 0 | 0 | -1 | -1 | -1 |  1 |  1 | -1 | 6.005  | 6.1694 |

In Another Possible Implementation, the Complete 80 MHz Sequence May be Used for Construction.

$$EHTS_{-1520:16:1520}=\{c_1 \cdot HES'_{-496:16:496}, 0, c_2 \cdot HES'_{-496:16:496}, 0, c_3 \cdot HES'_{-496:16:496}\} \cdot (1+j)/\sqrt{2},$$

where $EHTS_{\pm1520}=0$, a value of $c_j$ is $\{-1,1\}$, and j=1, 2, or 3.

Inverse Fourier transform and 5-fold oversampling are performed on different $EHTS_{-1520:16:1520}$ sequences determined by using the value of $c_j$, to obtain a time domain discrete value X for each group of sequences, and then a PAPR is calculated according to the formula. After exhaustive retrieval, all possible $EHTS_{-1520:16:1520}$ sequence values and corresponding PAPRs may be obtained, and a sequence with a smaller PAPR is selected from the possible $EHTS_{-1520:16:1520}$ sequence values.

Therefore, 8 optimal groups of parameter set values of $EHTS_{-1520:16:1520}$ may be obtained, as shown in Table 11.

TABLE 11

| Sequence number | $c_1$ | $c_2$ | $c_3$ | PAPR | PAPR up_sampling |
|---|---|---|---|---|---|
| 1 |  1 | -1 | -1 | 6.2795 | 6.9425 |
| 2 | -1 |  1 |  1 | 6.2795 | 6.9425 |
| 3 |  1 |  1 | -1 | 6.2795 | 7.0887 |
| 4 | -1 | -1 |  1 | 6.2795 | 7.0887 |
| 5 |  1 |  1 |  1 | 7.6203 | 7.7865 |
| 6 | -1 | -1 | -1 | 7.6203 | 7.7865 |
| 7 |  1 | -1 |  1 | 6.2795 | 9.357 |
| 8 | -1 |  1 | -1 | 6.2795 | 9.357 |

Case 2: The Bandwidth of the Target Channel is 240 MHz, and the Period Duration of the Reference Channel is 1.6 µs.

In this embodiment, a frequency domain sequence of an EHT-STF whose bandwidth is 240 MHz and period length is 1.6 µs is denoted as $EHTS_{-1528:8:1528}$, and $EHTS_{-1528:8:1528}$ may be constructed in the following plurality of manners.

1. A 20 MHz Sequence in the IEEE 802.11ax is Used for Construction.

In this embodiment, a frequency domain sequence of an HE-STF whose bandwidth is 20 MHz and period length is 1.6 µs in the IEEE 802.11ax is denoted as $HES_{-120:8:120}$, and $HES_{-120:8:120}=\{M,0,-M\} \cdot (1+j)/\sqrt{2}$. $HES'_{-120:8:120}=HES_{-120:8:120} \cdot \sqrt{2}/(1+j)=\{M,0,-M\}$ is denoted. In other words, $HES'_{-120:8:120}$ is represented as $\{M,0,-M\}$, and accordingly, $-HES'_{-120:8:120}$ is represented as $\{-M,0,M\}$. A formula is as follows:

$$EHTS_{-1528:8:1528}=\{c_1 \cdot HES'_{-120:8:120}, a_1, c_2 \cdot HES'_{-120:8:120}, 0, c_3 \cdot HES'_{-120:8:120}, a_2, c_4 \cdot HES'_{-120:8:120}, a_3, c_5 \cdot HES'_{-120:8:120}, a_4, c_6 \cdot HES'_{-120:8:120}, 0, c_7 \cdot HES'_{-120:8:120}, a_5, c_8 \cdot HES'_{-120:8:120}, a_6, c_9 \cdot HES'_{-120:8:120}, a_7, c_{10} \cdot HES'_{-120:8:120}, 0, c_{11} \cdot HES'_{-120:8:120}, a_8, c_{12} \cdot HES'_{-120:8:120}\},$$ and $EHTS_{\pm1528}=0$, where a value of $a_i$ is $\{-1,0,1\}$, i=1, 2, ..., or 8, a value of $c_j$ is $\{-1,1\}$, and j=1, 2, ..., or 12.

Inverse Fourier transform and 5-fold oversampling are performed on different $EHTS_{-1528:8:1528}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1528:8:1528}$ sequence values and corresponding PAPRs may be obtained, and a sequence with a smaller PAPR is selected from the possible $EHTS_{-1528:8:1528}$ sequence values.

If $a_i$ is neither a direct current subcarrier nor a null subcarrier, the value of $a_i$ is $\{-1,1\}$, and 20 optimal groups of parameter set values of $EHTS_{-1528:8:1528}$ may be obtained, as shown in Table 12.

TABLE 12

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 1  |  1 |  1 | -1 |  1 |  1 | -1 |  1 |  1 |  1 |  1 | -1 | -1 | -1 | -1 |  1 | -1 | -1 |  1 | -1 |    | 5.9815 | 6.168 |
| 2  |  1 |  1 | -1 |  1 |  1 | -1 |  1 |  1 | -1 |  1 |  1 | -1 |  1 |  1 |  1 | -1 | -1 |  1 | -1 |    | 5.9815 | 6.168 |
| 3  | -1 | -1 |  1 | -1 | -1 |  1 | -1 | -1 | -1 |  1 | -1 | -1 |  1 | -1 | -1 | -1 |  1 |  1 |  1 |    | 5.9815 | 6.168 |
| 4  | -1 | -1 |  1 | -1 | -1 |  1 | -1 | -1 | -1 | -1 |  1 |  1 |  1 |  1 |  1 | -1 |  1 | -1 | -1 |    | 5.9815 | 6.168 |
| 5  |  1 |  1 | -1 |  1 |  1 | -1 |  1 |  1 |  1 |  1 | -1 |  1 | -1 |  1 |  1 | -1 |  1 | -1 |  1 |    | 5.8146 | 6.185 |
| 6  | -1 |  1 |  1 |  1 |  1 | -1 | -1 |  1 | -1 |  1 |  1 | -1 |  1 |  1 |  1 |  1 |  1 |  1 |  1 |    | 5.8146 | 6.1849 |
| 7  |  1 | -1 | -1 | -1 | -1 |  1 |  1 | -1 |  1 | -1 | -1 |  1 | -1 |  1 | -1 | -1 | -1 | -1 | -1 |    | 5.8146 | 6.1849 |
| 8  | -1 | -1 |  1 | -1 | -1 |  1 | -1 | -1 | -1 | -1 |  1 | -1 |  1 | -1 | -1 |  1 | -1 |  1 | -1 |    | 5.8146 | 6.185 |
| 9  |  1 |  1 | -1 |  1 |  1 | -1 |  1 |  1 |  1 | -1 | -1 | -1 | -1 |  1 | -1 | -1 |  1 | -1 | -1 |    | 6.0501 | 6.2053 |
| 10 | -1 | -1 |  1 | -1 | -1 |  1 | -1 | -1 | -1 |  1 |  1 |  1 |  1 | -1 |  1 |  1 | -1 |  1 | -1 |    | 6.0501 | 6.2052 |

TABLE 12-continued

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 11 | 1 | 1 | −1 | 1 | 1 | −1 | 1 | 1 | −1 | 1 | −1 | −1 | 1 | 1 | −1 | −1 | −1 | 1 | 1 | 1 | 6.0501 | 6.2052 |
| 12 | 1 | 1 | −1 | 1 | 1 | −1 | 1 | 1 | −1 | −1 | 1 | 1 | −1 | −1 | 1 | 1 | 1 | 1 | −1 | 1 | 6.0501 | 6.2053 |
| 13 | 1 | 1 | 1 | 1 | −1 | −1 | −1 | −1 | 1 | 1 | 1 | 1 | −1 | 1 | −1 | 1 | 1 | −1 | −1 | 1 | 5.8146 | 6.2168 |
| 14 | 1 | 1 | 1 | 1 | −1 | −1 | −1 | −1 | 1 | −1 | −1 | 1 | 1 | −1 | 1 | −1 | 1 | 1 | 1 | 1 | 5.8146 | 6.2167 |
| 15 | −1 | −1 | −1 | −1 | 1 | 1 | 1 | 1 | −1 | 1 | 1 | −1 | −1 | 1 | −1 | 1 | −1 | −1 | −1 | −1 | 5.8146 | 6.2167 |
| 16 | −1 | −1 | −1 | −1 | 1 | 1 | 1 | 1 | −1 | −1 | −1 | −1 | 1 | −1 | 1 | −1 | −1 | 1 | 1 | −1 | 5.8146 | 6.2168 |
| 17 | 1 | −1 | 1 | 1 | −1 | 1 | −1 | −1 | 1 | 1 | 1 | 1 | −1 | −1 | 1 | 1 | −1 | −1 | 1 | 1 | 5.7529 | 6.2274 |
| 18 | 1 | 1 | −1 | 1 | −1 | −1 | 1 | −1 | 1 | −1 | −1 | 1 | 1 | −1 | 1 | −1 | 1 | 1 | 1 | 1 | 5.7529 | 6.2273 |
| 19 | −1 | 1 | 1 | −1 | 1 | 1 | −1 | 1 | 1 | −1 | 1 | 1 | −1 | 1 | −1 | 1 | −1 | −1 | −1 | −1 | 5.7529 | 6.2273 |
| 20 | −1 | 1 | −1 | −1 | 1 | −1 | 1 | 1 | −1 | −1 | −1 | −1 | 1 | −1 | 1 | −1 | −1 | 1 | 1 | −1 | 5.7529 | 6.2274 |

If $a_3$ and $a_6$ are separately a direct current subcarrier or a null subcarrier, $a_3=0$, $a_6=0$, the value of $a_i$ other than $a_3$ and $a_6$ is $\{-1,1\}$, and 12 optimal groups of parameter set values of $EHTS_{-1528:8:1528}$ may be obtained, as shown in Table 13.

TABLE 13

| Sequence number | $a_1$ | $a_2$ | $a_3$ | $a_4$ | $a_5$ | $a_6$ | $a_7$ | $a_8$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | PAPR | PAPR up_sampling |
|---|---|---|---|---|---|---|---|---|---|---|---|---|---|---|---|---|---|---|---|---|---|---|
| 1 | −1 | 1 | 0 | −1 | 1 | 0 | −1 | 1 | 1 | −1 | 1 | 1 | −1 | 1 | 1 | 1 | 1 | −1 | −1 | −1 | 5.918 | 6.2275 |
| 2 | 1 | −1 | 0 | 1 | −1 | 0 | 1 | −1 | −1 | 1 | −1 | −1 | 1 | −1 | −1 | −1 | −1 | 1 | 1 | 1 | 5.918 | 6.2275 |
| 3 | 1 | −1 | 0 | 1 | −1 | 0 | 1 | −1 | 1 | 1 | 1 | −1 | 1 | −1 | 1 | 1 | 1 | −1 | −1 | −1 | 5.918 | 6.2276 |
| 4 | −1 | 1 | 0 | −1 | 1 | 0 | −1 | 1 | −1 | −1 | −1 | 1 | −1 | 1 | −1 | −1 | −1 | 1 | 1 | 1 | 5.918 | 6.2276 |
| 5 | −1 | −1 | 0 | −1 | 1 | 0 | 1 | 1 | −1 | 1 | −1 | −1 | 1 | 1 | −1 | −1 | −1 | −1 | −1 | −1 | 5.8639 | 6.2575 |
| 6 | 1 | 1 | 0 | 1 | −1 | 0 | −1 | −1 | 1 | −1 | 1 | 1 | −1 | −1 | 1 | 1 | 1 | 1 | 1 | 1 | 5.8639 | 6.2575 |
| 7 | 1 | 1 | 0 | 1 | −1 | 0 | −1 | −1 | 1 | 1 | 1 | 1 | 1 | −1 | −1 | 1 | 1 | −1 | 1 | −1 | 5.8639 | 6.2578 |
| 8 | −1 | −1 | 0 | −1 | 1 | 0 | 1 | 1 | −1 | −1 | −1 | −1 | −1 | 1 | −1 | −1 | 1 | −1 | 1 | −1 | 5.8639 | 6.2578 |
| 9 | 1 | −1 | 0 | −1 | −1 | 0 | 1 | 1 | 1 | 1 | 1 | 1 | −1 | 1 | −1 | 1 | 1 | −1 | −1 | 1 | 5.9585 | 6.261 |
| 10 | −1 | 1 | 0 | 1 | 1 | 0 | −1 | −1 | 1 | −1 | −1 | −1 | 1 | −1 | 1 | −1 | 1 | 1 | 1 | 1 | 5.9585 | 6.2609 |
| 11 | 1 | −1 | 0 | −1 | −1 | 0 | 1 | 1 | −1 | 1 | −1 | −1 | 1 | −1 | 1 | −1 | −1 | 1 | 1 | −1 | 5.9585 | 6.2609 |
| 12 | −1 | 1 | 0 | 1 | 1 | 0 | −1 | −1 | −1 | −1 | −1 | −1 | −1 | 1 | −1 | 1 | 1 | −1 | −1 | −1 | 5.9585 | 6.261 |

2. A 160 MHz Sequence and an 80 MHz Sequence in the IEEE 802.11ax are Used for Construction.

In this embodiment, a frequency domain sequence of an HE-STF whose bandwidth is 160 MHz and period length is 1.6 μs in the IEEE 802.11ax is denoted as $HES_{-1016:8:1016}$, a frequency domain sequence of an HE-STF whose bandwidth is 80 MHz and period length is 1.6 μs in the IEEE 802.11ax is denoted as $HES_{-504:8:504}$, $HES_{-1016:8:1016}=\{M,-1,M,-M,-1,M,0,-M,1,M,1,-M,$
$1,-M,0,-M,1,-M,1,M,1,-M,0,-M,1,M,1,-M,1,$
$-M\}\cdot(1+j)/\sqrt{2}$, and $HES_{-504:8:504}=\{M,-1,M,-1,-M,-1,M,0,-M,1,M,1,$
$-M,1,-M\}\cdot(1+j)/\sqrt{2}$.

$HES'_{-1016:8:1016}=HES_{-1016:8:1016}\cdot$
$\sqrt{2}/(1+j)=\{M,-1,M,-M,-1,M,0,-M,1,M,1,-M,1,-M,0,$
$-M,1,-M,1,M,1,-M,0,-M,1,M,1,-M,1,-M\}$ is denoted. In other words, $HES'_{-1016:8:1016}$ is represented as $\{M,-1,M,-M,-1,M,0,-M,1,M,1,-M,1,-M,0,-M,1,-M,1,M,1,-M,0,-M,1,M,1,-M,1,-M\}$, and accordingly, $-HES'_{-1016:8:1016}$ is represented as $\{-M,1,-M,M,1,-M,0,M,-1,-M,-1,M,-1,M,0,M,-1,M,-1,-M,-1,M,0,M,-1,-M,-1,M,-1,M\}$.

$HES'_{-504:8:504}=HES_{-504:8:504}\cdot$
$\sqrt{2}/(1+j)=\{M,-1,M,-1,-M,-1,M,0,-M,1,M,1,-M,1,-M\}$ is denoted. In other words, $HES'_{-504:8:504}$ is represented as $\{M,-1,M,-1,-M,-1,M,0,-M,1,M,1,-M,1,-M\}$, and accordingly, $-HES'_{-504:8:504}$ is represented as $\{-M,1,-M,1,M,1,-M,0,M,-1,-M,-1,M,-1,M\}$.

In a possible implementation, a formula is as follows:

$EHTS_{-1528:8:1528}=\{c_1 \cdot HES'_{-1016:8:1016}\_L, a_1, c_2 \cdot$
$HES'_{-1016:8:1016}\_R, a_2, c_3 \cdot HES'_{-504:8:504}\} \cdot (1+j)/$
$\sqrt{2}$, where $HES'_{-1016:8:1016}\_L=\{M,-1,M,-M,-1,M,0,-M,1,M,1,$
$-M,1,-M\}$ is a left part of $HES'_{-1016:8:1016}$ on a 0 subcarrier,
$HES'_{-1016:8:1016}\_R=\{-M,1,-M,1,M,1,-M,0,-M,1,M,$
$1,-M,1,-M\}$ is a right part of $HES'_{-1016:8:1016}$ on a 0 subcarrier, and
$EHTS_{\pm 1528}=0$, where
a value of $a_i$ is $\{-1,0,1\}$, $i=1$ or 2, a value of $c_j$ is $\{-1,1\}$, and $j=1$, 2, or 3.

Inverse Fourier transform and 5-fold oversampling are performed on different $EHTS_{-1528:8:1528}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1528:8:1528}$ sequence values and corresponding PAPRs may be obtained, and a sequence with a smaller PAPR is selected from the possible $EHTS_{-1528:8:1528}$ sequence values.

If $a_1$ and $a_2$ are separately a direct current subcarrier or a null subcarrier, $a_1=0$, $a_2=0$, the value of $a_i$ other than $a_1$ and $a_2$ is $\{-1,1\}$, and four optimal groups of parameter set values of $EHTS_{-1528:8:1528}$ may be obtained, as shown in Table 14. In this case, the foregoing formula may also be expressed as:
$EMS_{-1528:8:1528}=\{c_1 \cdot HES'_{-1016:8:1016}, 0, c_2 \cdot HES'_{-504:8:504}\} \cdot$
$(1+j)/\sqrt{2}$.

TABLE 14

| Sequence number | $a_1$ | $a_2$ | $c_1$ | $c_2$ | $c_3$ | PAPR | PAPR up_sampling |
|---|---|---|---|---|---|---|---|
| 1 | 0 | 0 | 1 | 1 | 1 | 6.3979 | 7.1543 |
| 2 | 0 | 0 | −1 | −1 | −1 | 6.3979 | 7.1543 |

TABLE 14-continued

| Sequence number | $a_1$ | $a_2$ | $c_1$ | $c_2$ | $c_3$ | PAPR | PAPR up_sampling |
|---|---|---|---|---|---|---|---|
| 3 | 0 | 0 | 1 | 1 | −1 | 7.5459 | 8.4069 |
| 4 | 0 | 0 | −1 | −1 | 1 | 7.5459 | 8.4069 |

If $a_2$ is a direct current subcarrier or a null subcarrier, $a_2=0$, the value of $a_i$ other than $a_2$ is $\{-1,1\}$, and 16 optimal groups of parameter set values of $EHTS_{-1528:8:1528}$ may be obtained, as shown in Table 15.

TABLE 15

| Sequence number | $a_1$ | $a_2$ | $c_1$ | $c_2$ | $c_3$ | PAPR | PAPR up_sampling |
|---|---|---|---|---|---|---|---|
| 1 | 1 | 0 | 1 | 1 | 1 | 6.4242 | 6.9801 |
| 2 | −1 | 0 | −1 | −1 | −1 | 6.4242 | 6.9801 |
| 3 | −1 | 0 | 1 | 1 | 1 | 6.3536 | 7.3031 |
| 4 | 1 | 0 | −1 | −1 | −1 | 6.3536 | 7.3031 |
| 5 | 1 | 0 | 1 | 1 | −1 | 7.5656 | 8.3864 |
| 6 | −1 | 0 | −1 | −1 | 1 | 7.5656 | 8.3864 |
| 7 | −1 | 0 | 1 | 1 | −1 | 7.7082 | 8.5643 |
| 8 | 1 | 0 | −1 | −1 | 1 | 7.7082 | 8.5643 |
| 9 | 1 | 0 | 1 | 1 | 1 | 6.4242 | 6.9801 |
| 10 | −1 | 0 | 1 | 1 | 1 | 6.3536 | 7.3031 |
| 11 | 1 | 0 | 1 | 1 | −1 | 7.5656 | 8.3864 |
| 12 | −1 | 0 | 1 | 1 | −1 | 7.7082 | 8.5643 |
| 13 | 1 | 0 | −1 | −1 | 1 | 7.7082 | 8.5643 |
| 14 | −1 | 0 | −1 | −1 | 1 | 7.5656 | 8.3864 |
| 15 | 1 | 0 | −1 | −1 | −1 | 6.3536 | 7.3031 |
| 16 | −1 | 0 | −1 | −1 | −1 | 6.4242 | 6.9801 |

In another possible implementation, a formula is as follows:

$$EHTS_{-1528:8:1528}=\{c_1 \cdot HES'_{-504:8:504}, a_1, c_2 \cdot HES'_{-1016:8:1016}\_L, a_2, c_3 \cdot HES'_{-1016:8:1016}\_R\} \cdot (1+j)/\sqrt{2}, \text{ where}$$

$HES'_{-1016:8:1016}\_L=\{M,-1,M,-M,-1,M,0,-M,1,M,1,-M,1,-M\}$ is a left part of $HES'_{-1016:8:1016}$ on a 0 subcarrier, $HES'_{-1016:8:1016}\_R=\{-M,1,-M,1,M,1,-M,0,-M,1,M,1,-M,1,-M\}$ is a right part of $HES'_{-1016:8:1016}$ on a 0 subcarrier, and $EHTS_{\pm 1528}=0$, where a value of $a_i$ is $\{-1,0,1\}$, i=1 or 2, a value of $c_j$ is $\{-1,1\}$, and j=1, 2, or 3.

Inverse Fourier transform and 5-fold oversampling are performed on different $EHTS_{-1528:8:1528}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1528:8:1528}$ sequence values and corresponding PAPRs may be obtained, and a sequence with a smaller PAPR is selected from the possible $EHTS_{-1528:8:1528}$ sequence values.

If $a_1$ and $a_2$ are separately a direct current subcarrier or a null subcarrier, $a_1=0$, $a_2=0$, the value of $a_i$ other than $a_1$ and $a_2$ is $\{-1,1\}$, and four optimal groups of parameter set values of $EHTS_{-1528:8:1528}$ may be obtained, as shown in Table 16.

TABLE 16

| Sequence number | $a_1$ | $a_2$ | $c_1$ | $c_2$ | $c_3$ | PAPR | PAPR up_sampling |
|---|---|---|---|---|---|---|---|
| 1 | 0 | 0 | 1 | −1 | −1 | 7.5768 | 8.1803 |
| 2 | 0 | 0 | −1 | 1 | 1 | 7.5768 | 8.1803 |

TABLE 16-continued

| Sequence number | $a_1$ | $a_2$ | $c_1$ | $c_2$ | $c_3$ | PAPR | PAPR up_sampling |
|---|---|---|---|---|---|---|---|
| 3 | 0 | 0 | 1 | 1 | 1 | 6.3979 | 8.661 |
| 4 | 0 | 0 | −1 | −1 | −1 | 6.3979 | 8.661 |

If $a_1$ is a direct current subcarrier or a null subcarrier, $a_1=0$, the value of $a_i$ other than $a_1$ is $\{-1,1\}$, and eight optimal groups of parameter set values of $EHTS_{-1528:8:1528}$ may be obtained, as shown in Table 17.

TABLE 17

| Sequence number | $a_1$ | $a_2$ | $c_1$ | $c_2$ | $c_3$ | PAPR | PAPR up_sampling |
|---|---|---|---|---|---|---|---|
| 1 | 0 | −1 | 1 | −1 | −1 | 7.4815 | 7.9895 |
| 2 | 0 | 1 | −1 | 1 | 1 | 7.4815 | 7.9895 |
| 3 | 0 | 1 | 1 | −1 | −1 | 7.7379 | 8.3436 |
| 4 | 0 | −1 | −1 | 1 | 1 | 7.7379 | 8.3436 |
| 5 | 0 | 1 | 1 | 1 | 1 | 6.4242 | 8.6076 |
| 6 | 0 | −1 | −1 | −1 | −1 | 6.4242 | 8.6076 |
| 7 | 0 | −1 | 1 | 1 | 1 | 6.3536 | 8.6933 |
| 8 | 0 | 1 | −1 | −1 | −1 | 6.3536 | 8.6933 |

3. The 80 MHz Sequence in the IEEE 802.11ax is Used for Construction.

In this embodiment, the frequency domain sequence of the HE-STF whose bandwidth is 80 MHz and period length is 1.6 µs in the IEEE 802.11ax is denoted as $HES_{-504:8:504}$, and $HES_{-504:8:504}=\{M,-1,M,-1,-M,-1,M,0,-M,1,M,1,-M,1,-M\} \cdot (1+j)/\sqrt{2}$. $HES'_{-504:8:504}=HES_{-504:8:504} \cdot \sqrt{2}/(1-j)=\{M,-1,M,-1,-M,-1,M,0,-M,1,M,1,-M,1,-M\}$ is denoted. In other words, $HES'_{-504:8:504}$ is represented as $\{M,-1,M,-1,-M,-1,M,0,-M,1,M,1,-M,1,-M\}$, and accordingly, $-HES'_{-504:8:504}$ is represented as $\{-M,1,-M,1,M,1,-M,0,M,-1,-M,-1,M,-1,M\}$.

In a Possible Implementation, a Half of the 80 MHz Sequence May be Used for Construction.

$$EHTS_{-1528:8:1528}=\{c_1 \cdot HES'_{-504:8:504}\_L, a_1, c_2 \cdot HES'_{-504:8:504}\_R, a_2, c_3 \cdot HES'_{-504:8:504}\_L, 0, c_4 \cdot HES'_{-504:8:504}\_R, a_3, c_5 \cdot HES'_{-504:8:504}\_L, a_4, c_6 \cdot HES'_{-504:8:504}\_R\} \cdot (1+j)/\sqrt{2}, \text{ where}$$

$HES'_{-504:8:504}\_L=\{M,-1,M,-1,-M,-1,M\}$ is a left part of $HES'_{-504:8:504}$ on a 0 subcarrier, $HES'_{-504:8:504}\_R=\{-M,1,M,1,-M,1,-M\}$ is a right part of $HES'_{-504:8:504}$ on a 0 subcarrier, and $EHTS_{\pm 1528}=0$, where a value of $a_i$ is $\{-1,0,1\}$, i=1, 2, . . . , or 4, a value of $c_j$ is $\{-1,1\}$, and j=1, 2, . . . , or 6.

Inverse Fourier transform and 5-fold oversampling are performed on different $EHTS_{-1528:8:1528}$ sequences determined by using the value of $a_i$ and the value of $c_j$, to obtain a time domain discrete value X for each group of sequences, and then a PAPR is calculated according to the formula. After exhaustive retrieval, all possible $EHTS_{-1528:8:1528}$ sequence values and corresponding PAPRs may be obtained, and a sequence with a smaller PAPR is selected from the possible $EHTS_{-1528:8:1528}$ sequence values.

If $a_i$ is neither a direct current subcarrier nor a null subcarrier, the value of $a_i$ is $\{-1,1\}$, and 20 optimal groups of parameter set values of $EHTS_{-1528:8:1528}$ may be obtained, as shown in Table 18.

TABLE 18

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1 | 1 | 1 | −1 | 1 | 1 | 1 | 1 | −1 | 1 | 1 | 6.4915 | 6.7752 |
| 2 | −1 | 1 | −1 | −1 | 1 | 1 | −1 | 1 | 1 | 1 | 6.4915 | 6.775 |
| 3 | 1 | −1 | 1 | 1 | −1 | −1 | 1 | −1 | −1 | −1 | 6.4915 | 6.775 |
| 4 | −1 | −1 | 1 | −1 | −1 | −1 | −1 | 1 | −1 | −1 | 6.4915 | 6.7752 |
| 5 | −1 | 1 | −1 | 1 | 1 | 1 | 1 | −1 | 1 | 1 | 6.352 | 6.8126 |
| 6 | −1 | 1 | −1 | 1 | 1 | 1 | −1 | 1 | 1 | 1 | 6.352 | 6.8125 |
| 7 | 1 | −1 | 1 | −1 | −1 | −1 | 1 | −1 | −1 | −1 | 6.352 | 6.8125 |
| 8 | 1 | −1 | 1 | −1 | −1 | −1 | −1 | 1 | −1 | −1 | 6.352 | 6.8126 |
| 9 | 1 | 1 | −1 | −1 | 1 | 1 | 1 | −1 | 1 | 1 | 6.352 | 6.8317 |
| 10 | 1 | 1 | −1 | −1 | 1 | 1 | −1 | 1 | 1 | 1 | 6.352 | 6.8316 |
| 11 | −1 | −1 | 1 | 1 | −1 | −1 | 1 | −1 | −1 | −1 | 6.352 | 6.8316 |
| 12 | −1 | −1 | 1 | 1 | −1 | −1 | −1 | 1 | −1 | −1 | 6.352 | 6.8317 |
| 13 | 1 | 1 | −1 | −1 | 1 | 1 | −1 | −1 | −1 | 1 | 6.0091 | 7.0364 |
| 14 | 1 | 1 | −1 | −1 | −1 | −1 | −1 | 1 | 1 | −1 | 6.0091 | 7.0365 |
| 15 | −1 | −1 | 1 | 1 | −1 | −1 | 1 | 1 | 1 | −1 | 6.0091 | 7.0365 |
| 16 | −1 | −1 | 1 | 1 | −1 | −1 | 1 | 1 | 1 | −1 | 6.0091 | 7.0364 |
| 17 | 1 | 1 | 1 | 1 | 1 | 1 | 1 | −1 | 1 | 1 | 6.6457 | 7.04 |
| 18 | −1 | −1 | −1 | −1 | 1 | 1 | −1 | 1 | 1 | 1 | 6.6457 | 7.0398 |
| 19 | 1 | 1 | 1 | 1 | −1 | −1 | 1 | −1 | −1 | −1 | 6.6457 | 7.0398 |
| 20 | −1 | −1 | −1 | −1 | −1 | −1 | −1 | 1 | −1 | −1 | 6.6457 | 7.04 |

If $a_1$ and $a_4$ are separately a direct current subcarrier or a null subcarrier, $a_1=0$, $a_4=0$, the value of $a_i$ other than $a_1$ and $a_4$ is $\{-1,1\}$, and 16 optimal groups of parameter set values of $EHTS_{-1528:8:1528}$ may be obtained, as shown in Table 19.

TABLE 19

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1 | 0 | 1 | −1 | 0 | 1 | 1 | 1 | −1 | 1 | 1 | 6.3749 | 6.8152 |
| 2 | 0 | 1 | −1 | 0 | 1 | 1 | −1 | 1 | 1 | 1 | 6.3749 | 6.8151 |
| 3 | 0 | −1 | 1 | 0 | −1 | −1 | 1 | −1 | −1 | −1 | 6.3749 | 6.8151 |
| 4 | 0 | −1 | 1 | 0 | −1 | −1 | −1 | 1 | −1 | −1 | 6.3749 | 6.8152 |
| 5 | 0 | 1 | 1 | 0 | 1 | 1 | 1 | −1 | −1 | −1 | 6.1156 | 7.0878 |
| 6 | 0 | −1 | −1 | 0 | −1 | −1 | −1 | 1 | 1 | 1 | 6.1156 | 7.0878 |
| 7 | 0 | 1 | −1 | 0 | 1 | 1 | −1 | −1 | 1 | 1 | 6.1855 | 7.1027 |
| 8 | 0 | 1 | −1 | 0 | 1 | −1 | −1 | 1 | 1 | 1 | 6.1855 | 7.1028 |
| 9 | 0 | −1 | 1 | 0 | −1 | 1 | 1 | −1 | −1 | −1 | 6.1855 | 7.1028 |
| 10 | 0 | −1 | 1 | 0 | −1 | −1 | 1 | 1 | −1 | −1 | 6.1855 | 7.1027 |
| 11 | 0 | 1 | 1 | 0 | 1 | 1 | 1 | −1 | −1 | 1 | 6.359 | 7.1239 |
| 12 | 0 | −1 | −1 | 0 | 1 | 1 | −1 | 1 | 1 | −1 | 6.359 | 7.1237 |
| 13 | 0 | 1 | 1 | 0 | −1 | −1 | 1 | −1 | −1 | 1 | 6.359 | 7.1237 |
| 14 | 0 | −1 | −1 | 0 | −1 | −1 | 1 | 1 | 1 | −1 | 6.359 | 7.1239 |
| 15 | 0 | 1 | 1 | 0 | 1 | 1 | −1 | 1 | 1 | 1 | 6.5145 | 7.1515 |
| 16 | 0 | −1 | −1 | 0 | −1 | −1 | 1 | −1 | −1 | −1 | 6.5145 | 7.1515 |

If $a_i$ is a direct current subcarrier or a null subcarrier, $a_i=0$, and 16 optimal groups of parameter set values of $EHTS_{-1528:8:1528}$ may be obtained, as shown in Table 20.

TABLE 20

| Sequence number | $a_1$ | $a_2$ | $a_3$ | $a_4$ | $c_1$ | $c_2$ | $c_3$ | $c_4$ | $c_5$ | $c_6$ | PAPR | PAPR up_sampling |
|---|---|---|---|---|---|---|---|---|---|---|---|---|
| 1 | 0 | 0 | 0 | 0 | 1 | 1 | 1 | −1 | 1 | 1 | 6.3979 | 7.1544 |
| 2 | 0 | 0 | 0 | 0 | 1 | 1 | −1 | 1 | 1 | 1 | 6.3979 | 7.1543 |
| 3 | 0 | 0 | 0 | 0 | −1 | −1 | 1 | −1 | −1 | −1 | 6.3979 | 7.1543 |
| 4 | 0 | 0 | 0 | 0 | −1 | −1 | −1 | 1 | −1 | −1 | 6.3979 | 7.1544 |
| 5 | 0 | 0 | 0 | 0 | 1 | 1 | 1 | −1 | −1 | −1 | 6.2344 | 7.1717 |
| 6 | 0 | 0 | 0 | 0 | −1 | −1 | −1 | 1 | 1 | 1 | 6.2344 | 7.1717 |
| 7 | 0 | 0 | 0 | 0 | 1 | −1 | 1 | 1 | 1 | −1 | 7.146 | 7.4304 |
| 8 | 0 | 0 | 0 | 0 | 1 | −1 | −1 | −1 | 1 | −1 | 7.146 | 7.4304 |
| 9 | 0 | 0 | 0 | 0 | −1 | 1 | 1 | 1 | −1 | 1 | 7.146 | 7.4304 |
| 10 | 0 | 0 | 0 | 0 | −1 | 1 | −1 | −1 | −1 | 1 | 7.146 | 7.4304 |
| 11 | 0 | 0 | 0 | 0 | 1 | 1 | −1 | −1 | −1 | 1 | 5.9854 | 7.4694 |
| 12 | 0 | 0 | 0 | 0 | 1 | −1 | −1 | 1 | 1 | −1 | 5.9854 | 7.4695 |
| 13 | 0 | 0 | 0 | 0 | −1 | 1 | 1 | −1 | −1 | 1 | 5.9854 | 7.4695 |
| 14 | 0 | 0 | 0 | 0 | −1 | −1 | 1 | 1 | 1 | −1 | 5.9854 | 7.4694 |
| 15 | 0 | 0 | 0 | 0 | 1 | −1 | 1 | −1 | 1 | 1 | 6.6825 | 7.5411 |
| 16 | 0 | 0 | 0 | 0 | −1 | 1 | −1 | 1 | −1 | −1 | 6.6825 | 7.5411 |

In Another Possible Implementation, the Complete 80 MHz Sequence May be Used for Construction.

$$EHTS_{-1528:8:1528} = \{c_1 \cdot HES'_{-504:8:504}, 0, c_2 \cdot HES'_{-504:8:504}, 0, c_3 \cdot HES'_{-504:8:504}\} \cdot (1+j)/\sqrt{2},$$
where $EHTS_{\pm 1528} = 0$, a value of $c_j$ is $\{-1,1\}$, and j=1, 2, or 3.

Inverse Fourier transform and 5-fold oversampling are performed on different $EHTS_{-1528:8:1528}$ sequences determined by using the value of $c_j$, to obtain a time domain discrete value X for each group of sequences, and then a PAPR is calculated according to the formula. After exhaustive retrieval, all possible $EHTS_{-1528:8:1528}$ sequence values and corresponding PAPRs may be obtained, and a sequence with a smaller PAPR is selected from the possible $EHTS_{-1528:8:1528}$ sequence values.

Therefore, eight optimal groups of parameter set values of $EHTS_{-1528:8:1528}$ may be obtained, as shown in Table 21.

TABLE 21

| Sequence number | $c_1$ | $c_2$ | $c_3$ | PAPR | PAPR up_sampling |
|---|---|---|---|---|---|
| 1 | 1 | 1 | -1 | 7.046 | 7.8053 |
| 2 | 1 | -1 | -1 | 7.046 | 7.8052 |
| 3 | -1 | 1 | 1 | 7.046 | 7.8052 |
| 4 | -1 | -1 | 1 | 7.046 | 7.8053 |
| 5 | 1 | 1 | 1 | 9.1829 | 9.339 |
| 6 | -1 | -1 | -1 | 9.1829 | 9.339 |
| 7 | 1 | -1 | 1 | 6.7259 | 10.462 |
| 8 | -1 | 1 | -1 | 6.7259 | 10.462 |

A case 3 and a case 4 are for the EHT-STF of the 320 MHz channel bandwidth. Before the EHT-STF of the 320 MHz channel bandwidth is described, a 320 MHz subcarrier allocation pattern (tone plan) is described. As described above, a tone plan of an 80 MHz channel bandwidth specified in 802.11ax has a total of 1024 subcarriers whose subscripts range from -511 to 512. There are 12 and 11 guard subcarriers (guard tone) on left and right edges of the bandwidth respectively, and 5 direct current subcarriers in the middle of the bandwidth. The tone plan of the 320 MHz channel bandwidth in this embodiment may be obtained by concatenating four 80 MHz tone plans. Left-sideband subcarriers and right-sideband subcarriers of the four 80 MHz bandwidths and direct current subcarriers in the middle of each of the four 80 MHz bandwidths are reserved. In this way, the bandwidth of 320 MHz has a total of 1024×4=4096 subcarriers. There are 12 and 11 guard subcarriers on the left and right edges respectively, and 23 direct current subcarriers in the middle of the bandwidth.

Case 3: The Bandwidth of the Target Channel is 320 MHz, and the Period Duration of the Reference Channel is 0.8 μs.

In this embodiment, a frequency domain sequence of an EHT-STF whose bandwidth is 320 MHz and period length is 0.8 μs is denoted as $EHTS_{-2032:16:2032}$, and $EHTS_{-2032:16:2032}$ may be constructed in the following plurality of manners.

1. The 20 MHz Sequence in the IEEE 802.11ax is Used for Construction.

In this embodiment, the frequency domain sequence of the HE-STF whose bandwidth is 20 MHz and period length is 0.8 μs in the IEEE 802.11ax is denoted as $HES_{-112:16:112}$, and $HES_{-112:16:112} = \{M\} \cdot (1+j)/\sqrt{2}$. $HES'_{-112:16:112} = HES_{-112:16:112} \cdot \sqrt{2}/(1+j) = \{M\}$ is denoted. In other words, $HES'_{-112:16:112}$ is represented as $\{M\}$, and accordingly, $-HES'_{-112:16:112}$ is represented as $\{-M\}$. A formula is as follows:

$$EHTS_{-2032:16:2032} = \{c_1 \cdot HES'_{-112:16:112}, a_1, c_2 \cdot HES'_{-112:16:112}, 0, c_3 \cdot HES'_{-112:16:112}, a_2, c_4 \cdot HES'_{-112:16:112}, a_3, c_5 \cdot HES'_{-112:16:112}, a_4, c_6 \cdot HES'_{-112:16:112}, 0, c_7 \cdot HES'_{-112:16:112}, a_5, c_8 \cdot HES'_{-112:16:112}, a_6, c_9 \cdot HES'_{-112:16:112}, a_7, c_{10} \cdot HES'_{-112:16:112}, 0, c_{11} \cdot HES'_{-112:16:112}, a_8, c_{12} \cdot HES'_{-112:16:112}, a_9, c_{13} \cdot HES'_{-112:16:112}, a_{10}, c_{14} \cdot HES'_{-112:16:112}, 0, c_{15} \cdot HES'_{-112:16:112}, a_{11}, c_{16} \cdot HES'_{-112:16:112}\} \cdot (1-j)/\sqrt{2},$$ and $EHTS_{\pm 2032} = 0$, where a value of $a_i$ is $\{-1,0,1\}$, i=1, 2, . . . , or 11, a value of $c_j$ is $\{-1,1\}$, and j=1, 2, . . . , or 16.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

If $a_3$, $a_6$ and $a_9$ are separately a direct current subcarrier or a null subcarrier, $a_3=0$, $a_6=0$, $a_9=0$, the value of $a_i$ other than $a_3$, $a_6$ and $a_9$ is $\{-1,1\}$, and 19 optimal groups of parameter set values of $EHTS_{-2032:16:2032}$ may be obtained, as shown in Table 22.

TABLE 22

| Sequence number | $a_1$ | $a_2$ | $a_3$ | $a_4$ | $a_5$ | $a_6$ | $a_7$ | $a_8$ | $a_9$ | $a_{10}$ | $a_{11}$ | $c_1$ | $c_2$ | $c_3$ | $c_4$ | $c_5$ | $c_6$ |
|---|---|---|---|---|---|---|---|---|---|---|---|---|---|---|---|---|---|
| 1 | 1 | 1 | 0 | -1 | -1 | 0 | 1 | 1 | 0 | -1 | 1 | -1 | 1 | -1 | 1 | 1 | -1 |
| 2 | 1 | 1 | 0 | 1 | 1 | 0 | 1 | 1 | 0 | 1 | 1 | 1 | 1 | -1 | -1 | -1 | 1 |
| 3 | 1 | 1 | 0 | 1 | 1 | 0 | 1 | 1 | 0 | 1 | -1 | 1 | 1 | -1 | 1 | -1 |
| 4 | 1 | 1 | 0 | 1 | 1 | 0 | 1 | 1 | 0 | 1 | -1 | -1 | -1 | -1 | 1 | 1 |
| 5 | 1 | 1 | 0 | 1 | -1 | 0 | 1 | 1 | 0 | 1 | -1 | -1 | -1 | -1 | -1 | 1 | 1 |
| 6 | 1 | 1 | 0 | -1 | 1 | 0 | 1 | 1 | 0 | -1 | 1 | -1 | -1 | -1 | -1 | 1 | 1 |
| 7 | 1 | 1 | 0 | 1 | 1 | 0 | 1 | 1 | 0 | 1 | 1 | -1 | 1 | -1 | 1 | -1 |
| 8 | 1 | 1 | 0 | -1 | 1 | 0 | 1 | 0 | -1 | 1 | 1 | -1 | 1 | -1 | 1 | 1 |
| 9 | 1 | 1 | 0 | -1 | 1 | 0 | 1 | 1 | 0 | -1 | 1 | 1 | 1 | 1 | -1 | -1 |
| 10 | 1 | 1 | 0 | 1 | -1 | 0 | 1 | 1 | 0 | 1 | -1 | -1 | 1 | -1 | 1 | -1 | 1 |
| 11 | 1 | -1 | 0 | 1 | 1 | 0 | -1 | -1 | 0 | 1 | 1 | -1 | -1 | -1 | 1 | 1 | 1 |
| 12 | 1 | -1 | 0 | 1 | -1 | 0 | 1 | 1 | 0 | -1 | -1 | 1 | 1 | 1 | 1 | -1 |
| 13 | 1 | -1 | 0 | 1 | -1 | 0 | 1 | -1 | 0 | 1 | -1 | 1 | -1 | 1 | 1 | 1 |
| 14 | 1 | -1 | 0 | 1 | 1 | 0 | 1 | 1 | 0 | -1 | -1 | -1 | -1 | 1 | 1 | -1 |
| 15 | 1 | -1 | 0 | 1 | -1 | 0 | 1 | -1 | 0 | 1 | -1 | 1 | -1 | 1 | -1 | -1 |
| 16 | 1 | -1 | 0 | 1 | -1 | 0 | -1 | -1 | 0 | -1 | -1 | -1 | -1 | -1 | 1 | 1 |
| 17 | 1 | -1 | 0 | -1 | -1 | 0 | -1 | -1 | 0 | 1 | -1 | -1 | -1 | -1 | 1 | 1 |

TABLE 22-continued

| | | | | | | | | | | | | | | | | |
|---|---|---|---|---|---|---|---|---|---|---|---|---|---|---|---|---|
| 18 | 1 | -1 | 0 | 1 | -1 | 0 | -1 | 1 | 0 | 1 | -1 | -1 | 1 | -1 | 1 | 1 | -1 |
| 19 | 1 | -1 | 0 | -1 | 1 | 0 | 1 | -1 | 0 | 1 | -1 | 1 | 1 | 1 | -1 | -1 | -1 |

| Sequence number | $c_7$ | $c_8$ | $c_9$ | $c_{10}$ | $c_{11}$ | $c_{12}$ | $c_{13}$ | $c_{14}$ | $c_{15}$ | $c_{16}$ | PAPR | PAPR up_sampling |
|---|---|---|---|---|---|---|---|---|---|---|---|---|
| 1 | 1 | 1 | 1 | -1 | 1 | 1 | 1 | -1 | -1 | -1 | 5.9815 | 6.168 |
| 2 | -1 | -1 | -1 | -1 | -1 | 1 | -1 | 1 | 1 | -1 | 5.9815 | 6.168 |
| 3 | -1 | -1 | -1 | 1 | -1 | 1 | -1 | -1 | 1 | 1 | 5.9815 | 6.168 |
| 4 | -1 | -1 | 1 | -1 | -1 | 1 | -1 | 1 | -1 | 1 | 5.9815 | 6.168 |
| 5 | -1 | -1 | 1 | -1 | -1 | 1 | -1 | 1 | -1 | 1 | 5.8146 | 6.185 |
| 6 | -1 | 1 | -1 | 1 | -1 | 1 | -1 | 1 | -1 | 1 | 5.8146 | 6.1849 |
| 7 | -1 | 1 | -1 | -1 | 1 | 1 | -1 | -1 | -1 | -1 | 5.8146 | 6.1849 |
| 8 | -1 | 1 | -1 | -1 | 1 | 1 | -1 | -1 | -1 | -1 | 5.8146 | 6.185 |
| 9 | 1 | 1 | -1 | 1 | 1 | -1 | 1 | -1 | 1 | -1 | 6.0501 | 6.2053 |
| 10 | 1 | -1 | 1 | 1 | -1 | -1 | 1 | 1 | 1 | -1 | 6.0501 | 6.2052 |
| 11 | -1 | 1 | 1 | 1 | 1 | 1 | -1 | 1 | -1 | -1 | 6.0501 | 6.2052 |
| 12 | -1 | -1 | -1 | 1 | -1 | -1 | 1 | -1 | 1 | -1 | 6.0501 | 6.2053 |
| 13 | -1 | 1 | 1 | 1 | 1 | 1 | -1 | -1 | -1 | 1 | 5.8146 | 6.2168 |
| 14 | -1 | 1 | -1 | -1 | -1 | -1 | -1 | 1 | 1 | 1 | 5.8146 | 6.2167 |
| 15 | -1 | -1 | 1 | -1 | -1 | -1 | 1 | 1 | 1 | 1 | 5.8146 | 6.2167 |
| 16 | 1 | 1 | -1 | 1 | 1 | -1 | 1 | -1 | 1 | 1 | 5.8146 | 6.2168 |
| 17 | 1 | 1 | -1 | 1 | -1 | 1 | -1 | 1 | 1 | 1 | 5.7529 | 6.2274 |
| 18 | 1 | 1 | 1 | -1 | 1 | 1 | 1 | -1 | -1 | -1 | 5.7529 | 6.2273 |
| 19 | 1 | -1 | -1 | -1 | 1 | -1 | -1 | 1 | -1 | 1 | 5.7529 | 6.2273 |

If $a_i$ is neither a direct current subcarrier nor a null subcarrier, the value of $a_i$ is $\{-1,1\}$, and 13 optimal groups of parameter set values of $EHTS_{-2032:16:2032}$ may be obtained, as shown in Table 23.

TABLE 23

| Sequence number | $a_1$ | $a_2$ | $a_3$ | $a_4$ | $a_5$ | $a_6$ | $a_7$ | $a_8$ | $a_9$ | $a_{10}$ | $a_{11}$ | $c_1$ | $c_2$ | $c_3$ | $c_4$ | $c_5$ | $c_6$ |
|---|---|---|---|---|---|---|---|---|---|---|---|---|---|---|---|---|---|
| 1 | 1 | 1 | 1 | 1 | -1 | -1 | -1 | 1 | 1 | 1 | 1 | 1 | -1 | -1 | -1 | 1 | -1 |
| 2 | 1 | 1 | 1 | 1 | -1 | -1 | -1 | 1 | 1 | 1 | 1 | 1 | -1 | -1 | 1 | -1 | 1 |
| 3 | 1 | 1 | -1 | 1 | 1 | 1 | 1 | -1 | 1 | 1 | 1 | 1 | -1 | 1 | 1 | -1 | -1 |
| 4 | 1 | 1 | 1 | -1 | 1 | 1 | 1 | 1 | -1 | 1 | 1 | 1 | 1 | -1 | -1 | -1 | 1 |
| 5 | 1 | 1 | 1 | 1 | 1 | -1 | 1 | -1 | -1 | -1 | 1 | -1 | 1 | -1 | 1 | 1 | 1 |
| 6 | 1 | -1 | 1 | 1 | 1 | 1 | -1 | 1 | 1 | 1 | 1 | -1 | 1 | -1 | 1 | -1 | -1 | 1 |
| 7 | 1 | -1 | -1 | 1 | -1 | 1 | -1 | -1 | 1 | -1 | -1 | -1 | -1 | 1 | 1 | 1 | 1 |
| 8 | 1 | -1 | -1 | -1 | -1 | 1 | 1 | 1 | 1 | 1 | 1 | 1 | 1 | 1 | -1 | 1 | 1 |
| 9 | 1 | -1 | 1 | -1 | 1 | 1 | 1 | -1 | 1 | 1 | -1 | 1 | 1 | -1 | 1 | -1 | 1 | -1 |
| 10 | 1 | -1 | 1 | 1 | -1 | -1 | 1 | 1 | -1 | -1 | -1 | -1 | 1 | 1 | -1 | 1 | 1 |
| 11 | 1 | -1 | -1 | 1 | 1 | 1 | -1 | 1 | 1 | 1 | 1 | 1 | 1 | -1 | -1 | 1 | -1 |
| 12 | 1 | -1 | 1 | 1 | -1 | -1 | -1 | 1 | 1 | 1 | 1 | -1 | 1 | -1 | 1 | 1 | -1 |
| 13 | 1 | -1 | 1 | 1 | 1 | -1 | -1 | -1 | 1 | 1 | 1 | -1 | -1 | -1 | 1 | 1 | 1 |

| Sequence number | $c_7$ | $c_8$ | $c_9$ | $c_{10}$ | $c_{11}$ | $c_{12}$ | $c_{13}$ | $c_{14}$ | $c_{15}$ | $c_{16}$ | PAPR | PAPR up_sampling |
|---|---|---|---|---|---|---|---|---|---|---|---|---|
| 1 | -1 | -1 | 1 | -1 | 1 | 1 | -1 | 1 | -1 | -1 | 3.9869 | 4.2144 |
| 2 | -1 | -1 | -1 | -1 | 1 | -1 | -1 | -1 | 1 | 1 | 3.9869 | 4.2145 |
| 3 | -1 | -1 | -1 | -1 | 1 | -1 | -1 | -1 | 1 | 1 | 4.1549 | 4.3194 |
| 4 | -1 | -1 | -1 | -1 | -1 | 1 | 1 | 1 | -1 | -1 | 4.1549 | 4.3199 |
| 5 | -1 | 1 | -1 | 1 | 1 | 1 | -1 | 1 | -1 | -1 | 4.0617 | 4.3377 |
| 6 | -1 | -1 | -1 | -1 | -1 | -1 | 1 | 1 | 1 | 1 | 3.8629 | 4.2865 |
| 7 | -1 | 1 | 1 | 1 | -1 | 1 | 1 | -1 | -1 | -1 | 3.8629 | 4.287 |
| 8 | 1 | -1 | 1 | -1 | 1 | 1 | 1 | 1 | -1 | -1 | 4.0617 | 4.3371 |
| 9 | -1 | -1 | 1 | -1 | -1 | -1 | 1 | 1 | -1 | 1 | 3.9787 | 4.351 |
| 10 | 1 | -1 | 1 | 1 | 1 | 1 | 1 | -1 | -1 | 1 | 3.9787 | 4.351 |
| 11 | 1 | -1 | -1 | -1 | 1 | -1 | -1 | -1 | 1 | -1 | 4.0046 | 4.3724 |
| 12 | 1 | 1 | 1 | -1 | 1 | 1 | 1 | -1 | -1 | -1 | 4.0046 | 4.3716 |
| 13 | -1 | 1 | 1 | 1 | -1 | 1 | 1 | -1 | 1 | -1 | 3.867 | 4.3802 |

2. The 160 MHz Sequence in the IEEE 802.11ax is Used for Construction.

In this embodiment, the frequency domain sequence of the HE-STF whose bandwidth is 160 MHz and period length is 0.8 μs in the IEEE 802.11ax is denoted as $HES_{-1008:16:1008}$, and $HES_{-1008:16:1008} = \{M,1,-M,0,-M,1,-M,0,-M,-1,M,0,-M,1,-M\} \cdot (1+j)/\sqrt{2}$.

$HES'_{-1008:16:1008} = HES_{-1008:16:1008} \cdot \sqrt{2}/(1+j) = \{M,1,-M,0,-M,1,-M,0,-M,-1,M,0,-M,1,-M\}$ is denoted. In other words, $HES'_{-1008:16:1008}$ is represented as $\{M,1,-M,0,-M,1,-M,0,-M,-1,M,0,-M,1,-M\}$, and accordingly, $-HES'_{-1008:16:1008}$ is represented as $\{-M,-1,M,0,M,-1,M,0,M,1,-M,0,M,-1,M\}$.

In a Possible Implementation, the Complete 160 MHz Sequence May be Used for Construction.

$EHTS_{-2032:16:2032} = \{c_1 \cdot HES'_{-1008:16:1008}, a_1, c_2 \cdot HES'_{-1008:16:1008}\} \cdot (1+j)/\sqrt{2}$, and $EHTS_{\pm 2032} = 0$, where a value of $a_i$ is $\{-1,0,1\}$, i=1, a value of $c_j$ is $\{-1,1\}$, and j=1 or 2.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

Therefore, 10 optimal groups of parameter set values of $EHTS_{-2032:16:2032}$ may be obtained, as shown in Table 24.

TABLE 24

| Sequence number | $a_1$ | $c_1$ | $c_2$ | PAPR | PAPR up_sampling |
|---|---|---|---|---|---|
| 1 | 1 | 1 | 1 | 7.6317 | 7.7996 |
| 2 | −1 | −1 | −1 | 7.6317 | 7.7996 |
| 3 | −1 | 1 | −1 | 7.6688 | 7.8344 |
| 4 | 1 | −1 | 1 | 7.6688 | 7.8344 |
| 5 | 0 | 1 | 1 | 7.7322 | 7.9011 |
| 6 | 0 | −1 | −1 | 7.7322 | 7.9011 |
| 7 | −1 | 1 | 1 | 7.8063 | 7.9747 |
| 8 | 1 | −1 | −1 | 7.8063 | 7.9747 |
| 9 | 0 | 1 | −1 | 7.8597 | 8.026 |
| 10 | 0 | −1 | 1 | 7.8597 | 8.026 |

In Another a Possible Implementation, a Half of the 160 MHz Sequence May be Used for Construction.

$EHTS_{-2032:16:2032} = \{c_1 \cdot HES'_{-1008:16:1008}\_L, a_1, c_2 \cdot HES'_{-1008:16:1008}\_R, 0, c_3 \cdot HES'_{-1008:16:1008}\_L, a_2, c_4 \cdot HES'_{-1008:16:1008}\_R\} \cdot (1+j)/\sqrt{2}$, where $HES'_{-1008:16:1008}\_L = \{M,1,-M,0,-M,1,-M\}$ is a left part of $HES'_{-1008:16:1008}$ on a 0 subcarrier, $HES'_{-1008:16:1008}\_R = \{-M,-1,M,0,-M,1,-M\}$ is a right part of $HES'_{-1008:16:1008}$ on a 0 subcarrier, and $EHTS_{\pm 2032} = 0$, where a value of $a_i$ is $\{-1,0,1\}$, i=1 or 2, a value of $c_j$ is $\{-1,1\}$, and j=1, 2, . . . , or 4.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

If $a_i$ is neither a direct current subcarrier nor a null subcarrier, the value of $a_i$ is $\{-1,1\}$, and 10 optimal groups of parameter set values of $EHTS_{-2032:16:2032}$ may be obtained, as shown in Table 25.

TABLE 25

| Sequence number | $a_1$ | $a_2$ | $c_1$ | $c_2$ | $c_3$ | $c_4$ | PAPR | PAPR up_sampling |
|---|---|---|---|---|---|---|---|---|
| 1 | 1 | 1 | 1 | −1 | −1 | −1 | 4.6781 | 5.2691 |
| 2 | −1 | −1 | −1 | 1 | 1 | 1 | 4.6781 | 5.2691 |
| 3 | 1 | −1 | 1 | 1 | −1 | 1 | 5.0049 | 5.3441 |
| 4 | −1 | 1 | −1 | −1 | 1 | −1 | 5.0049 | 5.3441 |
| 5 | −1 | −1 | 1 | 1 | −1 | 1 | 4.6781 | 5.3784 |
| 6 | 1 | 1 | −1 | −1 | 1 | −1 | 4.6781 | 5.3784 |
| 7 | 1 | 1 | 1 | −1 | 1 | 1 | 4.9383 | 5.38 |
| 8 | −1 | −1 | −1 | 1 | −1 | −1 | 4.9383 | 5.38 |
| 9 | −1 | 1 | 1 | 1 | 1 | −1 | 5.0058 | 5.5547 |
| 10 | 1 | −1 | −1 | −1 | −1 | 1 | 5.0058 | 5.5547 |

3. The 80 MHz Sequence in the IEEE 802.11ax is Used for Construction.

In this embodiment, the frequency domain sequence of the HE-STF whose bandwidth is 80 MHz and period length is 0.8 μs in the IEEE 802.11ax is denoted as $HES_{-496:16:496}$, and $HES_{-496:16:496} = \{M,1,-M,0,-M,1,-M\} \cdot (1+j)/\sqrt{2}$.

$HES'_{-496:16:496} = HES_{-496:16:496} \cdot \sqrt{2}/(1+j) = \{M,1,-M,0,-M,1,-M\}$ is denoted. In other words, $HES'_{-496:16:496}$ is represented as $\{M,1,-M,0,-M,1,-M\}$, and accordingly, $-HES'_{-496:16:496}$ is represented as $\{-M,-1,M,0,M,-1,M\}$.

In a Possible Implementation, a Half of the 80 MHz Sequence May be Used for Construction.

Optionally, $EHTS_{-2032:16:2032} = \{c_1 \cdot HES'_{-496:16:496}\_L, 0, c_2 \cdot HES'_{-496:16:496}\_R, a_1, c_3 \cdot HES'_{-496:16:496}\_L, 0, c_4 \cdot HES'_{-496:16:496}\_R, 0, c_5 \cdot HES'_{-496:16:496}\_L, 0, c_6 \cdot HES'_{-496:16:496}\_R, a_2, c_7 \cdot HES'_{-496:16:496}\_L, 0, c_8 \cdot HES'_{-496:16:496}\_R\} \cdot (1+j)/\sqrt{2}$, where $HES'_{-496:16:496}\_L = \{M,1,-M\}$ is a left part of $HES'_{-496:16:496}$ on a 0 subcarrier, $HES'_{-496:16:496}\_R = \{-M,1,-M\}$ is a right part of $HES'_{-496:16:496}$ on a 0 subcarrier, and $EHTS_{\pm 2032} = 0$, where a value of $a_i$ is $\{-1,0,1\}$, i=1 or 2, a value of $c_j$ is $\{-1,1\}$, and j=1, 2, . . . , or 8.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

If $a_i$ is neither a direct current subcarrier nor a null subcarrier, the value of $a_i$ is $\{-1,1\}$, and 10 optimal groups of parameter set values of $EHTS_{-2032:16:2032}$ may be obtained, as shown in Table 26.

TABLE 26

| Sequence number | $a_1$ | $a_2$ | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|---|---|
| 1 | −1 | −1 | 1 | −1 | 1 | 1 | 1 | −1 | −1 | −1 | 4.2225 | 4.7482 |
| 2 | 1 | 1 | −1 | 1 | −1 | −1 | −1 | 1 | 1 | 1 | 4.2225 | 4.7482 |
| 3 | 1 | −1 | 1 | −1 | 1 | −1 | −1 | −1 | 1 | 1 | 4.5954 | 4.8615 |
| 4 | −1 | 1 | −1 | 1 | −1 | 1 | 1 | 1 | −1 | −1 | 4.5954 | 4.8615 |
| 5 | −1 | −1 | 1 | −1 | −1 | 1 | −1 | −1 | −1 | −1 | 4.8145 | 4.9798 |
| 6 | 1 | 1 | −1 | 1 | 1 | −1 | 1 | 1 | 1 | 1 | 4.8145 | 4.9798 |
| 7 | 1 | 1 | 1 | 1 | −1 | −1 | 1 | −1 | 1 | −1 | 4.8145 | 4.9806 |
| 8 | −1 | −1 | −1 | −1 | 1 | 1 | −1 | 1 | −1 | 1 | 4.8145 | 4.9806 |
| 9 | −1 | 1 | 1 | −1 | 1 | −1 | −1 | −1 | 1 | 1 | 4.5866 | 5 |
| 10 | 1 | −1 | −1 | 1 | −1 | 1 | 1 | 1 | −1 | −1 | 4.5866 | 5 |

Optionally, $$EHTS_{-2032:16:2032} = \{c_1 \cdot HES'_{-496:16:496}\_L, a_1, c_2 \cdot$$
$$HES'_{-496:16:496}\_R, a_2, c_3 \cdot HES'_{-496:16:496}\_$$
$$L, a_3, c_4 \cdot HES'_{-496:16:496}\_R, 0, c_5 \cdot HES'_{-496:16:496}\_$$
$$L, a_4, c_6 \cdot HES'_{-496:16:496}\_R, a_5, c_7 \cdot$$
$$HES'_{-496:16:496}\_L, a_6, c_8 \cdot HES'_{-496:16:496}\_R\} \cdot (1+j)/\sqrt{2}, \text{ where}$$

$HES'_{-496:16:496}\_L = \{M, 1, -M\}$ is a left part of $HES'_{-496:16:496}$ on a 0 subcarrier, $HES'_{-496:16:496}\_R = \{-M, 1, -M\}$ is a right part of $HES'_{-496:16:496}$ on a 0 subcarrier, and $EHTS_{\pm 2032} = 0$, where a value of $a_i$ is $\{-1, 0, 1\}$, $i = 1, 2, \ldots,$ or 6, a value of $c_j$ is $\{-1, 1\}$, and $j = 1, 2, \ldots,$ or 8.

Inverse Fourier transform and 5-fold oversampling are performed on different $EHTS_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

If $a_i$ is neither a direct current subcarrier nor a null subcarrier, the value of $a_i$ is $\{-1, 1\}$, and 12 optimal groups of parameter set values of $EHTS_{-2032:16:2032}$ may be obtained, as shown in Table 27.

TABLE 27

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|---|---|---|---|---|---|
| 1 | −1 | −1 | −1 | −1 | −1 | 1 | 1 | −1 | −1 | 1 | −1 | −1 | −1 | −1 | 4.4829 | 4.6455 |
| 2 | 1 | 1 | 1 | 1 | 1 | −1 | −1 | 1 | 1 | −1 | 1 | 1 | 1 | 1 | 4.4829 | 4.6455 |
| 3 | −1 | −1 | −1 | 1 | −1 | 1 | 1 | −1 | 1 | −1 | −1 | −1 | −1 | −1 | 4.1327 | 4.6701 |
| 4 | 1 | 1 | 1 | −1 | 1 | −1 | −1 | 1 | −1 | 1 | 1 | 1 | 1 | 1 | 4.1327 | 4.6701 |
| 5 | −1 | 1 | 1 | 1 | −1 | −1 | 1 | 1 | −1 | −1 | 1 | −1 | 1 | −1 | 4.4248 | 4.6906 |
| 6 | 1 | −1 | −1 | −1 | 1 | 1 | −1 | −1 | 1 | 1 | −1 | 1 | −1 | 1 | 4.4248 | 4.6906 |
| 7 | −1 | 1 | 1 | −1 | 1 | −1 | 1 | 1 | −1 | 1 | −1 | 1 | 1 | −1 | 4.5762 | 4.7394 |
| 8 | −1 | −1 | 1 | 1 | −1 | 1 | 1 | −1 | −1 | 1 | −1 | −1 | 1 | −1 | 4.5762 | 4.7392 |
| 9 | 1 | 1 | −1 | −1 | 1 | −1 | −1 | 1 | 1 | −1 | 1 | 1 | −1 | 1 | 4.5762 | 4.7392 |
| 10 | 1 | −1 | −1 | 1 | −1 | 1 | −1 | −1 | 1 | 1 | −1 | 1 | −1 | 1 | 4.5762 | 4.7394 |
| 11 | −1 | 1 | 1 | −1 | −1 | −1 | 1 | 1 | −1 | −1 | 1 | −1 | 1 | −1 | 4.3126 | 4.743 |
| 12 | 1 | −1 | −1 | 1 | 1 | 1 | −1 | −1 | 1 | 1 | −1 | 1 | −1 | 1 | 4.3126 | 4.743 |

Optionally, $$EHTS_{-2032:16:2032} = \{c_1 \cdot HES'_{-496:16:496}\_L, 0, c_2 \cdot$$
$$HES'_{-496:16:496}\_R, 0, c_3 \cdot HES'_{-496:16:496}\_L,$$
$$0, c_4 \cdot HES'_{-496:16:496}\_R, 0, c_5 \cdot HES'_{-496:16:496}\_L,$$
$$0, c_6 \cdot HES'_{-496:16:496}\_R, 0, c_7 \cdot HES'_{-496:16:496}\_L,$$
$$0, c_8 \cdot HES'_{-496:16:496}\_R\} \cdot (1+j)/\sqrt{2}, \text{ where}$$

$HES'_{-496:16:496}\_L = \{M, 1, -M\}$ is a left part of $HES'_{-496:16:496}$ on a 0 subcarrier, $HES'_{-496:16:496}\_R = \{-M, 1, -M\}$ is a right part of $HES'_{-496:16:496}$ on a 0 subcarrier, and $EHTS_{\pm 2032} = 0$, where a value of $c_j$ is $\{-1, 1\}$, and $j = 1, 2, \ldots,$ or 8.

In this embodiment, $a_i$ is a direct current subcarrier or a null subcarrier, $a_i$ equals to 0. Inverse Fourier transform and 5-fold oversampling are performed on different $EHTS_{-2032:16:2032}$ sequences determined by using the value of $c_j$, to obtain a time domain discrete value X for each group of sequences, and then a PAPR is calculated according to the formula. After exhaustive retrieval, all possible $EHTS_{-2032:16:2032}$ sequence values and corresponding PAPRs may be obtained, and a sequence with a smaller PAPR is selected from the possible $EHTS_{-2032:16:2032}$ sequence values.

Therefore, 12 optimal groups of parameter set values of $EHTS_{-2032:16:2032}$ may be obtained, as shown in Table 28.

TABLE 28

| Sequence number | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|
| 1 | 1 | −1 | 1 | −1 | −1 | −1 | 1 | 1 | 4.5287 | 4.8576 |
| 2 | −1 | 1 | −1 | 1 | 1 | 1 | −1 | −1 | 4.5287 | 4.8576 |
| 3 | 1 | 1 | −1 | −1 | 1 | −1 | 1 | −1 | 4.8494 | 5.0166 |
| 4 | −1 | −1 | 1 | 1 | −1 | 1 | −1 | 1 | 4.8494 | 5.0166 |
| 5 | 1 | −1 | 1 | −1 | 1 | −1 | −1 | −1 | 4.886 | 5.0534 |
| 6 | −1 | 1 | −1 | 1 | −1 | 1 | 1 | 1 | 4.886 | 5.0534 |
| 7 | 1 | 1 | −1 | 1 | −1 | −1 | −1 | 1 | 4.886 | 5.0648 |
| 8 | −1 | −1 | 1 | −1 | 1 | 1 | 1 | −1 | 4.886 | 5.0648 |
| 9 | 1 | −1 | −1 | 1 | −1 | −1 | 1 | −1 | 4.886 | 5.0731 |

TABLE 28-continued

| Sequence number | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|
| 10 | −1 | 1 | 1 | −1 | 1 | 1 | 1 | 1 | 4.886 | 5.0731 |
| 11 | 1 | −1 | 1 | −1 | −1 | −1 | 1 | 1 | 4.5287 | 4.8576 |
| 12 | −1 | 1 | −1 | 1 | 1 | 1 | −1 | −1 | 4.5287 | 4.8576 |

In Another Possible Implementation, the Complete 80 MHz Sequence May be Used for Construction.

$$\text{EHTS}_{-2032:16:2032} = \{c_1 \cdot \text{HES'}_{-496:16:496}, a_1, c_2,$$
$$\text{HES'}_{-496:16:496}, 0, c_3 \cdot \text{HES'}_{-496:16:496}, a_2, c_4,$$
$$\text{HES'}_{-496:16:496}\} \cdot (1+j)/\sqrt{2}, \text{ where}$$

$\text{EHTS}_{\pm 2032}=0$, a value of $a_i$ is $\{-1,0,1\}$, i=1 or 2, a value of $c_j$ is $\{-1,1\}$, and j=1, 2, 3, or 4.

Inverse Fourier transform and 5-fold oversampling are performed on different $\text{EHTS}_{-2032:16:2032}$ sequences determined by using the value of $a_i$ and the value of $c_j$, to obtain a time domain discrete value X for each group of sequences, and then a PAPR is calculated according to the formula. After exhaustive retrieval, all possible $\text{EHTS}_{-2032:16:2032}$ sequence values and corresponding PAPRs may be obtained, and a sequence with a smaller PAPR is selected from the possible $\text{EHTS}_{-2032:16:2032}$ sequence values.

Therefore, 10 optimal groups of parameter set values of $\text{EHTS}_{-2032:16:2032}$ may be obtained, as shown in Table 29.

TABLE 29

| Sequence number | $a_1$ | $a_2$ | $c_1$ | $c_2$ | $c_3$ | $c_4$ | PAPR | PAPR up_sampling |
|---|---|---|---|---|---|---|---|---|
| 1 | 0 | 0 | 1 | −1 | −1 | −1 | 5.0126 | 6.1671 |
| 2 | 0 | 0 | −1 | 1 | 1 | 1 | 5.0126 | 6.1671 |
| 3 | 0 | 0 | 1 | 1 | 1 | −1 | 5.0126 | 6.6875 |
| 4 | 0 | 0 | −1 | −1 | −1 | 1 | 5.0126 | 6.6875 |
| 5 | 0 | 0 | 1 | −1 | 1 | 1 | 5.0126 | 6.9014 |
| 6 | 0 | 0 | −1 | 1 | −1 | −1 | 5.0126 | 6.9014 |
| 7 | 0 | 0 | 1 | 1 | −1 | 1 | 5.0126 | 7.4353 |
| 8 | 0 | 0 | −1 | −1 | 1 | −1 | 5.0126 | 7.4353 |
| 9 | 0 | 0 | 1 | 1 | −1 | −1 | 7.7233 | 8.1384 |
| 10 | 0 | 0 | −1 | −1 | 1 | 1 | 7.7233 | 8.1384 |

Case 4: The Bandwidth of the Target Channel is 320 MHz, and the Period Duration of the Reference Channel is 1.6 μs In this embodiment, a frequency domain sequence of an EHT-STF whose bandwidth is 320 MHz and period length is 1.6 μs is denoted as $\text{EHTS}_{-2040:8:2040}$, and $\text{EHTS}_{-2040:8:2040}$ may be constructed in the following plurality of manners.

1. The 20 MHz Sequence in the IEEE 802.11ax is Used for Construction.

In this embodiment, the frequency domain sequence of the HE-STF whose bandwidth is 20 MHz and period length is 1.6 vs in the IEEE 802.11ax is denoted as $\text{HES}_{-120:8:120}$, and $\text{HES}_{-120:8:120} = \{M,0,-M\} \cdot (1+j)/\sqrt{2}$. $\text{HES'}_{-120:8:120} = \text{HES}_{-120:8:120} \cdot \sqrt{2}/(1+j) = \{M,0,-M\}$ is denoted. In other words, $\text{HES'}_{-120:8:120}$ is represented as $\{M,0,-M\}$, and accordingly, $-\text{HES'}_{-120:8:120}$ is represented as $\{-M,0,M\}$. A formula is as follows:

$$\text{EHTS}_{-2040:8:2040} = \{c_1 \cdot \text{HES'}_{-120:8:120}, a_1, c_2,$$
$$\text{HES'}_{-120:8:120}, 0, c_3 \cdot \text{HES'}_{-120:8:120}, a_2, c_4,$$
$$\text{HES'}_{-120:8:120}, a_3, c_5 \cdot \text{HES'}_{-120:8:120}, a_4, c_6,$$
$$\text{HES'}_{-120:8:120}, 0, c_7 \cdot \text{HES'}_{-120:8:120}, a_5, c_8,$$
$$\text{HES'}_{-120:8:120}, a_6, c_9 \cdot \text{HES'}_{-120:8:120}, a_7, c_{10},$$
$$\text{HES'}_{-120:8:120}, 0, c_{11} \cdot \text{HES'}_{-120:8:120}, a_8, c_{12},$$
$$\text{HES'}_{-120:8:120}, a_9, c_{13},$$
$$\text{HES'}_{-120:8:120}, a_{10}, c_{14} \cdot \text{HES'}_{-120:8:120}, 0, c_{15},$$
$$\text{HES'}_{-120:8:120}, a_{11}, c_{16} \cdot \text{HES'}_{-120:8:120}\}, \text{ and}$$
$$\text{EHTS}_{\pm 2040}=0, \text{ where}$$

a value of $a_i$ is $\{-1,0,1\}$, i=1, 2, . . . , or 11, a value of $c_j$ is $\{-1,1\}$, and j=1, 2, . . . , or 16.

Inverse Fourier transform and 5-fold oversampling are performed on different $\text{EHTS}_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $\text{EHTS}_{-2040:8:2040}$ sequence values and corresponding PAPRs may be obtained, and a sequence with a smaller PAPR is selected from the possible $\text{EHTS}_{-2040:8:2040}$ sequence values.

If $a_3$, $a_6$ and $a_9$ are separately a direct current subcarrier or a null subcarrier, $a_3=0$, $a_6=0$, $a_9=0$, the value of $a_i$ other than $a_3$, $a_6$ and $a_9$ is $\{-1,1\}$, and 18 optimal groups of parameter set values of $\text{EHTS}_{-2040:8:2040}$ may be obtained, as shown in Table 30.

TABLE 30

| Sequence number | $a_1$ | $a_2$ | $a_3$ | $a_4$ | $a_5$ | $a_6$ | $a_7$ | $a_8$ | $a_9$ | $a_{10}$ | $a_{11}$ | $c_1$ | $c_2$ | $c_3$ | $c_4$ | $c_5$ | $c_6$ |
|---|---|---|---|---|---|---|---|---|---|---|---|---|---|---|---|---|---|
| 1 | 1 | 1 | 0 | −1 | 1 | 0 | 1 | −1 | 0 | −1 | 1 | 1 | −1 | 1 | −1 | 1 | −1 |
| 2 | 1 | 1 | 0 | −1 | 1 | 0 | 1 | 1 | 0 | 1 | 1 | 1 | 1 | 1 | 1 | −1 | −1 |
| 3 | 1 | 1 | 0 | 1 | 1 | 0 | 1 | −1 | 0 | 1 | 1 | 1 | −1 | 1 | −1 | 1 | −1 |
| 4 | 1 | 1 | 0 | −1 | −1 | 0 | 1 | −1 | 0 | −1 | −1 | 1 | −1 | 1 | −1 | 1 | −1 |
| 5 | 1 | 1 | 0 | 1 | −1 | 0 | 1 | 1 | 0 | −1 | −1 | −1 | −1 | −1 | −1 | 1 | 1 |
| 6 | 1 | 1 | 0 | −1 | 1 | 0 | 1 | 1 | 0 | 1 | 1 | 1 | 1 | 1 | 1 | −1 | −1 |
| 7 | 1 | 1 | 0 | −1 | −1 | 0 | 1 | 1 | 0 | −1 | −1 | 1 | −1 | 1 | −1 | 1 | 1 |
| 8 | 1 | 1 | 0 | −1 | −1 | 0 | 1 | 1 | 0 | −1 | −1 | −1 | −1 | −1 | −1 | 1 | 1 |
| 9 | 1 | −1 | 0 | −1 | 1 | 0 | 1 | −1 | 0 | 1 | 1 | 1 | 1 | 1 | 1 | −1 | −1 |
| 10 | 1 | −1 | 0 | −1 | −1 | 0 | 1 | −1 | 0 | 1 | −1 | 1 | 1 | 1 | 1 | −1 | −1 |
| 11 | 1 | −1 | 0 | 1 | −1 | 0 | 1 | 1 | 0 | 1 | −1 | −1 | 1 | −1 | 1 | −1 | 1 |
| 12 | 1 | −1 | 0 | 1 | −1 | 0 | 1 | −1 | 0 | −1 | −1 | 1 | −1 | 1 | −1 | 1 | 1 |
| 13 | 1 | −1 | 0 | −1 | 1 | 0 | 1 | −1 | 0 | −1 | −1 | −1 | −1 | −1 | 1 | 1 |
| 14 | 1 | −1 | 0 | −1 | 1 | 0 | −1 | 1 | 0 | 1 | −1 | 1 | 1 | 1 | 1 | −1 | −1 |
| 15 | 1 | −1 | 0 | 1 | 1 | 0 | 1 | −1 | 0 | 1 | −1 | −1 | 1 | −1 | 1 | −1 | 1 |

TABLE 30-continued

| 16 | 1 | -1 | 0 | 1 | -1 | 0 | 1 | -1 | 0 | 1 | -1 | 1 | 1 | 1 | 1 | -1 | -1 |
| 17 | 1 | -1 | 0 | 1 | -1 | 0 | 1 | -1 | 0 | 1 | -1 | 1 | -1 | 1 | -1 | 1 | -1 |
| 18 | 1 | -1 | 0 | -1 | -1 | 0 | 1 | 1 | 0 | -1 | -1 | -1 | 1 | -1 | 1 | -1 | 1 |

| Sequence number | $c_7$ | $c_8$ | $c_9$ | $c_{10}$ | $c_{11}$ | $c_{12}$ | $c_{13}$ | $c_{14}$ | $c_{15}$ | $c_{16}$ | PAPR | PAPR up_sampling |
|---|---|---|---|---|---|---|---|---|---|---|---|---|
| 1 | -1 | 1 | -1 | -1 | 1 | 1 | -1 | -1 | -1 | -1 | 5.6339 | 5.7938 |
| 2 | 1 | 1 | -1 | 1 | 1 | -1 | -1 | -1 | 1 | -1 | 5.6339 | 5.8342 |
| 3 | -1 | 1 | -1 | -1 | 1 | 1 | -1 | -1 | -1 | -1 | 5.6339 | 5.8342 |
| 4 | -1 | 1 | -1 | -1 | 1 | 1 | -1 | -1 | -1 | -1 | 5.691 | 5.8966 |
| 5 | -1 | -1 | 1 | -1 | -1 | 1 | -1 | 1 | -1 | 1 | 5.691 | 5.8966 |
| 6 | 1 | 1 | -1 | 1 | 1 | -1 | 1 | -1 | -1 | -1 | 5.6339 | 5.9483 |
| 7 | -1 | 1 | 1 | -1 | 1 | 1 | -1 | -1 | -1 | -1 | 5.6952 | 5.9636 |
| 8 | -1 | 1 | 1 | -1 | 1 | -1 | 1 | -1 | 1 | -1 | 5.6952 | 5.9636 |
| 9 | 1 | 1 | -1 | 1 | 1 | -1 | 1 | -1 | 1 | -1 | 5.6339 | 5.7938 |
| 10 | 1 | 1 | -1 | 1 | 1 | -1 | 1 | -1 | 1 | -1 | 5.6339 | 5.7939 |
| 11 | 1 | -1 | 1 | 1 | -1 | -1 | 1 | 1 | 1 | 1 | 5.6339 | 5.7938 |
| 12 | -1 | 1 | 1 | -1 | 1 | 1 | -1 | -1 | -1 | -1 | 5.6952 | 5.8574 |
| 13 | -1 | 1 | 1 | -1 | 1 | -1 | 1 | -1 | 1 | -1 | 5.6952 | 5.8574 |
| 14 | 1 | 1 | 1 | -1 | 1 | -1 | 1 | -1 | 1 | -1 | 5.7159 | 5.8946 |
| 15 | 1 | -1 | 1 | 1 | -1 | -1 | 1 | 1 | 1 | 1 | 5.7159 | 5.8945 |
| 16 | 1 | -1 | -1 | 1 | -1 | 1 | -1 | 1 | -1 | 1 | 5.6952 | 5.9274 |
| 17 | 1 | -1 | -1 | 1 | -1 | -1 | 1 | 1 | 1 | 1 | 5.6952 | 5.9274 |
| 18 | 1 | -1 | 1 | 1 | -1 | -1 | 1 | 1 | 1 | 1 | 5.6339 | 5.9482 |

If $a_i$ is neither a direct current subcarrier nor a null subcarrier, the value of $a_i$ is $\{-1,1\}$, and 18 optimal groups of parameter set values of $\text{EHTS}_{-2040:8:2040}$ may be obtained, as shown in Table 31.

TABLE 31

| Sequence number | $a_1$ | $a_2$ | $a_3$ | $a_4$ | $a_5$ | $a_6$ | $a_7$ | $a_8$ | $a_9$ | $a_{10}$ | $a_{11}$ | $c_1$ | $c_2$ | $c_3$ | $c_4$ | $c_5$ | $c_6$ |
|---|---|---|---|---|---|---|---|---|---|---|---|---|---|---|---|---|---|
| 1 | 1 | 1 | 1 | 1 | -1 | -1 | 1 | -1 | -1 | -1 | -1 | -1 | -1 | -1 | -1 | 1 | 1 |
| 2 | 1 | 1 | 1 | 1 | -1 | 1 | 1 | -1 | -1 | -1 | -1 | 1 | -1 | 1 | -1 | 1 | -1 |
| 3 | 1 | 1 | 1 | 1 | 1 | -1 | 1 | -1 | -1 | -1 | 1 | -1 | -1 | -1 | -1 | 1 | 1 |
| 4 | 1 | 1 | -1 | 1 | -1 | 1 | 1 | 1 | -1 | 1 | 1 | 1 | -1 | 1 | -1 | 1 | -1 |
| 5 | 1 | 1 | -1 | -1 | 1 | 1 | 1 | 1 | 1 | -1 | 1 | -1 | 1 | -1 | -1 | -1 | 1 |
| 6 | 1 | 1 | -1 | -1 | 1 | 1 | 1 | 1 | 1 | -1 | -1 | -1 | -1 | -1 | -1 | 1 | 1 |
| 7 | 1 | -1 | -1 | -1 | 1 | -1 | 1 | 1 | 1 | 1 | 1 | -1 | 1 | -1 | 1 | -1 | 1 |
| 8 | 1 | -1 | -1 | 1 | 1 | -1 | -1 | 1 | -1 | 1 | 1 | 1 | 1 | 1 | 1 | -1 | -1 |
| 9 | 1 | -1 | -1 | 1 | -1 | -1 | -1 | 1 | -1 | 1 | 1 | 1 | 1 | 1 | 1 | -1 | -1 |
| 10 | 1 | -1 | 1 | -1 | 1 | 1 | 1 | -1 | 1 | -1 | 1 | -1 | 1 | -1 | 1 | -1 | -1 |
| 11 | 1 | -1 | 1 | 1 | -1 | -1 | 1 | 1 | 1 | -1 | 1 | 1 | 1 | 1 | 1 | -1 | -1 |
| 12 | 1 | -1 | -1 | -1 | 1 | 1 | 1 | -1 | -1 | 1 | -1 | 1 | -1 | 1 | -1 | 1 | -1 |
| 13 | 1 | -1 | -1 | -1 | -1 | -1 | 1 | 1 | -1 | -1 | -1 | -1 | -1 | -1 | -1 | 1 | 1 |
| 14 | 1 | -1 | -1 | 1 | -1 | -1 | 1 | 1 | -1 | 1 | -1 | 1 | -1 | 1 | -1 | 1 | -1 |
| 15 | 1 | -1 | -1 | -1 | -1 | -1 | 1 | 1 | -1 | 1 | 1 | 1 | -1 | 1 | -1 | 1 | -1 |
| 16 | 1 | -1 | -1 | -1 | 1 | 1 | -1 | 1 | 1 | -1 | -1 | -1 | -1 | -1 | -1 | 1 | 1 |
| 17 | 1 | -1 | -1 | -1 | 1 | 1 | -1 | 1 | 1 | -1 | -1 | 1 | -1 | 1 | -1 | 1 | -1 |
| 18 | 1 | -1 | -1 | 1 | -1 | -1 | -1 | 1 | 1 | -1 | -1 | -1 | -1 | -1 | -1 | 1 | 1 |

| Sequence number | $c_7$ | $c_8$ | $c_9$ | $c_{10}$ | $c_{11}$ | $c_{12}$ | $c_{13}$ | $c_{14}$ | $c_{15}$ | $c_{16}$ | PAPR | PAPR up_sampling |
|---|---|---|---|---|---|---|---|---|---|---|---|---|
| 1 | -1 | -1 | 1 | -1 | -1 | 1 | -1 | 1 | -1 | 1 | 5.5996 | 5.7585 |
| 2 | -1 | 1 | -1 | -1 | 1 | 1 | -1 | -1 | -1 | -1 | 5.5996 | 5.7585 |
| 3 | -1 | -1 | 1 | -1 | -1 | 1 | -1 | 1 | -1 | 1 | 5.5996 | 5.7585 |
| 4 | -1 | 1 | -1 | -1 | 1 | 1 | -1 | -1 | -1 | -1 | 5.6057 | 5.7645 |
| 5 | -1 | 1 | -1 | -1 | 1 | 1 | -1 | -1 | -1 | -1 | 5.6302 | 5.7891 |
| 6 | -1 | -1 | 1 | -1 | -1 | 1 | -1 | 1 | -1 | 1 | 5.6385 | 5.7974 |
| 7 | 1 | -1 | 1 | 1 | -1 | -1 | 1 | 1 | 1 | 1 | 5.5996 | 5.7586 |
| 8 | 1 | 1 | -1 | 1 | 1 | -1 | 1 | -1 | -1 | -1 | 5.6057 | 5.7646 |
| 9 | 1 | 1 | -1 | 1 | 1 | -1 | 1 | -1 | 1 | -1 | 5.6057 | 5.7646 |
| 10 | 1 | -1 | 1 | 1 | -1 | -1 | 1 | 1 | 1 | 1 | 5.6057 | 5.7646 |
| 11 | 1 | 1 | -1 | 1 | 1 | -1 | 1 | -1 | 1 | -1 | 5.607 | 5.7892 |
| 12 | 1 | -1 | 1 | 1 | -1 | -1 | 1 | 1 | 1 | 1 | 5.607 | 5.7892 |
| 13 | -1 | -1 | 1 | -1 | -1 | 1 | -1 | 1 | -1 | 1 | 5.6302 | 5.7891 |
| 14 | -1 | 1 | -1 | -1 | 1 | 1 | -1 | 1 | -1 | -1 | 5.6385 | 5.7974 |
| 15 | -1 | 1 | -1 | -1 | 1 | -1 | 1 | -1 | -1 | -1 | 5.6385 | 5.7974 |
| 16 | -1 | -1 | 1 | -1 | -1 | 1 | -1 | 1 | -1 | 1 | 5.6385 | 5.7974 |
| 17 | -1 | 1 | -1 | -1 | 1 | 1 | -1 | -1 | -1 | -1 | 5.6302 | 5.7981 |
| 18 | -1 | -1 | 1 | -1 | -1 | 1 | -1 | 1 | -1 | 1 | 5.6302 | 5.7982 |

2. The 160 MHz Sequence in the IEEE 802.11ax is Used for Construction.

In this embodiment, the frequency domain sequence of the HE-STF whose bandwidth is 160 MHz and period length is 1.6 μs in the IEEE 802.11ax is denoted as $HES_{-1016:8:1016}$, and $HES_{-1016:8:1016}=\{M,-1,M,-M,-1,M,0,-M,1,M,1,-M,$
$1,-M,0,-M,1,-M,1,M,1,-M,0,-M,1,M,1,-M,1,$
$-M\}\cdot(1+j)/\sqrt{2}$.

$HES'_{-1016:8:1016}=HES_{-1016:8:1016}\cdot$
$\sqrt{2}/(1+j)=\{M,-1,M,-M,-1,M,0,-M,1,M,1,-M,1,-M,0,$
$-M,1,-M,1,M,1,-M,0,-M,1,M,1,-M,1,-M\}$ is denoted. In other words, $HES'_{-1016:8:1016}$ is represented as $\{M,-1,$ $M,-M,-1,M,0,-M,1,M,1,-M,1,-M,0,-M,1,-M,1,M,1,-M,$ $0,-M,1,M,1,-M,1,-M\}$, and accordingly, $-HES'_{-1016:8:1016}$ is represented as $\{-M,1,-M,M,1,-M,0,M,-1,-M,-1,M,-1,$ $M,0,M,-1,M,-1,-M,-1,M,0,M,-1,-M,-1,M,-1,M\}$.

In a Possible Implementation, the Complete 160 MHz Sequence May be Used for Construction.

$EHTS_{-2040:8:2040}=\{c_1\cdot HES'_{-1016:8:1016},a_1,c_2\cdot$
$HES'_{-1016:8:1016}\}\cdot(1+j)/\sqrt{2}$, and $EHTS_{\pm 2040}=0$,
where a value of $a_i$ is $\{-1,0,1\}$, i=1, a value of $c_j$ is $\{-1,1\}$, and j=1 or 2.

Inverse Fourier transform and 5-fold oversampling are performed on different $EHTS_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

Therefore, 10 optimal groups of parameter set values of $EHTS_{-2040:8:2040}$ may be obtained, as shown in Table 32.

TABLE 32

| Sequence number | $a_1$ | $c_1$ | $c_2$ | PAPR | PAPR up_sampling |
|---|---|---|---|---|---|
| 1 | 1 | 1 | 1 | 7.2029 | 7.9943 |
| 2 | −1 | −1 | −1 | 7.2029 | 7.9943 |
| 3 | 0 | 1 | 1 | 7.2326 | 8.0145 |
| 4 | 0 | −1 | −1 | 7.2326 | 8.0145 |
| 5 | −1 | 1 | 1 | 7.2482 | 8.0197 |
| 6 | 1 | −1 | −1 | 7.2482 | 8.0197 |
| 7 | 1 | 1 | −1 | 9.1719 | 9.3317 |
| 8 | −1 | −1 | 1 | 9.1719 | 9.3317 |
| 9 | 0 | 1 | −1 | 9.194 | 9.354 |
| 10 | 0 | −1 | 1 | 9.194 | 9.354 |

In Another a Possible Implementation, a Half of the 160 MHz Sequence May be Used for Construction.

$EHTS_{-2040:8:2040}=\{c_1\cdot HES'_{-1016:8:1016}\_L,a_1,c_2\cdot$
$HES'_{-1016:8:1016}\_R,0,c_3\cdot HES'_{-1016:8:1016}\_$
$L,a_2,c_4\cdot HES'_{-1016:8:1016}\_R\}\cdot(1+j)/\sqrt{2}$, where $HES'_{-1016:8:1016}\_L=\{M,-1,M,-M,-1,M,0,-M,1,M,1,$ $-M,1,-M\}$ is a left part of $HES'_{-1016:8:1016}$ on a 0 subcarrier, $HES'_{-1016:8:1016}\_R=\{-M,1,-M,1,M,1,-M,0,-M,1,M,1,$ $-M,1,-M\}$ is a right part of $HES'_{-1016:8:1016}$ on a 0 subcarrier, and $EHTS_{\pm 2040}=0$, where a value of $a_i$ is $\{-1,0,1\}$, i=1 or 2, a value of $c_j$ is $\{-1,1\}$, and j=1, 2, . . . , or 4.

Inverse Fourier transform and 5-fold oversampling are performed on different $EHTS_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

If $a_i$ is neither a direct current subcarrier nor a null subcarrier, the value of $a_i$ is $\{-1,1\}$, and 10 optimal groups of parameter set values of $EHTS_{-2040:8:2040}$ may be obtained, as shown in Table 33.

TABLE 33

| Sequence number | $a_1$ | $a_2$ | $c_1$ | $c_2$ | $c_3$ | $c_4$ | PAPR | PAPR up_sampling |
|---|---|---|---|---|---|---|---|---|
| 1 | 1 | −1 | 1 | 1 | 1 | −1 | 6.1174 | 6.5894 |
| 2 | −1 | 1 | −1 | −1 | −1 | 1 | 6.1174 | 6.5894 |
| 3 | 1 | 1 | 1 | −1 | 1 | 1 | 6.3378 | 6.6975 |
| 4 | −1 | −1 | −1 | 1 | −1 | −1 | 6.3378 | 6.6975 |
| 5 | 1 | 1 | 1 | 1 | 1 | −1 | 6.3378 | 6.7378 |
| 6 | −1 | −1 | −1 | −1 | −1 | 1 | 6.3378 | 6.7378 |
| 7 | −1 | −1 | 1 | 1 | 1 | −1 | 6.3378 | 6.7879 |
| 8 | 1 | 1 | −1 | −1 | −1 | 1 | 6.3378 | 6.7879 |
| 9 | −1 | 1 | −1 | 1 | 1 | 1 | 6.1174 | 6.8241 |
| 10 | 1 | −1 | 1 | −1 | −1 | −1 | 6.1174 | 6.8241 |

3. The 80 MHz Sequence in the IEEE 802.11ax is Used for Construction.

In this embodiment, the frequency domain sequence of the HE-STF whose bandwidth is 80 MHz and period length is 1.6 μs in the IEEE 802.11ax is denoted as $HES_{-504:8:504}$, and $HES_{-504:8:504}=\{M,-1,M,-1,-M,-1,M,0,-M,1,M,1,-M,$ $1,-M\}\cdot(1+j)/\sqrt{2}$. $HES'_{-504:8:504}=HES_{-504:8:504}\cdot$ $\sqrt{2}/(1-j)=\{M,-1,M,-1,-M,-1,M,0,-M,1,M,1,-M,1,-M\}$ is denoted. In other words, $HES'_{-504:8:504}$ is represented as $\{M,-1,M,-1,-M,-1,M,0,-M,1,M,1,-M,1,-M\}$, and accordingly, $-HES'_{-504:8:504}$ is represented as $\{-M,1,-M,1,$ $M,1,-M,0,M,-1,-M,-1,M,-1,M\}$.

In a Possible Implementation, a Half of the 80 MHz Sequence May be Used for Construction.

Optionally, $EHTS_{-2040:8:2040}=\{c_1\cdot HES'_{-504:8:504}\_L,0,c_2\cdot$
$HES'_{-504:8:504}\_R,a_1,c_3\cdot HES'_{-504:8:504}\_L,$
$0,c_4\cdot HES'_{-504:8:504}\_R,0,c_5\cdot HES'_{-504:8:504}\_L,$
$0,c_6\cdot HES'_{-504:8:504}\_R,a_2,c_7\cdot HES'_{-504:8:504}\_L,$
$0,c_8\cdot HES'_{-504:8:504}\_R\}\cdot(1+j)/\sqrt{2}$, where $HES'_{-504:8:504}\_L=\{M,-1,M,-1,-M,-1,M\}$ is a left part of $HES'_{-504:8:504}$ on a 0 subcarrier, $HES'_{-504:8:504}\_R=\{-M,1,M,1,-M,1,-M\}$ is a right part of $HES'_{-504:8:504}$ on a 0 subcarrier, and $EHTS_{\pm 2040}=0$, where a value of $a_i$ is $\{-1,1\}$, i=1 or 2, a value of $c_j$ is $\{-1,1\}$, and j=1, 2, . . . , or 8.

Inverse Fourier transform and 5-fold oversampling are performed on different $EHTS_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

In this embodiment, $a_i$ is neither a direct current subcarrier nor a null subcarrier, the value of $a_i$ is $\{-1,1\}$, and 20 optimal groups of parameter set values of $EHTS_{-2040:8:2040}$ may be obtained, as shown in Table 34.

TABLE 34

| Sequence number | $a_1$ | $a_2$ | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|---|---|
| 1 | 1 | -1 | 1 | 1 | -1 | -1 | 1 | -1 | 1 | -1 | 6.0819 | 6.2582 |
| 2 | -1 | 1 | 1 | -1 | 1 | -1 | 1 | 1 | -1 | -1 | 6.0819 | 6.2583 |
| 3 | 1 | -1 | -1 | 1 | -1 | 1 | -1 | -1 | 1 | 1 | 6.0819 | 6.2583 |
| 4 | -1 | 1 | -1 | -1 | 1 | 1 | -1 | 1 | -1 | 1 | 6.0819 | 6.2582 |
| 5 | 1 | 1 | 1 | 1 | -1 | -1 | 1 | -1 | 1 | -1 | 6.1733 | 6.333 |
| 6 | 1 | 1 | 1 | -1 | 1 | -1 | 1 | 1 | -1 | -1 | 6.1733 | 6.3331 |
| 7 | -1 | -1 | -1 | 1 | -1 | 1 | -1 | -1 | 1 | 1 | 6.1733 | 6.3331 |
| 8 | -1 | -1 | -1 | -1 | 1 | 1 | -1 | 1 | -1 | 1 | 6.1733 | 6.333 |
| 9 | 1 | -1 | 1 | -1 | 1 | 1 | 1 | 1 | 1 | -1 | 6.1367 | 6.5336 |
| 10 | -1 | 1 | 1 | -1 | -1 | -1 | 1 | -1 | 1 | -1 | 6.1367 | 6.5336 |
| 11 | 1 | -1 | -1 | 1 | 1 | 1 | -1 | 1 | -1 | 1 | 6.1367 | 6.5336 |
| 12 | -1 | 1 | -1 | -1 | 1 | -1 | -1 | -1 | -1 | 1 | 6.1367 | 6.5336 |
| 13 | -1 | -1 | 1 | 1 | -1 | -1 | 1 | -1 | 1 | -1 | 6.246 | 6.5451 |
| 14 | -1 | -1 | 1 | -1 | 1 | -1 | 1 | 1 | -1 | -1 | 6.246 | 6.5452 |
| 15 | 1 | 1 | -1 | 1 | -1 | 1 | -1 | -1 | 1 | 1 | 6.246 | 6.5452 |
| 16 | 1 | 1 | -1 | -1 | 1 | 1 | -1 | 1 | -1 | 1 | 6.246 | 6.5451 |
| 17 | -1 | 1 | 1 | 1 | 1 | -1 | 1 | 1 | -1 | 1 | 6.4543 | 6.6191 |
| 18 | -1 | 1 | 1 | -1 | 1 | 1 | -1 | 1 | 1 | 1 | 6.4543 | 6.6191 |
| 19 | 1 | -1 | -1 | 1 | -1 | -1 | 1 | -1 | -1 | -1 | 6.4543 | 6.6191 |
| 20 | 1 | -1 | -1 | -1 | -1 | 1 | -1 | -1 | 1 | -1 | 6.4543 | 6.6191 |

Optionally, $EHTS_{-2040:8:2040} = \{c_1 \cdot HES'_{-504:8:504}\_L, a_1, c_2 \cdot HES'_{-504:8:504}\_R, a_2, c_3 \cdot HES'_{-504:8:504}\_L, a_3, c_4 \cdot HES'_{-504:8:504}\_R, 0, c_5 \cdot HES'_{-504:8:504}\_L, a_4, c_6 \cdot HES'_{-504:8:504}\_R, a_5, c_7 \cdot HES'_{-504:8:504}\_L, a_6, c_8 \cdot HES'_{-504:8:504}\_R\} \cdot (1+j)/\sqrt{2}$, where $HES'_{-504:8:504}\_L = \{M, -1, M, -1, -M, -1, M\}$ is a left part of $HES'_{-504:8:504}$ on a 0 subcarrier, $HES'_{-504:8:504}\_R = \{-M, 1, M, 1, -M, 1, -M\}$ is a right part of $HES'_{-504:8:504}$ on a 0 subcarrier, and $EHTS_{\pm 2040} = 0$, where a value of $a_i$ is $\{-1, 1\}$, $i = 1, 2, \ldots$, or 6, a value of $c_j$ is $\{-1, 1\}$, and $j = 1, 2, \ldots$, or 8.

Inverse Fourier transform and 5-fold oversampling are performed on different $EHTS_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

In this embodiment, $a_i$ is neither a direct current subcarrier nor a null subcarrier, the value of $a_i$ is $\{-1, 1\}$, and 20 optimal groups of parameter set values of $EHTS_{-2040:8:2040}$ may be obtained, as shown in Table 35.

TABLE 35

| Sequence number | $a_1$ | $a_2$ | $a_3$ | $a_4$ | $a_5$ | $a_6$ | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|---|---|---|---|---|---|
| 1 | -1 | 1 | 1 | 1 | 1 | 1 | 1 | 1 | -1 | -1 | 1 | -1 | 1 | -1 | 5.9701 | 6.1287 |
| 2 | 1 | 1 | 1 | 1 | -1 | 1 | -1 | 1 | -1 | 1 | 1 | -1 | -1 | -1 | 5.9701 | 6.1288 |
| 3 | -1 | -1 | -1 | -1 | -1 | 1 | -1 | 1 | -1 | 1 | -1 | -1 | 1 | 1 | 5.9701 | 6.1288 |
| 4 | 1 | -1 | -1 | -1 | -1 | -1 | -1 | -1 | 1 | 1 | -1 | 1 | -1 | 1 | 5.9701 | 6.1287 |
| 5 | 1 | 1 | 1 | 1 | 1 | 1 | 1 | 1 | -1 | -1 | 1 | -1 | 1 | -1 | 6.0476 | 6.2061 |
| 6 | 1 | -1 | 1 | 1 | 1 | 1 | 1 | -1 | 1 | 1 | -1 | 1 | -1 | -1 | 6.0476 | 6.2062 |
| 7 | -1 | 1 | -1 | -1 | -1 | -1 | 1 | -1 | 1 | -1 | 1 | -1 | 1 | 1 | 6.0476 | 6.2062 |
| 8 | -1 | -1 | -1 | -1 | -1 | -1 | -1 | -1 | 1 | 1 | -1 | 1 | -1 | 1 | 6.0476 | 6.2061 |
| 9 | -1 | 1 | -1 | 1 | 1 | 1 | 1 | 1 | -1 | -1 | 1 | -1 | 1 | -1 | 6.1206 | 6.2791 |
| 10 | 1 | 1 | 1 | -1 | 1 | -1 | 1 | -1 | 1 | 1 | -1 | 1 | -1 | -1 | 6.1206 | 6.2792 |
| 11 | -1 | -1 | -1 | 1 | -1 | 1 | -1 | 1 | -1 | -1 | 1 | -1 | 1 | 1 | 6.1206 | 6.2792 |
| 12 | 1 | -1 | 1 | -1 | -1 | -1 | -1 | -1 | 1 | 1 | -1 | 1 | -1 | 1 | 6.1206 | 6.2791 |
| 13 | 1 | 1 | 1 | 1 | 1 | 1 | 1 | 1 | -1 | -1 | 1 | -1 | 1 | -1 | 6.139 | 6.2976 |
| 14 | 1 | 1 | 1 | 1 | 1 | 1 | -1 | 1 | -1 | 1 | 1 | -1 | -1 | -1 | 6.139 | 6.2977 |
| 15 | -1 | -1 | -1 | -1 | -1 | -1 | -1 | 1 | -1 | 1 | -1 | -1 | 1 | 1 | 6.139 | 6.2977 |
| 16 | -1 | -1 | -1 | -1 | -1 | -1 | -1 | -1 | 1 | 1 | -1 | 1 | -1 | 1 | 6.139 | 6.2976 |
| 17 | -1 | 1 | 1 | 1 | -1 | 1 | 1 | 1 | -1 | -1 | 1 | -1 | 1 | -1 | 6.139 | 6.3141 |
| 18 | 1 | 1 | -1 | 1 | -1 | 1 | -1 | 1 | -1 | 1 | 1 | -1 | -1 | -1 | 6.139 | 6.3143 |
| 19 | -1 | -1 | 1 | -1 | 1 | -1 | -1 | 1 | -1 | 1 | -1 | -1 | 1 | 1 | 6.139 | 6.3143 |
| 20 | 1 | -1 | -1 | -1 | 1 | -1 | -1 | -1 | 1 | 1 | -1 | 1 | -1 | 1 | 6.139 | 6.3141 |

Optionally, $EHTS_{-2040:8:2040} = \{c_1 \cdot HES'_{-504:8:504}\_L, 0, c_2 \cdot HES'_{-504:8:504}\_R, 0, c_3 \cdot HES'_{-504:8:504}\_L, 0, c_4 \cdot HES'_{-504:8:504}\_R, 0, c_5 \cdot HES'_{-504:8:504}\_L, 0, c_6 \cdot HES'_{-504:8:504}\_R, 0, c_7 \cdot HES'_{-504:8:504}\_L, 0, c_8 \cdot HES'_{-504:8:504}\_R\} \cdot (1+j)/\sqrt{2}$, where $HES'_{-504:8:504}\_L = \{M, -1, M, -1, -M, -1, M\}$ is a left part of $HES'_{-504:8:504}$ on a 0 subcarrier, $HES'_{-504:8:504}\_R = \{-M, 1, M, 1, -M, 1, -M\}$ is a right part of $HES'_{-504:8:504}$ on a 0 subcarrier, and $EHTS_{\pm 2040} = 0$, where a value of $c_j$ is $\{-1, 1\}$, and $j = 1, 2, \ldots$, or 8.

Inverse Fourier transform and 5-fold oversampling are performed on different $EHTS_{-2040:8:2040}$ sequences determined by using the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

This embodiment may obtain 18 optimal groups of parameter set values of $EHTS_{-2040:8:2040}$, as shown in Table 36.

TABLE 36

| Sequence number | $c_1$ | $c_2$ | $c_3$ | $c_4$ | $c_5$ | $c_6$ | $c_7$ | $c_8$ | PAPR | PAPR up_sampling |
|---|---|---|---|---|---|---|---|---|---|---|
| 1  |  1 |  1 | -1 | -1 |  1 | -1 |  1 | -1 | 6.1906 | 6.3509 |
| 2  |  1 | -1 |  1 | -1 |  1 |  1 | -1 | -1 | 6.1906 | 6.351  |
| 3  | -1 |  1 | -1 |  1 | -1 | -1 |  1 |  1 | 6.1906 | 6.351  |
| 4  | -1 | -1 |  1 |  1 | -1 |  1 | -1 |  1 | 6.1906 | 6.3509 |
| 5  |  1 |  1 |  1 |  1 | -1 | -1 | -1 |  1 | 6.51   | 6.6702 |
| 6  |  1 | -1 | -1 | -1 |  1 |  1 |  1 |  1 | 6.51   | 6.6703 |
| 7  | -1 |  1 |  1 |  1 | -1 | -1 | -1 | -1 | 6.51   | 6.6703 |
| 8  | -1 | -1 | -1 | -1 |  1 |  1 |  1 | -1 | 6.51   | 6.6702 |
| 9  |  1 |  1 |  1 | -1 |  1 |  1 | -1 |  1 | 6.2432 | 6.6935 |
| 10 |  1 | -1 |  1 |  1 | -1 |  1 |  1 |  1 | 6.2432 | 6.6935 |
| 11 | -1 |  1 | -1 | -1 |  1 | -1 | -1 | -1 | 6.2432 | 6.6935 |
| 12 | -1 | -1 | -1 |  1 | -1 | -1 |  1 | -1 | 6.2432 | 6.6935 |
| 13 |  1 |  1 | -1 |  1 |  1 |  1 |  1 | -1 | 6.2902 | 6.7076 |
| 14 |  1 | -1 |  1 | -1 | -1 |  1 | -1 | -1 | 6.2902 | 6.7077 |
| 15 | -1 |  1 |  1 |  1 |  1 | -1 |  1 |  1 | 6.2902 | 6.7077 |
| 16 | -1 | -1 |  1 | -1 | -1 | -1 | -1 |  1 | 6.2902 | 6.7076 |
| 17 |  1 |  1 | -1 | -1 | -1 |  1 | -1 |  1 | 6.557  | 6.9284 |
| 18 | -1 | -1 |  1 |  1 |  1 | -1 |  1 | -1 | 6.557  | 6.9284 |

In Another Possible Implementation, the Complete 80 MHz Sequence May be Used for Construction.

$$EHTS_{-2040:8:2040} = \{c_1 \cdot HES'_{-504:8:504}, a_1, c_2 \cdot HES'_{-504:8:504}, 0, c_3 \cdot HES'_{-504:8:504}, a_2, c_4 \cdot HES'_{-504:8:504}\} \cdot (1+j)/\sqrt{2}, \text{ where}$$

$EHTS_{\pm 2040}=0$, a value of $a_i$ is $\{-1,0,1\}$, i=1 or 2, a value of $c_j$ is $\{-1,1\}$, and j=1, 2, 3, or 4.

Inverse Fourier transform and 5-fold oversampling are performed on different $EHTS_{-2040:8:2040}$ sequences determined by using the value of $a_i$ and the value of $c_j$, to obtain a time domain discrete value X for each group of sequences, and then a PAPR is calculated according to the formula. After exhaustive retrieval, all possible $EHTS_{-2040:8:2040}$ sequence values and corresponding PAPRs may be obtained, and a sequence with a smaller PAPR is selected from the possible $EHTS_{-2040:8:2040}$ sequence values.

Therefore, 14 optimal groups of parameter set values of $EHTS_{-2040:8:2040}$ may be obtained, as shown in Table 37.

TABLE 37

| Sequence number | $a_1$ | $a_2$ | $c_1$ | $c_2$ | $c_3$ | $c_4$ | PAPR | PAPR up_sampling |
|---|---|---|---|---|---|---|---|---|
| 1  | 0 | 0 |  1 |  1 |  1 | -1 | 5.6955 | 7.7526 |
| 2  | 0 | 0 |  1 | -1 | -1 | -1 | 5.6955 | 7.7526 |
| 3  | 0 | 0 | -1 |  1 |  1 |  1 | 5.6955 | 7.7526 |
| 4  | 0 | 0 | -1 | -1 | -1 |  1 | 5.6955 | 7.7526 |
| 5  | 0 | 0 |  1 |  1 | -1 |  1 | 5.8736 | 8.3275 |
| 6  | 0 | 0 |  1 | -1 |  1 |  1 | 5.8736 | 8.3275 |
| 7  | 0 | 0 | -1 |  1 | -1 | -1 | 5.8736 | 8.3275 |
| 8  | 0 | 0 | -1 | -1 |  1 | -1 | 5.8736 | 8.3275 |
| 9  | 0 | 0 |  1 |  1 | -1 |  1 | 8.6537 | 9.0161 |
| 10 | 0 | 0 | -1 | -1 |  1 |  1 | 8.6537 | 9.0161 |
| 11 | 0 | 0 |  1 |  1 | -1 | -1 | 8.444  | 9.4539 |
| 12 | 0 | 0 | -1 |  1 |  1 | -1 | 8.444  | 9.4539 |
| 13 | 0 | 0 |  1 |  1 |  1 |  1 | 10.376 | 10.536 |
| 14 | 0 | 0 | -1 | -1 | -1 | -1 | 10.376 | 10.536 |

It should be understood that, in Table 2 to Table 37, a PAPR that is the same as that of a sequence corresponding to original parameter set values can be obtained for a sequence corresponding to all inverted parameter set values. Details are not described in this embodiment. The "inverted" herein may be as follows: 1 is −1 after being inverted, 0 is still 0 after being inverted, and −1 is 1 after being inverted.

This embodiment can meet a larger channel bandwidth during actual implementation, implement backward compatibility, verify, through exhaustive simulation on parameters, that the short training sequence provided in this embodiment has a smaller peak-to-average power ratio PAPR and better performance, improve an estimation effect of an automatic gain control circuit at the receive end, and achieve a lower receiving bit error rate.

The foregoing describes in detail the method for transmitting a physical layer protocol data unit provided in the embodiments with reference to FIG. 1 to FIG. 6.

An embodiment provides an apparatus for transmitting a physical layer protocol data unit. In a possible implementation, the apparatus is configured to implement the steps or procedures corresponding to the receive end in the foregoing method embodiments. In another possible implementation, the apparatus is configured to implement the steps or procedures corresponding to the transmit end in the foregoing method embodiments.

Figure 7:
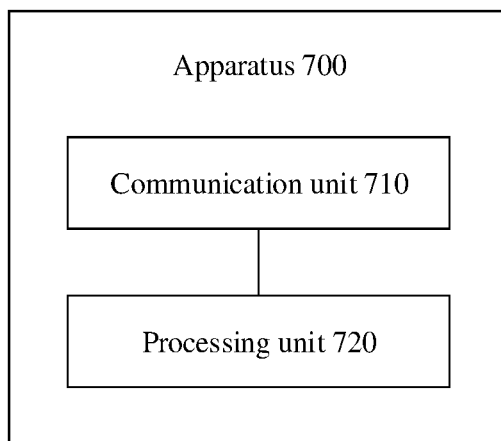
FIG. 7 is a schematic block diagram of an apparatus for transmitting a physical layer protocol data unit according to an embodiment.
Figure 8:
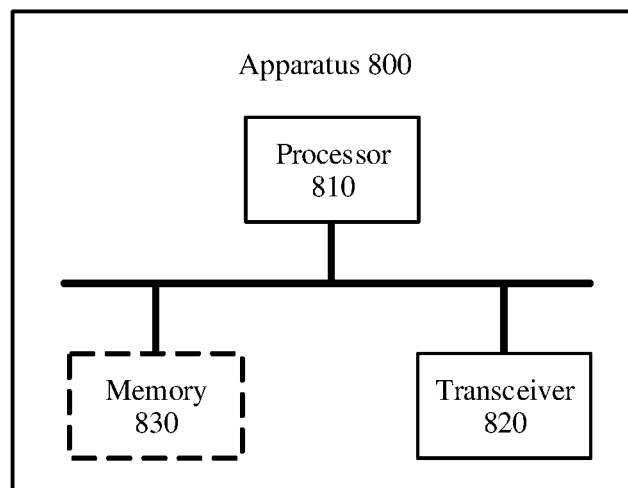
FIG. 8 is another schematic block diagram of an apparatus for transmitting a physical layer protocol data unit according to an embodiment.
Figure 9:
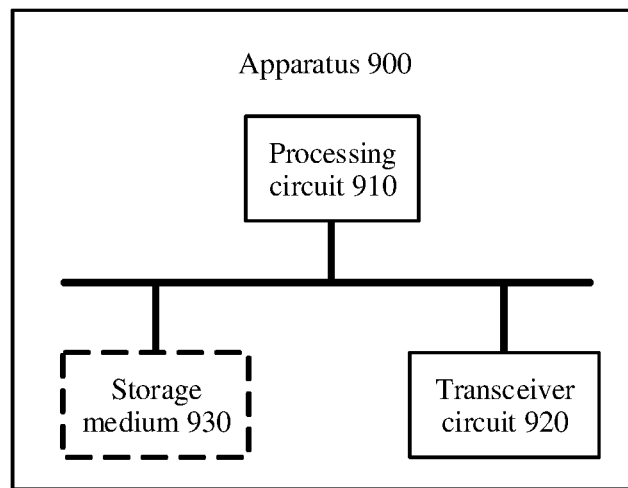
FIG. 9 is still another schematic block diagram of an apparatus for transmitting a physical layer protocol data unit according to an embodiment.

The following describes in detail the apparatus for transmitting a physical layer protocol data unit provided in the embodiments with reference to FIG. 7 to FIG. 9.

FIG. 7 is a schematic block diagram of an apparatus for transmitting a physical layer protocol data unit according to an embodiment. As shown in FIG. 7, the apparatus 700 may include a communication unit 710 and a processing unit 720. The communication unit 710 may communicate with the outside, and the processing unit 720 is configured to process data. The communication unit 710 may also be referred to as a communication interface or a transceiver unit.

The apparatus 700 may implement the steps or procedures performed by the transmit end in the foregoing method embodiments. The processing unit 720 is configured to perform processing-related operations of the transmit end in the foregoing method embodiments, and the communication unit 710 is configured to perform receiving- and sending-related operations of the transmit end in the foregoing method embodiments.

For example, the processing unit 720 is configured to: generate a physical layer protocol data unit PPDU, where the PPDU includes a short training field, a length of a frequency domain sequence of the short training field is greater than a first length, and the first length is a length of a frequency domain sequence of a short training field of a PPDU transmitted on a channel with a bandwidth of 160 MHz; and the communication unit 710 is configured to send the PPDU on a target channel, where a bandwidth of the target channel is greater than 160 MHz.

The apparatus 700 may implement the steps or procedures performed by the receive end in the foregoing method embodiments. The communication unit 710 is configured to perform receiving- and sending-related operations of the receive end in the foregoing method embodiments, and the processing unit 720 is configured to perform processing-related operations of the receive end in the foregoing method embodiments.

For example, the communication unit 710 is configured to: receive a physical layer protocol data unit PPDU on a target channel, where the PPDU includes a short training field, a length of a frequency domain sequence of the short training field is greater than a first length, the first length is a length of a frequency domain sequence of a short training field of a PPDU transmitted on a channel with a bandwidth of 160 MHz, and a bandwidth of the target channel is greater than 160 MHz; and the processing unit 720 is configured to parse the PPDU.

Optionally, the bandwidth of the target channel is 240 MHz, and the frequency domain sequence of the short training field may be any one of the following:

$\{HES'_{-112:16:112},-1,HES'_{-112:16:112},0,HES'_{-112:16:112},-1,$
$HES'_{-112:16:112},0,-HES'_{-112:16:112},-1,HES'_{-112:16:112},0,$
$-HES'_{-112:16:112},1,HES'_{-112:16:112},0,HES'_{-112:16:112},1,$
$-HES'_{-112:16:112},0,-HES'_{-112:16:112},1,HES'_{-112:16:112}\}\cdot(1+j)/\sqrt{2}$;

$\{-HES'_{-112:16:112},1,-HES'_{-112:16:112},0,-HES'_{-112:16:112},$
$1,-HES'_{-112:16:112},0,HES'_{-112:16:112},1,-HES'_{-112:16:112},0,$
$HES'_{-112:16:112},-1,-HES'_{-112:16:112},0,-HES'_{-112:16:112},-1,$
$HES'_{-112:16:112},0,HES'_{-112:16:112},-1,-HES'_{-112:16:112}\}\cdot(1+j)/\sqrt{2}$; or $\{HES'_{-112:16:112},1,HES'_{-112:16:112},0,HES'_{-112:16:112},1,$
$-HES'_{-112:16:112},-1,-HES'_{-112:16:112},1,-HES'_{-112:16:112},0,$
$-HES'_{-112:16:112},1,HES'_{-112:16:112},-1,-HES'_{-112:16:112},1,$
$-HES'_{-112:16:112},0,HES'_{-112:16:112},1,-HES'_{-112:16:112}\}\cdot(1+j)/\sqrt{2}$, where $HES'_{-112:16:112}$ is represented as $\{M\}$, and $M=\{-1,-1,-1,1,1,1,-1,1,1,1,-1,1,1,-1,1\}$.

Optionally, the bandwidth of the target channel is 240 MHz, and the frequency domain sequence of the short training field is any one of the following:

$\{HES'_{-1008:16:1008}\_L,0,HES'_{-1008:16:1008}\_R,0,$
$HES'_{-496:16:496}\}\cdot(1+j)/\sqrt{2}$;

$\{-HES'_{-1008:16:1008}\_L,0,-HES'_{-1008:16:1008}\_R,0,$
$-HES'_{-496:16:496}\}\cdot(1+j)/\sqrt{2}$;

$\{HES'_{-496:16:496},0,-HES'_{-1008:16:1008}\_L,0,$
$-HES'_{-1008:16:1008}\_R\}\cdot(1+j)/\sqrt{2}$; or $\{-HES'_{-496:16:496},0,HES'_{-1008:16:1008}\_L,0,$
$HES'_{-1008:16:1008}\_R\}\cdot(1+j)/\sqrt{2}$, where $HES'_{-1008:16:1008}\_L$ is represented as $\{M,1,-M,0,-M,1,-M\}$, $HES'_{-1008:16:1008}\_R$ is represented as $\{-M,-1,M,0,-M,1,-M\}$, $HES'_{-496:16:496}$ is represented as $\{M,1,-M,0,-M,1,-M\}$, and $M=\{-1,-1,-1,1,1,1,-1,1,1,1,-1,1,1,-1,1\}$.

Optionally, the bandwidth of the target channel is 240 MHz, and the frequency domain sequence of the short training field is any one of the following:

$\{HES'_{-496:16:496}\_L,0,-HES'_{-496:16:496}\_R,0,$
$-HES'_{-496:16:496}\_L,0,HES'_{-496:16:496}\_R,0,$
$-HES'_{-496:16:496}\_L,0,-HES'_{-496:16:496}\_R\}\cdot(1+j)/\sqrt{2}$;

$\{-HES'_{-496:16:496}\_L,0,HES'_{-496:16:496}\_R,0,$
$HES'_{-496:16:496}\_L,0,-HES'_{-496:16:496}\_R,0,$
$HES'_{-496:16:496}\_L,0,HES'_{-496:16:496}\_R\}\cdot(1+j)/\sqrt{2}$;

$\{HES'_{-496:16:496},0,-HES'_{-496:16:496},0,-HES'_{-496:16:496}\}\cdot(1+j)/\sqrt{2}$; or $\{-HES'_{-496:16:496},0,HES'_{-496:16:496},0,HES'_{-496:16:496}\}\cdot(1+j)/\sqrt{2}$, where $HES'_{-496:16:496}\_L$ is represented as $\{M,1,-M\}$, $HES'_{-496:16:496}\_R$ is represented as $\{-M,1,-M\}$, $HES'_{-496:16:496}$ is represented as $\{M,1,-M,0,-M,1,-M\}$, and $M=\{-1,-1,-1,1,1,1,-1,1,1,1,-1,1,1,-1,1\}$.

Optionally, the bandwidth of the target channel is 240 MHz, and the frequency domain sequence of the short training field is any one of the following:

$\{HES'_{-120:8:120},-1,-HES'_{-120:8:120},0,HES'_{-120:8:120},1,$
$HES'_{-120:8:120},0,-HES'_{-120:8:120},-1,HES'_{-120:8:120},0,$
$HES'_{-120:8:120},1,HES'_{-120:8:120},0,HES'_{-120:8:120},-1,$
$-HES'_{-120:8:120},0,-HES'_{-120:8:120},1,-HES'_{-120:8:120}\}$;

$\{HES'_{-120:8:120},1,HES'_{-120:8:120},0,-HES'_{-120:8:120},1,$
$-HES'_{-120:8:120},0,-HES'_{-120:8:120},1,HES'_{-120:8:120},-1,$
$-HES'_{-120:8:120},1,-HES'_{-120:8:120},0,HES'_{-120:8:120},1,$
$-HES'_{-120:8:120}\}$; or $\{-HES'_{-120:8:120},-1,-HES'_{-120:8:120},0,-HES'_{-120:8:120},$
$-1,HES'_{-120:8:120},1,HES'_{-120:8:120},-1,HES'_{-120:8:120},0,$
$HES'_{-120:8:120},-1,-HES'_{-120:8:120},1,HES'_{-120:8:120},-1,$
$HES'_{-120:8:120},0,-HES'_{-120:8:120},-1,HES'_{-120:8:120}\}$, where $HES'_{-120:8:120}$ is represented as $\{M,0,-M\}$, and $M=\{1,-1,-1,-1,1,1,1,-1,1,1,1,-1,1,1,-1,1\}$.

Optionally, the bandwidth of the target channel is 240 MHz, and the frequency domain sequence of the short training field is any one of the following:

$\{HES'_{-1016:8:1016}\_L,0,HES'_{-1016:8:1016}\_R,0,$
$HES'_{-504:8:504}\}\cdot(1+j)/\sqrt{2}$;

$\{HES'_{-1016:8:1016}\_L,1,HES'_{-1016:8:1016}\_R,0,$
$HES'_{-504:8:504}\}\cdot(1+j)/\sqrt{2}$;

$\{-HES'_{-504:8:504},0,HES'_{-1016:8:1016}\_L,0,$
$HES'_{-1016:8:1016}\_R\}\cdot(1+j)/\sqrt{2}$; or $\{-HES'_{-504:8:504},0,HES'_{-1016:8:1016}\_L,1,$
$HES'_{-1016:8:1016}\_R\}\cdot(1+j)/\sqrt{2}$, where $HES'_{-1016:8:1016}\_L=\{M,-1,M,-M,-1,M,0,-M,1,M,1,-M,1,-M\}$, $HES'_{-1016:8:1016}\_R=\{-M,1,-M,1,M,1,-M,0,-M,1,M,1,-M,1,-M\}$, $HES'_{-504:8:504}$ is represented as $\{M,-1,M,-1,-M,-1,M,0,-M,1,M,1,-M,1,-M\}$, and $M=\{-1,-1,-1,1,1,1,-1,1,1,1,-1,1,1,-1,1\}$.

Optionally, the bandwidth of the target channel is 240 MHz, and the frequency domain sequence of the short training field is any one of the following:

$\{HES'_{-504:8:504}\_L,-1,HES'_{-504:8:504}\_R,1,$
$-HES'_{-504:8:504}\_L,0,HES'_{-504:8:504}\_R,-1,$
$HES'_{-504:8:504}\_L,-1,HES'_{-504:8:504}\_R\}\cdot(1+j)/\sqrt{2}$;

$\{HES'_{-504:8:504}\_L,0,HES'_{-504:8:504}\_R,$
$1,-HES'_{-504:8:504}\_L,0,HES'_{-504:8:504}\_R,-1,$
$HES'_{-504:8:504}\_L,0,HES'_{-504:8:504}\_R\}\cdot(1+j)/\sqrt{2}$;

$\{HES'_{-504:8:504}\_L,0,HES'_{-504:8:504}\_R,0,$
$-HES'_{-504:8:504}\_L,0,HES'_{-504:8:504}\_R,0,HES'_{-504:8:504}\_L,0,$
$HES'_{-504:8:504}\_R\}\cdot(1+j)/\sqrt{2}$;

$\{HES'_{-504:8:504},0,-HES'_{-504:8:504},0,-HES'_{-504:8:504}\}\cdot(1+j)/\sqrt{2}$; or $\{-HES'_{-504:8:504},0,HES'_{-504:8:504},0,HES'_{-504:8:504}\}\cdot(1+j)/\sqrt{2}$, where $HES'_{-504:8:504}\_L$ is represented as $\{M,-1,M,-1,-M,-1,M\}$, $HES'_{-504:8:504}\_R$ is represented as $\{-M,1,M,1,-M,1,-M\}$, $HES'_{-504:8:504}$ is represented as $\{M,-1,M,-1,-M,-1,M,0,-M,1,M,1,-M,1,-M\}$, and $M=\{-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{-HES'_{-112:16:112},1,HES'_{-112:16:112},0,-HES'_{-112:16:112},1,$
$HES'_{-112:16:112},0,HES'_{-112:16:112},-1,-HES'_{-112:16:112},0,$
$HES'_{-112:16:112},-1,HES'_{-112:16:112},0,HES'_{-112:16:112},1,$
$-HES'_{-112:16:112},0,HES'_{-112:16:112},1,HES'_{-112:16:112},0,$
$HES'_{-112:16:112},-1,-HES'_{-112:16:112},0,-HES'_{-112:16:112},1,$
$-HES'_{-112:16:112}\}\cdot(1+j)/\sqrt{2}$;

$\{HES'_{-112:16:112},1,HES'_{-112:16:112},0,-HES'_{-112:16:112},1,$
$-HES'_{-112:16:112},0,-HES'_{-112:16:112},1,HES'_{-112:16:112},0,$
$-HES'_{-112:16:112},1,-HES'_{-112:16:112},0,-HES'_{-112:16:112},1,$
$-HES'_{-112:16:112},0,-HES'_{-112:16:112},1, HES'_{-112:16:112},$
$0,-HES'_{-112:16:112},1,HES'_{-112:16:112},0,HES'_{-112:16:112},1,$
$-HES'_{-112:16:112}\}\cdot(1+j)/\sqrt{2}$;

$\{-HES'_{-112:16:112},1,HES'_{-112:16:112},0,HES'_{-112:16:112},1,$
$-HES'_{-112:16:112},0,HES'_{-112:16:112},1,-HES'_{-112:16:112},$
$0,-HES'_{-112:16:112},1,-HES'_{-112:16:112},0,-HES'_{-112:16:112},$
$1,-HES'_{-112:16:112},0,HES'_{-112:16:112},1,-HES'_{-112:16:112},$
$0,-HES'_{-112:16:112},1,-HES'_{-112:16:112},0,HES'_{-112:16:112},1,$
$HES'_{-112:16:112}\}\cdot(1+j)/\sqrt{2}$; or $\{HES'_{-112:16:112},1,-HES'_{-112:16:112},0,-HES'_{-112:16:112},$
$1,-HES'_{-112:16:112},0,HES'_{-112:16:112},1,HES'_{-112:16:112},$
$0,-HES'_{-112:16:112},1,-HES'_{-112:16:112},0,HES'_{-112:16:112},$
$1,-HES'_{-112:16:112},0,-HES'_{-112:16:112},1,HES'_{-112:16:112},0,$
$-HES'_{-112:16:112},1,HES'_{-112:16:112},0,HES'_{-112:16:112},1,$
$HES'_{-112:16:112}\}\cdot(1+j)/\sqrt{2}$, where $HES'_{-112:16:112}$ is represented as $\{M\}$, and $M=\{-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{HES'_{-1008:16:1008},0,HES'_{-1008:16:1008}\}\cdot(1+j)/\sqrt{2}$;
$\{-HES'_{-1008:16:1008},0,-HES'_{-1008:16:1008}\}\cdot(1+j)/\sqrt{2}$;
$\{HES'_{-1008:16:1008},0,-HES'_{-1008:16:1008}\}\cdot(1+j)/\sqrt{2}$;
$\{-HES'_{-1008:16:1008},0,HES'_{-1008:16:1008}\}\cdot(1+j)/\sqrt{2}$; or
$\{-HES'_{-1008:16:1008}\_L,-1,-HES'_{-1008:16:1008}\_R,$
$0,HES'_{-1008:16:1008}\_L,-1,HES'_{-1008:16:1008}\_R\}\cdot(1+j)/\sqrt{2}$, where $HES'_{-1008:16:1008}$ is represented as $\{M,1,-M,0,-M,1,-M,0,-M,-1,M,0,-M,1,-M\}$, $HES'_{-1008:16:1008}\_L$ is represented as $\{M,1,-M,0,-M,1,-M\}$, $HES'_{-1008:16:1008}\_R$ is represented as $\{-M,-1,M,0,-M,1,-M\}$, and $M=\{-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{HES'_{-496:16:496}\_L,0,-HES'_{-496:16:496}\_R,0,$
$HES'_{-496:16:496}\_L,0,-HES'_{-496:16:496}\_R,0,$
$-HES'_{-496:16:496}\_L,0,-HES'_{-496:16:496}\_R,0,$
$HES'_{-496:16:496}\_L,0,HES'_{-496:16:496}\_R\}\cdot(1+j)/\sqrt{2}$;

$\{-HES'_{-496:16:496}\_L,0,HES'_{-496:16:496}\_R,0,$
$-HES'_{-496:16:496}\_R,0,HES'_{-496:16:496}\_R,0,$
$HES'_{-496:16:496}\_L,0,-HES'_{-496:16:496}\_R,0,$
$-HES'_{-496:16:496}\_L,0,-HES'_{-496:16:496}\_R\}\cdot(1+j)/\sqrt{2}$;

$\{HES'_{-496:16:496},0,-HES'_{-496:16:496},0,-HES'_{-496:16:496},$
$0,-HES'_{-496:16:496}\}\cdot(1+j)/\sqrt{2}$; or $\{-HES'_{-496:16:496},0,HES'_{-496:16:496},0,HES'_{-496:16:496},0,$
$HES'_{-496:16:496}\}\cdot(1+j)/\sqrt{2}$, where $HES'_{-496:16:496}\_L$, is represented as $\{M,1,-M\}$, $HES'_{-496:16:496}\_R$ is represented as $\{-M,1,-M\}$, $HES'_{-496:16:496}$ is represented as $\{M,1,-M,0,-M,1,-M\}$, and $M=\{-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{HES'_{-120:8:120},1,-HES'_{-120:8:120},0,HES'_{-120:8:120},1,$
$-HES'_{-120:8:120},0,HES'_{-120:8:120},-1,-HES'_{-120:8:120},0,$
$-HES'_{-120:8:120},1,HES'_{-120:8:120},0,-HES'_{-120:8:120},1,$
$-HES'_{-120:8:120},0,-HES'_{-120:8:120},-1,HES'_{-120:8:120},0,$
$-HES'_{-120:8:120},-1,-HES'_{-120:8:120},0,-HES'_{-120:8:120},$
$1,-HES'_{-120:8:120}\}$;

$\{HES'_{-120:8:120},1,HES'_{-120:8:120},0,HES'_{-120:8:120},$
$-1,-HES'_{-120:8:120},0,-HES'_{-120:8:120},-1,HES'_{-120:8:120},0,$
$HES'_{-120:8:120},1,HES'_{-120:8:120},0,-HES'_{-120:8:120},1,$
$HES'_{-120:8:120},0,HES'_{-120:8:120},-1,HES'_{-120:8:120},0,$
$HES'_{-120:8:120},1,-HES'_{-120:8:120},0,HES'_{-120:8:120},1,$
$-HES'_{-120:8:120}\}$; or $\{-HES'_{-120:8:120},1,-HES'_{-120:8:120},0,-HES'_{-120:8:120},-1,$
$HES'_{-120:8:120},0,HES'_{-120:8:120},1,HES'_{-120:8:120},0,$
$HES'_{-120:8:120},-1,-HES'_{-120:8:120},0,HES'_{-120:8:120},$
$1,HES'_{-120:8:120},0,-HES'_{-120:8:120},-1,HES'_{-120:8:120},0,$
$HES'_{-120:8:120},1,HES'_{-120:8:120},0,HES'_{-120:8:120},-1,$
$HES'_{-120:8:120}\}$, where $HES'_{-120:8:120}$ is represented as $\{M,0,-M\}$, and $M=\{1,-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{HES'_{-1016:8:1016},0,HES'_{-1016:8:1016}\}\cdot(1+j)/\sqrt{2}$;
$\{-HES'_{-1016:8:1016},0,-HES'_{-1016:8:1016}\}\cdot(1+j)/\sqrt{2}$;
$\{HES'_{-1016:8:1016},0,-HES'_{-1016:8:1016}\}\cdot(1+j)/\sqrt{2}$;
$\{-HES'_{-1016:8:1016},0,HES'_{-1016:8:1016}\}\cdot(1+j)/\sqrt{2}$; or
$\{HES'_{-1016:8:1016}\_L,1,HES'_{-1016:8:1016}\_R,$
$0,HES'_{-1016:8:1016}\_L,-1,-HES'_{-1016:8:1016}\_R\}\cdot(1+j)/\sqrt{2}$, where $HES'_{-1:16:8:1016}$ is represented as $\{M,-1,M,-M,-1,M,0,-M,1,M,1,-M,1,-M,0,-M,1,-M,1,M,1,-M,0,-M,1,M,1,-M,1,-M\}$, $HES'_{-1016:8:1016}\_L$ is represented as $\{M,-1,M,-M,-1,M,0,-M,1,M,1,-M,1,-M\}$, $HES'_{-1016:8:1016}\_R$ is represented as $\{-M,1,-M,1,M,1,-M,0,-M,1,M,1,-M,1,-M\}$, and $M=\{-1,-1,-1,1,1,1,-1,1,1,1,-1,1,1,-1,1\}$.

Optionally, the bandwidth of the target channel is 320 MHz, and the frequency domain sequence of the short training field is any one of the following:

$\{HES'_{-504:8:504},0,HES'_{-504:8:504},0,HES'_{-504:8:504},0,$
$-HES'_{-504:8:504}\}\cdot(1+j)/\sqrt{2}$; or
$\{-HES'_{-504:8:504},0,HES'_{-504:8:504},0,HES'_{-504:8:504},0,$
$HES'_{-504:8:504}\}\cdot(1+j)/\sqrt{2}$, where $HES'_{-504:8:504}$ is represented as $\{M,-1,M,-1,-M,-1,M,0,-M,1,M,1,-M,1,-M\}$, and $M=\{-1,-1,-1,1,1,1,-1,1,1,-1,1,1,-1,1,1,-1,1\}$.

It should be understood that the apparatus 700 is presented in a form of a functional unit. The term "unit" herein may refer to an application specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 700 may be the transmit end in the foregoing embodiments and may be configured to perform the procedures and/or steps corresponding to the transmit end in the foregoing method embodiments. Alternatively, the apparatus 700 may be the receive end in the foregoing embodiments and may be configured to perform the procedures and/or steps corresponding to the receive end in the foregoing method embodiments. To avoid repetition, details are not described herein again.

The apparatus 700 in each of the foregoing solutions has a function of implementing the corresponding steps performed by the transmit end in the foregoing method, or the apparatus 700 in each of the foregoing solutions has a function of implementing the corresponding steps performed by the receive end in the foregoing method. The function may be implemented by using hardware or may be implemented by hardware executing corresponding software. The hardware or software includes one or more modules corresponding to the foregoing function. For example, a communication unit may be replaced with a transceiver (where for example, a sending unit in the communication unit may be replaced with a transmitter, and a receiving unit in the communication unit may be replaced with a receiver), and another unit such as a processing unit may be replaced with a processor, to separately perform receiving and sending operations and a related processing operation in the method embodiments.

In addition, the communication unit may alternatively be a transceiver circuit (where for example, the transceiver circuit may include a receiver circuit and a transmitter circuit), and the processing unit may be a processing circuit. In this embodiment, the apparatus in FIG. 7 may be the receive end or the transmit end in the foregoing embodiments, or may be a chip or a chip system, for example, a system on chip (SoC). The communication unit may be an input/output circuit or a communication interface. The processing unit is a processor, a microprocessor, or an integrated circuit integrated on the chip. This is not limited herein.

As shown in FIG. 8, an apparatus 800 for transmitting a physical layer protocol data unit according to an embodiment is provided. The apparatus 800 includes a processor 810 and a transceiver 820. The processor 810 and the transceiver 820 communicate with each other through an internal connection path, and the processor 810 is configured to execute instructions, to control the transceiver 820 to send a signal and/or receive a signal.

Optionally, the apparatus 800 may further include a memory 830. The memory 830 communicates with the processor 810 and the transceiver 820 through an internal connection path. The memory 830 is configured to store instructions, and the processor 810 may execute the instructions stored in the memory 830. In a possible implementation, the apparatus 800 is configured to implement procedures and steps corresponding to the transmit end in the foregoing method embodiments. In another possible implementation, the apparatus 800 is configured to implement procedures and steps corresponding to the receive end in the foregoing method embodiments.

It should be understood that the apparatus 800 may be the transmit end or the receive end in the foregoing embodiments or may be a chip or a chip system. Correspondingly, the transceiver 820 may be a transceiver circuit of the chip. This is not limited herein. The apparatus 800 may be configured to perform the steps and/or the procedures corresponding to the transmit end or the receive end in the foregoing method embodiments. Optionally, the memory 830 may include a read-only memory and a random access memory and provide instructions and data to the processor. A part of the memory may further include a non-volatile random access memory. For example, the memory may further store information about a device type. The processor 810 may be configured to execute the instructions stored in the memory. When the processor 810 executes the instructions stored in the memory, the processor 810 is configured to perform the steps and/or procedures of the method embodiments corresponding to the transmit end or the receive end.

In an implementation process, the steps in the foregoing method may be completed by using a hardware integrated logical circuit in the processor, or by using instructions in a form of software. The steps of the method with reference to the embodiments may be directly performed and completed by a hardware processor or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor. To avoid repetition, details are not described herein again.

It should be noted that, the processor in the embodiments may be an integrated circuit chip and has a signal processing capability. In an implementation process, the steps in the foregoing method embodiments may be completed by using a hardware integrated logical circuit in the processor, or by using instructions in a form of software. The processor may be a general-purpose processor, a digital signal processor (DSP), an application specific integrated circuit (ASIC), a field programmable gate array (FPGA) or another programmable logic device, a discrete gate or a transistor logic device, or a discrete hardware component. The processor in the embodiments may implement or perform the methods, the steps, and the logical block diagrams that are in the embodiments. The general-purpose processor may be a microprocessor, or any conventional processor, or the like. The steps of the method with reference to embodiments may be directly performed and completed by a hardware decoding processor or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the method in combination with hardware of the processor.

It may be understood that the memory in the embodiments may be a volatile memory or a non-volatile memory or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through example but not limitative description, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described is intended to include, but is not limited to, these memories and any memory of another proper type.

As shown in FIG. 9, an apparatus 900 for transmitting a physical layer protocol data unit according to an embodiment is provided. The apparatus 900 includes a processing circuit 910 and a transceiver circuit 920. The processing circuit 910 and the transceiver circuit 920 communicate with each other through an internal connection path, and the processing circuit 910 is configured to execute instructions, to control the transceiver circuit 920 to send a signal and/or receive a signal.

Optionally, the apparatus 900 may further include a storage medium 930. The storage medium 930 communicates with the processing circuit 910 and the transceiver circuit 920 through an internal connection path. The storage medium 930 is configured to store instructions, and the processing circuit 910 may execute the instructions stored in the storage medium 930. In a possible implementation, the apparatus 900 is configured to implement procedures and steps corresponding to the transmit end in the foregoing method embodiments. In another possible implementation, the apparatus 900 is configured to implement procedures and steps corresponding to the receive end in the foregoing method embodiments.

According to the method provided in the embodiments, a computer program product includes computer program code. When the computer program code is run on a computer, the computer is enabled to perform the method in the embodiment shown in FIG. 6.

According to the method provided in the embodiments a computer-readable medium stores program code. When the program code is run on a computer, the computer is enabled to perform the method in the embodiment shown in FIG. 6.

According to the method provided in the embodiments, a system includes the foregoing one or more stations and the foregoing one or more access points.

A person of ordinary skill in the art may be aware that, the units and algorithm steps in the examples described with reference to the embodiments may be implemented by electronic hardware or a combination of computer software and electronic hardware. Whether the functions are performed by hardware or software depends on particular applications and constraints of the solution. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical form or other forms.

The units described as separate parts may or may not be physically separate, and parts displayed as units may or may not be physical units, that is, may be located in one position, or may be distributed on a plurality of network units. Some or all of the units may be selected based on actual needs to achieve the objectives of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the embodiments essentially, or a part contributing to the conventional technology, or a part of the embodiments may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or a compact disc.

The foregoing descriptions are merely implementations, but are not intended to limit the scope of the embodiments. Any variation or replacement readily figured out by a person skilled in the art is envisioned to fall within the scope of the embodiments.

What is claimed is:

1. A method for transmitting a physical layer protocol data unit, comprising:
    generating a physical layer protocol data unit (PPDU), wherein the PPDU comprises a short training field, a length of a frequency domain sequence of the short training field is greater than a first length, and the first length is a length of a frequency domain sequence of a short training field of a PPDU transmitted on a channel with a bandwidth of 160 MHz;
    selecting a sequence with a smaller peak-to-average power ratio (PAPR) from a plurality of possible sequence values; and
    sending the PPDU on a target channel, wherein a bandwidth of the target channel is greater than 160 MHz.

2. The method for transmitting a physical layer protocol data unit according to claim 1, wherein the bandwidth of the target channel is 320 MHz, and the frequency domain sequence of the short training field is any one of the following:
    $\{-HES'_{-112:16:112}, 1, HES'_{-112:16:112}, 0, -HES'_{-112:16:112}, 1,$
    $HES'_{-112:16:112}, 0, HES'_{-112:16:112}, -1, -HES'_{-112:16:112},$
    $0, HES'_{-112:16:112}, -1, HES'_{-112:16:112}, 0, HES'_{-112:16:112},$
    $1, -HES'_{-112:16:112}, 0, -HES'_{-112:16:112}, 1,$
    $HES'_{-112:16:112}, 0, HES'_{-112:16:112}, -1, -HES'_{-112:16:112},$
    $0, -HES'_{-112:16:112}, 1, -HES'_{-112:16:112}\} \cdot (1+j)/\sqrt{2};$
    $\{HES'_{-112:16:112}, 1, HES'_{-112:16:112}, 0, -HES'_{-112:16:112}, 1,$
    $-HES'_{-112:16:112}, 0, -HES'_{-112:16:112}, 1, HES'_{-112:16:112},$
    $0, -HES'_{-112:16:112}, 1, -HES'_{-112:16:112}, 0,$
    $-HES'_{-112:16:112}, 1, -HES'_{-112:16:112}, 0, -HES'_{-112:16:112},$
    $1, HES'_{-112:16:112}, 0, -HES'_{-112:16:112}, 1, HES'_{-112:16:112},$
    $0, HES'_{-112:16:112}, 1, -HES'_{-112:16:112}\} \cdot (1+j)/\sqrt{2};$
    $\{-HES'_{-112:16:112}, 1, HES'_{-112:16:112}, 0, HES'_{-112:16:112}, 1,$
    $-HES'_{-112:16:112}, 0, HES'_{-112:16:112}, 1, -HES'_{-112:16:112},$ 0,−HES'$_{-112:16:112}$,1,−HES'$_{-112:16:112}$,0,
−HES'$_{-112:16:112}$,1,−HES'$_{-112:16:112}$,0,HES'$_{-112:16:112}$,
1,−HES'$_{-112:16:112}$,0,−HES'$_{-112:16:112}$,1,
−HES'$_{-112:16:112}$,0,−HES'$_{-112:16:112}$,1,HES'$_{-112:16:112}$}·
(1+j)/√2; or
{HES'$_{-112:16:112}$,1,HES'$_{-112:16:112}$,0,−HES'$_{-112:16:112}$,1,
−HES'$_{-112:16:112}$,0,−HES'$_{-112:16:112}$,1,HES'$_{-112:16:112}$,
0,−HES'$_{-112:16:112}$,1,−HES'$_{-112:16:112}$,0,
HES'$_{-112:16:112}$,1,−HES'$_{-112:16:112}$,0,−HES'$_{-112:16:112}$,
1,HES'$_{-112:16:112}$,0,−HES'$_{-112:16:112}$,1,HES'$_{-112:16:112}$,
0,HES'$_{-112:16:112}$,1,HES'$_{-112:16:112}$}·(1+j)/√2; wherein
HES'$_{-112:16:112}$ is represented as {M}, and M={−1,
−1,−1,1,1,1,−1,1,1,1,−1,1,1,−1,1}.

3. The method for transmitting a physical layer protocol data unit according to claim 1, wherein the bandwidth of the target channel is 320 MHz, and the frequency domain sequence of the short training field is any one of the following:
{HES'$_{-1008:16:1008}$,0,HES'$_{-1008:16:1008}$}·(1+j)/√2;
{−HES'$_{-1008:16:1008}$,0,−HES'$_{-1008:16:1008}$}·(1+j)/√2;
{HES'$_{-1008:16:1008}$,0,−HES'$_{-1008:16:1008}$}·(1+j)/√2;
{−HES'$_{-1008:16:1008}$,0,HES'$_{-1008:16:1008}$}·(1+j)/√2; or
{−HES'$_{-1008:16:1008}$_L,−1,−HES'$_{-1008:16:1008}$_R,0,
HES'$_{-1008:16:1008}$_L,−1,HES'$_{-1008:16:1008}$_R}·(1+j)/√2,
wherein
HES'$_{-1008:16:1008}$ is represented as {M,1,−M,0,−M,1,−M,
0,−M,−1,M,0,−M,1, M}, HES'$_{-1008:16:1008}$_L is represented as {M,1,−M,0,−M,1,−M}, HES'$_{-1008:16:1008}$_R is represented as {−M,−1,M,0,−M,1,−M}, and M= {−1,−1,−1,1,1,1,−1,1,1,1,−1,1,1,−1,1}.

4. The method for transmitting a physical layer protocol data unit according to claim 1, wherein the bandwidth of the target channel is 320 MHz, and the frequency domain sequence of the short training field is any one of the following:
{HES'$_{-496:16:496}$_L,0,−HES'$_{-496:16:496}$_R,0,
HES'$_{-496:16:496}$_L,0,−HES'$_{-496:16:496}$_R,0,
−HES'$_{-496:16:496}$_L,0,−HES'$_{496:16:496}$_R,0,
HES'$_{496:16:496}$_L,0, HES'$_{496:16:496}$_R}·(1+j)/√2;
{−HES'$_{496:16:496}$_L,0,HES'$_{496:16:496}$_R,0,
−HES'$_{-496:16:496}$_L,0,HES'$_{496:16:496}$_R,0,
HES'$_{-496:16:496}$_L,0,HES'$_{496:16:496}$_R,0,
−HES'$_{496:16:496}$_L,0,−HES'$_{-496:16:496}$_R}·(1+j)/√2;
{HES'$_{496:16:496}$,0,−HES'$_{496:16:496}$,0,−HES'$_{496:16:496}$,
0,−HES'$_{496:16:496}$}·(1+j)/√2; or
{−HES'$_{496:16:496}$,0,HES'$_{496:16:496}$,0,HES'$_{496:16:496}$,0,
HES'$_{-496:16:496}$} · (1+j)/√2, wherein
HES'$_{496:16:496}$_L is represented as {M, 1,−M},
HES'$_{496:16:496}$_R is represented as {−M,1,−M},
HES'$_{496:16:496}$ is represented as {M,1,−M,0,−M,1,−M},
and M={−1,−1,−1,1,1,1,−1,1,1,1,−1,1,1,−1,1}.

5. The method for transmitting a physical layer protocol data unit according to claim 1, wherein the bandwidth of the target channel is 320 MHz, and the frequency domain sequence of the short training field is any one of the following:
{HES'$_{-120:8:120}$,1,−HES'$_{-120:8:120}$,0,HES'$_{-120:8:120}$,
1,−HES'$_{-120:8:120}$,0,HES'$_{120:8:120}$,−1, HES'$_{-120:8:120}$,
0,−HES'$_{-120:8:120}$, 1, HES'$_{-120:8:120}$,0,−HES'$_{-120:8:120}$,
1,−HES'$_{-120:8:120}$,0,HES'$_{120:8:120}$,−1,HES'$_{-120:8:120}$,
0,−HES'$_{-120:8:120}$,−1,−HES'$_{-120:8:120}$,0,
−HES'$_{-120:8:120}$,1,−HES'$_{-120:8:120}$};
{HES'$_{-120:8:120}$,1, HES'$_{-120:8:120}$,0,HES'$_{-120:8:120}$,−1,
HES'$_{-120:8:120}$,0,−HES'$_{-120:8:120}$,−1, HES'$_{120:8:120}$,0,
HES'$_{-120:8:120}$,1, HES'$_{-120:8:120}$,0,−HES'$_{-120:8:120}$,1,
HES'$_{-120:8:120}$,0,HES'$_{-120:8:120}$,−1,−HES'$_{120:8:120}$,0,
HES'$_{-120:8:120}$,1,−HES'$_{-120:8:120}$,0,−HES'$_{-120:8:120}$,1,
−HES'$_{-120:8:120}$}; or {−HES'$_{120:8:120}$,1, HES'$_{-120:8:120}$,0,−HES'$_{-120:8:120}$,−1,
HES'$_{-120:8:120}$,0,−HES'$_{-120:8:120}$,1,HES'$_{120:8:120}$,0,
HES'$_{-120:8:120}$,−1,−HES'$_{-120:8:120}$,0,HES'$_{-120:8:120}$,1,
HES'$_{-120:8:120}$,0,−HES'$_{-120:8:120}$,1, HES'$_{120:8:120}$,0,
HES'$_{-120:8:120}$,1, HES'$_{-120:8:120}$,0,HES'$_{-120:8:120}$,−1,
HES'$_{-120:8:120}$}, wherein
HES'$_{120:8:120}$ is represented as {M,0,−M}, and M={−1,
−1,−1,1,1,1,−1,1,1,1,−1,1,1,−1,1}.

6. The method for transmitting a physical layer protocol data unit according to claim 1, wherein the bandwidth of the target channel is 320 MHz, and the frequency domain sequence of the short training field is any one of the following:
{HES'$_{-1016:8:1016}$,0,HES'$_{-1016:8:1016}$}·(1+j)/√2;
{−HES'$_{-1016:8:1016}$,0,−HES'$_{-1016:8:1016}$}·(1+j)/√2;
{HES'$_{-1016:8:1016}$,0,−HES'$_{-1016:8:1016}$}·(1+j)/√2;
{−HES'$_{1016:8:1016}$,0,HES'$_{-1016:8:1016}$}·(1+j)/√2; or
{HES'$_{-1016:8:1016}$_L,1,HES'$_{-1016:8:1016}$_R,0,
HES'$_{-1016:8:1016}$_L,−1,−HES'$_{-1016:8:1016}$_R}·(1+j)/√2,
wherein
HES'$_{-1016:8:1016}$ is represented as {M,−1,M, M,−1,
M,0,−M,1,M,1,−M,1,−M,0,−M,1,−M,1,M,1,−M,0,−M,
1,M,1,−M,1,−M}, HES'$_{-1016:8:1016}$_L is represented as {M,−1,M,−M,−1,M,0,−M,1,M,1,−M,1,−M},
HES'$_{-1016:8:1016}$_R is represented as {−M,1,−M,1,M,
1,−M,0,−M,1,M,1,−M,1,−M}, and M={−1,−1,−1,1,1,
1,−1,1,1,1,−1,1,1,−1,1}.

7. The method for transmitting a physical layer protocol data unit according to claim 1, wherein the bandwidth of the target channel is 320 MHz, and the frequency domain sequence of the short training field is any one of the following:
{HES'$_{-504:8:504}$,0,HES'$_{-504:8:504}$,0,HES'$_{-504:8:504}$,0,
−HES'$_{504:8:504}$}·(1+j)/√2; or
{−HES'$_{504:8:504}$,0,HES'$_{-504:8:504}$,0,HES'$_{-504:8:504}$,0,
HES'$_{504:8:504}$}·(1+j)/√2, wherein
HES'$_{504:8:504}$ is represented as {M,−1,M,−1,−M,−1,M,0,
−M,1,M,1,−M,1,−M}, and M={−1,−1,−1,1,1,1,−1,1,1,
1,−1,1,1,−1,1}.

8. A method for transmitting a physical layer protocol data unit, comprising:
receiving a physical layer protocol data unit (PPDU) on a target channel, wherein the PPDU comprises a short training field, a length of a frequency domain sequence of the short training field is greater than a first length, the first length is a length of a frequency domain sequence of a short training field of a PPDU transmitted on a channel with a bandwidth of 160 MHz, and a bandwidth of the target channel is greater than 160 MHz;
selecting a sequence with a smaller peak-to-average power ratio (PAPR) from a plurality of possible sequence values; and
parsing the PPDU.

9. The method for transmitting a physical layer protocol data unit according to claim 8, wherein the bandwidth of the target channel is 320 MHz, and the frequency domain sequence of the short training field is any one of the following:
{−HES'$_{-112:16:112}$,1,HES'$_{-112:16:112}$,0,−HES'$_{-112:16:112}$,1,
HES'$_{-112:16:112}$,0,HES'$_{-112:16:112}$,−1,−HES'$_{-112:16:112}$,
0,HES'$_{-112:16:112}$,−1, HES'$_{-112:16:112}$,0,HES'$_{-112:16:112}$,
1,−HES'$_{-112:16:112}$,0,HES'$_{-112:16:112}$,1, HES'$_{-112:16:112}$,
0,HES'$_{-112:16:112}$,−1,−HES'$_{-112:16:112}$,0,
−HES'$_{-112:16:112}$,1,−HES'$_{-112:16:112}$}·(1+j)/√2;
{HES'$_{-112:16:112}$,1,HES'$_{-112:16:112}$,0,−HES'$_{-112:16:112}$,1,
−HES'$_{-112:16:112}$,0,−HES'$_{112:16:112}$, 1, HES'$_{-112:16:112}$, 0,−HES′$_{−112:16:112}$,1,−HES′$_{−112:16:112}$,0,
−HES′$_{−112:16:112}$,1,−HES′$_{−112:16:112}$,0, $_{−112:16:112}$}·(1+j)/√2;
{−HES′$_{−112:16:112}$,1, HES′$_{−112:16:112}$,0,HES′$_{−112:16:112}$,
1,−HES′$_{−112:16:112}$,0,HES′$_{−112:16:112}$,1,
−HES′$_{−112:16:112}$,0,−HES′$_{−112:16:112}$,1,−HES′$_{−112:16:112}$,
0,−HES′$_{−112:16:112}$,1,−HES′$_{−112:16:112}$,0,HES′$_{112:16:112}$,
1,−HES′$_{−112:16:112}$,0,−HES′$_{−112:16:112}$,1,
−HES′$_{−112:16:112}$,0, HES′$_{−112:16:112}$,1, HES′$_{−112:16:112}$}·(1+j)/√2; or
{HES′$_{−112:16:112}$,1,−HES′$_{−112:16:112}$,0,−HES′$_{−112:16:112}$,
1,−HES′$_{−112:16:112}$,0,HES′$_{112:16:112}$,1, HES′$_{−112:16:112}$,
0,−HES′$_{−112:16:112}$,1,−HES′$_{−112:16:112}$,0,
HES′$_{−112:16:112}$,1,−HES′$_{−112:16:112}$,0,−HES′$_{−112:16:112}$,
1, HES′$_{−112:16:112}$,0,−HES′$_{−112:16:112}$,1, HES′$_{−112:16:112}$,
0,HES′$_{−112:16:112}$,1, HES′$_{−112:16:112}$}·(1+j)/√2, wherein
HES′$_{−112:16:112}$ is represented as {M}, and M={−1, −1,−1,1,1,1,−1,1,1,1,−1,1,1,−1,1}.

10. The method for transmitting a physical layer protocol data unit according to claim 8, wherein the bandwidth of the target channel is 320 MHz, and the frequency domain sequence of the short training field is any one of the following:
{HES′$_{−1008:16:1008}$,0,HES′$_{−1008:16:1008}$}·(1+j)/√2;
{−HES′$_{−1008:16:1008}$,0,−HES′$_{−1008:16:1008}$}·(1+j)/√2;
{HES′$_{−1008:16:1008}$,0,−HES′$_{−1008:16:1008}$}·(1+j)/√2;
{−HES′$_{−1008:16:1008}$,0,HES′$_{−1008:16:1008}$}·(1+j)/√2; or
{−HES′$_{−1008:16:1008}$_L,−1,−HES′$_{−1008:16:1008}$_R, 0,HES′$_{−1008:16:1008}$_L,−1,HES′$_{−1008:16:1008}$_R}·(1+j)/√2, wherein
HES′$_{−1008:16:1008}$ is represented as {M,1,−M,0,−M,1,−M, 0,−M,−1,M,0,−M,1,−M}, HES′$_{−1008:16:1008}$_L is represented as {M,1,−M,0,−M,1,−M}, HES′$_{−1008:16:1008}$_R is represented as {−M,−1,M,0,−M,1,−M}, and M= {−1,−1,−1,1,1,1,−1,1,1,1,−1,1,1,−1,1}.

11. The method for transmitting a physical layer protocol data unit according to claim 8, wherein the bandwidth of the target channel is 320 MHz, and the frequency domain sequence of the short training field is any one of the following:
{HES′$_{−496:16:496}$_L,0,−HES′$_{496:16:496}$_R,0,
HES′$_{−496:16:496}$_L,0,−HES′$_{−496:16:496}$_R,0,
−HES′$_{−496:16:496}$_L,0,−HES′$_{496:16:496}$_R,0,
HES′$_{496:16:496}$_L,0,HES′$_{−496:16:496}$_R}·(1+j)/√2;
{−HES′$_{−496:16:496}$_L,0,HES′$_{496:16:496}$_R,0,
−HES′$_{−496:16:496}$_L,0,HES′$_{496:16:496}$_R,0,
HES′$_{−496:16:496}$_L,0,−HES′$_{−496:16:496}$_R,0,
−HES′$_{496:16:496}$_L,0,−HES′$_{496:16:496}$_R}·(1+j)/√2;
{HES′$_{496:16:496}$,0,−HES′$_{496:16:496}$,0,−HES′$_{496:16:496}$, 0,−HES′$_{−496:16:496}$}·(1+j)/√2; or
{−HES′$_{496:16:496}$,0,HES′$_{−496:16:496}$,0,HES′$_{−496:16:496}$,0, HES′$_{−496:16:496}$}·(1+j)/√2, wherein
HES′$_{−496:16:496}$_L is represented as {M, 1,−M},
HES′$_{496:16:496}$_R is represented as {−M,1,−M},
HES′$_{496:16:496}$ is represented as {M,1,−M,0,−M,1,−M},
and M={−1,−1,−1,1,1,1,−1,1,1,1,−1,1,1,−1,1}.

12. The method for transmitting a physical layer protocol data unit according to claim 8, wherein the bandwidth of the target channel is 320 MHz, and the frequency domain sequence of the short training field is any one of the following:
{HES′$_{−120:8:120}$,1,−HES′$_{−120:8:120}$,0,HES′$_{−120:8:120}$,1,
−HES′$_{−120:8:120}$,0,HES′$_{−120:8:120}$,−1, HES′$_{−120:8:120}$,
0,−HES′$_{−120:8:120}$, 1, HES′$_{−120:8:120}$,0,−HES′$_{−120:8:120}$,
1,−HES′$_{−120:8:120}$,0,HES′$_{−120:8:120}$,−1, HES′$_{−120:8:120}$,
0,−HES′$_{−120:8:120}$,−1,−HES′$_{−120:8:120}$,0,
−HES′$_{−120:8:120}$,1,−HES′$_{120:8:120}$};
{HES′$_{−120:8:120}$,1, HES′$_{−120:8:120}$,0,HES′$_{−120:8:120}$,−1,
HES′$_{−120:8:120}$,0,−HES′$_{−120:8:120}$,−1, HES′$_{120:8:120}$,0,
HES′$_{−120:8:120}$,1, HES′$_{−120:8:120}$,0,−HES′$_{−120:8:120}$,1,
HES′$_{−120:8:120}$,0,HES′$_{−120:8:120}$,−1, HES′$_{120:8:120}$,0,
HES′$_{−120:8:120}$,1,−HES′$_{−120:8:120}$,0,HES′$_{−120:8:120}$,1,
−HES′$_{−120:8:120}$}; or
{−HES′$_{−120:8:120}$,1, HES′$_{−120:8:120}$,0,−HES′$_{−120:8:120}$,−1,
HES′$_{−120:8:120}$,0,−HES′$_{−120:8:120}$,1, HES′$_{−120:8:120}$,0,
HES′$_{−120:8:120}$,−1,−HES′$_{−120:8:120}$,0,HES′$_{−120:8:120}$,1,
HES′$_{−120:8:120}$,0,−HES′$_{−120:8:120}$,1, HES′$_{−120:8:120}$,0,
HES′$_{−120:8:120}$,1, HES′$_{−120:8:120}$,0,HES′$_{−120:8:120}$,−1,
HES′$_{−120:8:120}$}, wherein
HES′$_{−120:8:120}$ is represented as {M,0,−M}, and M={−1, −1,−1,1,1,1,−1,1,1,1,−1,1,1,−1,1}.

13. The method for transmitting a physical layer protocol data unit according to claim 8, wherein the bandwidth of the target channel is 320 MHz, and the frequency domain sequence of the short training field is any one of the following:
{HES′$_{−1016:8:1016}$,0,HES′$_{−1016:8:1016}$}·(1+j)/√2;
{−HES′$_{−1016:8:1016}$,0,−HES′$_{−1016:8:1016}$}·(1+j)/√2;
{HES′$_{−1016:8:1016}$,0,−HES′$_{−1016:8:1016}$}·(1+j)/√2;
{−HES′$_{−1016:8:1016}$,0,HES′$_{−1016:8:1016}$}·(1+j)/√2; or
{HES′$_{−1016:8:1016}$_L,1,HES′$_{−1016:8:1016}$_R,0,
HES′$_{1016:8:1016}$_L,−1,−HES′$_{−1016:8:1016}$_R}·(1+j)/√2, wherein
HES′$_{1016:8:1016}$ is represented as {M,−1,M,−M,−1,M,0, −M,1,M,1,−M,1,−M,0,−M,1,−M,1,M,1,−M,0,−M,1,M, 1,−M,1,−M}, HES′$_{−1016:8:1016}$_L is represented as {M,−1,M,−M,−1,M,0,−M,1,M,1,−M,1,−M},
HES′$_{−1016:8:1016}$_R is represented as {−M,1,−M,1,M, 1,−M,0,−M,1,M,1,−M,1,−M}, and M={−1,−1,−1,1,1, 1,−1,1,1,1,−1,1,1,−1,1}.

14. The method for transmitting a physical layer protocol data unit according to claim 8, wherein the bandwidth of the target channel is 320 MHz, and the frequency domain sequence of the short training field is any one of the following:
{HES′$_{−504:8:504}$,0,HES′$_{−504:8:504}$,0,HES′$_{−504:8:504}$,0, HES′$_{−504:8:504}$}·(1+j)/√2; or
{−HES′$_{−504:8:504}$,0,HES′$_{−504:8:504}$,0,HES′$_{−504:8:504}$,0, HES′$_{−504:8:504}$}·(1+j)/√2, wherein
HES′$_{−504:8:504}$ is represented as {M,−1,M,−1,−M,−1,M, 0,−M,1,M,1,−M,1,−M}, and M={−1,−1,−1,1,1,1,−1,1, 1,1,−1,1,1,−1,1}.

15. An apparatus for transmitting a physical layer protocol data unit, comprising:
a processor, configured to generate a physical layer protocol data unit (PPDU), wherein the PPDU comprises a short training field, a length of a frequency domain sequence of the short training field is greater than a first length, and the first length is a length of a frequency domain sequence of a short training field of a PPDU transmitted on a channel with a bandwidth of 160 MHz and select a sequence with a smaller peak-to-average power ratio (PAPR) from a plurality of possible sequence values; and
a transceiver, configured to send the PPDU on a target channel, wherein a bandwidth of the target channel is greater than 160 MHz.

16. The apparatus for transmitting a physical layer protocol data unit according to claim 15, wherein the bandwidth of the target channel is 320 MHz, and the frequency domain sequence of the short training field is any one of the following:
{−HES′$_{−112:16:112}$,1,HES′$_{−112:16:112}$,0,−HES′$_{−112:16:112}$,1,
HES′$_{−112:16:112}$,0,HES′$_{−112:16:112}$,−1,−HES′$_{−112:16:112}$,
0,HES′$_{−112:16:112}$,−1, HES′$_{−112:16:112}$,0,HES′$_{−112:16:112}$,
1,−HES′$_{−112:16:112}$,0,HES′$_{−112:16:112}$,1, HES′$_{−112:16:112}$, 0,HES'$_{-112:16:112}$,−1,−HES'$_{-112:16:112}$,0,
−HES'$_{-112:16:112}$,1,−HES'$_{-112:16:112}$}·(1+j)/√2;
{HES'$_{-112:16:112}$,1,HES'$_{-112:16:112}$,0,−HES'$_{-112:16:112}$,
1,−HES'$_{-112:16:112}$,0,−HES'$_{112:16:112}$,1, HES'$_{-112:16:112}$,
0,−HES'$_{-112:16:112}$,1,−HES'$_{-112:16:112}$,0,
−HES'$_{-112:16:112}$,1,−HES'$_{-112:16:112}$,0,−HES'$_{-112:16:112}$,
1, HES'$_{-112:16:112}$,0,−HES'$_{-112:16:112}$,1, HES'$_{-112:16:112}$,
0,HES'$_{-112:16:112}$,1,−HES'$_{-112:16:112}$}·(1+j)/√2;
{−HES'$_{-112:16:112}$,1,HES'$_{-112:16:112}$,0,HES'$_{-112:16:112}$,
1,−HES'$_{-112:16:112}$,0,HES'$_{-112:16:112}$,1,$_{-112:16:112}$,1,
−HES'$_{-112:16:112}$,0,−HES'$_{-112:16:112}$,1,−HES'$_{-112:16:112}$,
0,HES'$_{-112:16:112}$,1, HES'$_{-112:16:112}$}·(1+j)/√2; or
{HES'$_{112:16:112}$,1,HES'$_{-112:16:112}$,0,−HES'$_{-112:16:112}$,
1,−HES'$_{-112:16:112}$,0,HES'$_{-112:16:112}$,1,
−HES'$_{-112:16:112}$,0,−HES'$_{-112:16:112}$,1, HES'$_{-112:16:112}$,
0,
−HES'$_{-112:16:112}$,1, HES'$_{-112:16:112}$,0,HES'$_{-112:16:112}$,1,
HES'$_{-112:16:112}$}·(1+j)/√2, wherein HES'$_{-112:16:112}$ is represented as {M}, and M={−1,−1,−1,1,1,1,−1,1,1,1,−1,1,1,−1,1}.

17. The apparatus for transmitting a physical layer protocol data unit according to claim 15, wherein the bandwidth of the target channel is 320 MHz, and the frequency domain sequence of the short training field is any one of the following:

{HES'$_{-1008:16:1008}$,0,HES'$_{-1008:16:1008}$}·(1+j)/√2;
{−HES'$_{-1008:16:1008}$,0,−HES'$_{-1008:16:1008}$}·(1+j)/√2;
{HES'$_{-1008:16:1008}$,0,−HES'$_{-1008:16:1008}$}·(1+j)/√2;
{−HES'$_{-1008:16:1008}$,0,HES'$_{-1008:16:1008}$}·(1+j)/√2; or
{−HES'$_{-1008:16:1008}$_L,−1,−HES'$_{-1008:16:1008}$_R,
0,HES'$_{-1008:16:1008}$_L,−1,HES'$_{-1008:16:1008}$_R}·(1+j)/√2, wherein HES'$_{-1008:16:1008}$ is represented as {M,1,−M,0,−M,1,−M, 0,−M,−1,M,0,−M,1,−M}, HES'$_{-1008:16:1008}$_L is represented as {M,1,−M,0,−M,1,−M}, HES'$_{-1008:16:1008}$_R is represented as {−M,−1,M,0,−M,1,−M}, and M={−1,−1,−1,1,1,1,−1,1,1,1,−1,1,1,−1,1}.

18. The apparatus for transmitting a physical layer protocol data unit according to claim 15, wherein the bandwidth of the target channel is 320 MHz, and the frequency domain sequence of the short training field is any one of the following:

{HES'$_{-496:16:496}$_L,0,−HES'$_{-496:16:496}$_R,0,
HES'$_{-496:16:496}$_L,0,−HES'$_{496:16:496}$_R,0,
−HES'$_{-496:16:496}$_L,0,−HES'$_{496:16:496}$_R,0,
HES'$_{496:16:496}$_L,0,HES'$_{-496:16:496}$_R}·(1+j)/√2;
{−HES'L,0,HES'$_{496:16:496}$_R,0,−HES'$_{496:16:496}$_L,0,
HES'$_{496:16:496}$_R,0,HES'$_{496:16:496\_L}$,0,
HES'$_{-496:16:496}$_R,0,−HES'$_{-496:16:496}$_L,0,
−HES'$_{-496:16:496}$_R}·(1+j)/√2;

{HES'$_{496:16:496}$,0,−HES'$_{496:16:496}$,0,−HES'$_{496:16:496}$,0,
−HES'$_{496:16:496}$}·(1+j)/√2; or
{−HES'$_{-496:16:496}$,0,HES'$_{496:16:496}$,0,HES'$_{496:16:496}$,0,
HES'$_{496:16:496}$} · (1+j)/√2, wherein HES'$_{-496:16:496}$_L is represented as {M, 1,−M},
HES'$_{496:16:496}$_R is represented as {−M,1,−M},
HES'$_{496:16:496}$ is represented as {M,1, M,0,−M,1,−M},
and M={−1,−1,−1,1,1,1,−1,1,1,1,−1,1,1,−1,1}.

19. The apparatus for transmitting a physical layer protocol data unit according to claim 15, wherein the bandwidth of the target channel is 320 MHz, and the frequency domain sequence of the short training field is any one of the following:

{HES'$_{-120:8:120}$,1,−HES'$_{-120:8:120}$,1, HES'$_{-120:8:120}$,
0,−HES'$_{-120:8:120}$,1,−HES'$_{120:8:120}$,0,HES'$_{-120:8:120}$,−1,
HES'$_{-120:8:120}$,0,−HES'$_{-120:8:120}$,−1,−HES'$_{-120:8:120}$,
0,−HES'$_{-120:8:120}$,1,−HES'$_{-120:8:120}$};

{HES'$_{-120:8:120}$,1, HES'$_{-120:8:120}$,0,HES'$_{-120:8:120}$,−1,
HES'$_{-120:8:120}$,0,−HES'$_{120:8:120}$,−1, HES'$_{-120:8:120}$,0,
HES'$_{-120:8:120}$,1, HES'$_{-120:8:120}$,0,−HES'$_{-120:8:120}$,1,
HES'$_{-120:8:120}$,0,HES'$_{-120:8:120}$,−1, HES'$_{120:8:120}$,0,
HES'$_{-120:8:120}$,1,−HES'$_{-120:8:120}$,0,HES'$_{-120:8:120}$,1,
−HES'$_{-120:8:120}$}; Or

{−HES'$_{-120:8:120}$, 1, HES'$_{-120:8:120}$,0,−HES'$_{-120:8:120}$,−1,
HES'$_{-120:8:120}$,0,−HES'$_{-120:8:120}$, 1, HES'$_{-120:8:120}$,0,
HES'$_{-120:8:120}$,−1,−HES'$_{-120:8:120}$,0,HES'$_{-120:8:120}$,1,
HES'$_{-120:8:120}$,0,−HES'$_{-120:8:120}$,1, HES'$_{-120:8:120}$,0,
HES'$_{-120:8:120}$,1,HES'$_{-120:8:120}$,0,HES'$_{-120:8:120}$,−1,
HES'$_{-120:8:120}$}, wherein HES'$_{-120:8:120}$ is represented as {M,0,−M}, and M= {−1,−1,−1,1,1,1,−1,1,1,1,−1,1,1,−1,1}.

20. The apparatus for transmitting a physical layer protocol data unit according to claim 15, wherein the bandwidth of the target channel is 320 MHz, and the frequency domain sequence of the short training field is any one of the following:

{HES'$_{-1016:8:1016}$,0,HES'$_{-1016:8:1016}$}·(1+j)/√2;
{−HES'$_{-1016:8:1016}$,0,−HES'$_{-1016:8:1016}$}·(1+j)/√2;
{HES'$_{-1016:8:1016}$,0,−HES'$_{-1016:8:1016}$}·(1+j)/√2;
{−HES'$_{-1016:8:1016}$,0,HES'$_{-1016:8:1016}$}·(1+j)/√2; or
{HES'$_{-1016:8:1016}$_L,1,HES'$_{-1016:8:1016}$_R,0,
HES'$_{-1016:8:1016}$_L,−1,−HES'$_{-1016:8:1016}$_R}·(1+j)/√2, wherein HES'$_{1016:8:1016}$ is represented as {M,−1,M,−M,−1, M,0,−M,1,M,1,−M,1,−M,0,−M,1,−M,1,M,1,−M,0,−M, 1,M,1,−M,1,−M}, HES'$_{-1016:8:1016}$_L is represented as {M,−1,M,−M,−1,M,0,−M,1,M,1,−M,1,−M},
HES'$_{-1016:8:1016}$_R is represented as {−M,1,−M,1,M, 1,−M,0,−M,1,M,1,−M,1,−M}, and M={−1,−1,−1,1,1, 1,−1,1,1,1,−1,1,1,−1,1}.

* * * * *